United States Patent
Kwon et al.

(10) Patent No.: US 10,142,706 B2
(45) Date of Patent: Nov. 27, 2018

(54) BROADCAST SIGNAL TRANSMITTING METHOD, BROADCAST SIGNAL RECEIVING METHOD, BROADCAST SIGNAL TRANSMITTING APPARATUS, AND BROADCAST SIGNAL RECEIVING APPARATUS

(71) Applicant: LG ELECTRONICS INC., Seoul (KR)

(72) Inventors: Woosuk Kwon, Seoul (KR); Sejin Oh, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 14/914,892

(22) PCT Filed: Jul. 29, 2015

(86) PCT No.: PCT/KR2015/007918
§ 371 (c)(1),
(2) Date: Feb. 26, 2016

(87) PCT Pub. No.: WO2016/018066
PCT Pub. Date: Feb. 4, 2016

(65) Prior Publication Data
US 2016/0212503 A1    Jul. 21, 2016

Related U.S. Application Data

(60) Provisional application No. 62/031,873, filed on Aug. 1, 2014, provisional application No. 62/036,610, filed on Aug. 12, 2014.

(51) Int. Cl.
H04N 21/845    (2011.01)
H04N 21/61    (2011.01)
(Continued)

(52) U.S. Cl.
CPC ....... *H04N 21/845* (2013.01); *H04N 21/2381* (2013.01); *H04N 21/6125* (2013.01); *H04N 21/64322* (2013.01); *H04W 4/06* (2013.01)

(58) Field of Classification Search
None
See application file for complete search history.

(56) References Cited

U.S. PATENT DOCUMENTS

| 6,434,129 B1 | 8/2002 | Struhsaker et al. |
| 2008/0151900 A1 | 6/2008 | Bi et al. |

(Continued)

FOREIGN PATENT DOCUMENTS

| JP | 2004129042 A | 4/2004 |
| JP | 2012-505916 A | 3/2012 |

(Continued)

OTHER PUBLICATIONS

Digital Video Broadcasting (DVB): "Generic Stream Encapsulation (GSE) Protocol", ETSI TS 102 606 V1.1.1, European Standard, Oct. 2007.

(Continued)

*Primary Examiner* — Christopher Crutchfield
*Assistant Examiner* — Alan Lindenbaum
(74) *Attorney, Agent, or Firm* — Dentons US LLP

(57) ABSTRACT

Provided is a method for transmitting a broadcast signal. The method includes generating a plurality of input packets including broadcast data, generating at least one link layer packet using the input packets, wherein a header of the link layer packet includes packet type information and packet configuration information, the packet type information indicates a type of an input packet included in a payload of the link layer packet, and the packet configuration information indicates a payload configuration of the link layer packet, (Continued)

generating a broadcast signal using the link layer packet, and transmitting the broadcast signal.

8 Claims, 85 Drawing Sheets

(51) Int. Cl.
*H04N 21/643* (2011.01)
*H04N 21/2381* (2011.01)
*H04W 4/06* (2009.01)

(56) References Cited

U.S. PATENT DOCUMENTS

| | | | |
|---|---|---|---|
| 2008/0225778 A1* | 9/2008 | Vare | H04H 20/26 370/328 |
| 2013/0028270 A1 | 1/2013 | Wu et al. | |
| 2014/0064280 A1* | 3/2014 | Qin | H04B 7/18582 370/392 |

FOREIGN PATENT DOCUMENTS

| | | |
|---|---|---|
| KR | 10-1008652 B1 | 1/2011 |
| KR | 10-2012-0123638 A | 11/2012 |
| KR | 10-1419287 B1 | 7/2014 |
| WO | 2011/105776 A2 | 9/2011 |
| WO | 2012/173402 A2 | 12/2012 |

OTHER PUBLICATIONS

Digital Video Broadcasting (DVB): "Generic Stream Encapsulation (GSE); Part 1: Protocol", XP014214603, ETSI TS 102 606-1 V1.2.1, European Standard, Jul. 1, 2014.
Fairhurst University of Aberdeen, et al.: "Exstension Formats for Unidiectional Lightweight Encapsulation (ULE) and the Generic Stream Encapsulation (GSE)", XP015055233, Network Working Group RFC 171, Internet Society (ISOC), Apr. 1, 2008.
Digital Video Broadcasting (DVB): "Generic Stream Encapsulation (GSE); Part 2: Logical Link Control (LLC)", XP014214604, ETSI TS 102 606-2 V1.1.1, European Standard, Jul. 1, 2014.

* cited by examiner

FIG. 4

| Packet Type Value | Meaning |
|---|---|
| 000 | IPv4 |
| 001 | IPv6 |
| 010 | Compressed IP Packet |
| 011 | MPEG-2 Transport Stream |
| 100 | Reserved |
| 101 | Pacettized stream (e.g MPEG media transport packet, etc) |
| 110 | Signaling |
| 111 | Framed_Packet_Type |

FIG. 6

| C/S field value | Meaning | Next Field | Extended Header Size | Extended Header Field | Total Header Length |
|---|---|---|---|---|---|
| 00 | Normal Packet | Reserved | - | - | 1 byte |
| 01 | Concatenated Packet | Count | - | - | 1 byte |
| 10 | Segmented Packet | Seg_ID | 1 byte | Seg_SN , Seg_Len_ID | 2 bytes |
| 11 | Segmented Packet | Seg_ID | 2 bytes | Seg_SN , L_Seg_Len | 3 bytes |

FIG. 7

| Count (3bits) | No. of Concatenated IP packets |
|---|---|
| 000 | 2 |
| 001 | 3 |
| 010 | 4 |
| 011 | 5 |
| 100 | 6 |
| 101 | 7 |
| 110 | 8 |
| 111 | 9 |

FIG. 8

| Seg_Len_ID | Segment Length (byte) |
|---|---|
| 0000 | 512 (= min_Len) |
| 0001 | 768 |
| 0010 | 1024 |
| 0011 | 1280 |
| 0100 | 1536 |
| 0101 | 1792 |
| 0110 | 2048 |
| 0111 | 2304 |
| 1000 | 2560 |
| 1001 | 2816 |
| 1010 | 3072 |
| 1011 | 3328 |
| 1100 | 3584 |
| 1101 | 3840 |
| 1110 | 4096 |
| 1111 | 4352 |

Segment Length = Seg_Len_ID × Len_Unit + min_Len    bytes

FIG. 17

| Count (2bits) | No. of Concatenated MPEG-2 TS packets | Size (except sync byte) |
|---|---|---|
| 00 | 8 | 1496 |
| 01 | 16 | 2992 |
| 10 | 24 | 4488 |
| 11 | 32 | 5984 |

FIG. 23

| Count (2bits) | No. of Concatenated MPEG-2 TS packets | Link Layer Packet Length |
|---|---|---|
| 00 | 8 | 1486 |
| 01 | 16 | 2969 |
| 10 | 24 | 4452 |
| 11 | 32 | 5935 |

FIG. 28

$$L_T = L_H + p \times L_{count} + L_{CPID} + \frac{n \times 11}{8} + n \times 184 \qquad \text{bytes}$$

FIG. 31

| Syntax | No. of Bits | Format |
|---|---|---|
| framed_packet () { | | |
| ethernet_type | 16 | uimsbf |
| length | 16 | '11' |
| packet() | Var. | bslbf |
| } | | |

FIG. 33

| Syntax | No. of Bits | Format |
|---|---|---|
| Signaling_Section_Table() { | | |
|     table_id | 8 | uimsbf |
|     section_syntax_indicator | 1 | bslbf |
|     Specific Use | 1 | bslbf |
|     reserved | 2 | bslbf |
|     section_length | 12 | uimsbf |
|     Specific Use | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     Section Data | var | |
| } | | |

FIG. 35

| Signaling Type field value | Meaning | Next Field | Extended Header Size | Extended Header Field | Total Header Length |
|---|---|---|---|---|---|
| 00 | Section Table | Reserved | - | - | 1 byte |
| 01 | Descriptor Only | Count | - | - | 1 byte |
| 10 | Reserved | - | - | - | - |
| 11 | GSE -LLC Type | Seg_ID | 2 bytes | Seg_SN , Length | 3 bytes |

FIG. 36

| Count (3bits) | No. of Concatenated Descriptor |
|---|---|
| 000 | 1 |
| 001 | 2 |
| 010 | 3 |
| 011 | 4 |
| 100 | 5 |
| 101 | 6 |
| 110 | 7 |
| 111 | 8 |

FIG. 38

| Syntax | No. of bits | Identifier |
|---|---|---|
| network_information_section   (){ | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    network_id | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    reserved_future_use | 4 | bslbf |
|    network_descriptors_length | 12 | uimsbf |
|    for(i=0;i<N;i++){ | | |
|       descriptor() | | |
|    } | | |
|    reserved_future_use | 4 | bslbf |
|    transport_stream_loop_length | 12 | uimsbf |
|    for(i=0;i<N;i++){ | | |
|       broadcast_id | 16 | uimsbf |
|       original_network_id | 16 | uimsbf |
|       reserved_future_use | 4 | bslbf |
| | 12 | uimsbf |
|    delivery_system_descriptor_length | | |
|       for(j=0;j<N;j++){ | | |
|          delivery_system_descriptor () | | |
|       } | | |
|    } | | |
| } | | |

FIG. 39

| Syntax | No. of bits | Identifier |
|---|---|---|
| delivery_system_descriptor (){ | | |
| descriptor_tag | 8 | uimsbf |
| descriptor_length | 8 | uimsbf |
| delivery_system_id | 16 | uimsbf |
| base_PLP_id | 8 | uimsbf |
| base_PLP_version | 5 | uimsbf |
| reserved | 3 | '111' |
| if(descriptor_length > 4) | | |
| { | | |
| delivery_system_parameters () | | |
| } | | |
| } | | |

FIG. 40

| Syntax | No. of bits | Format |
|---|---|---|
| fast_information_ table (){ | | |
|     table_id | 8 | uimsbf |
|     section_syntax_indicator | 1 | ? |
|     private_indicator | 1 | ? |
|     reserved | 2 | ?1 |
|     section_length | 12 | uimsbf |
|     table_id_ extension | 16 | uimsbf |
|     reserved | 2 | ?1 |
|     FIT_data_version | 5 | uimsbf |
|     current_next_indicator | 1 | bslbf |
|     section_number | 8 | uimsbf |
|     last_section_number | 8 | uimsbf |
|     num_broadcast | | |
|     for(i=0;i<num_broadcast;i++){ | | |
|       broadcast_id | 16 | uimsbf |
|       delivery_system_id | 16 | uimsbf |
|       base_PLP_id | 8 | uimsbf |
|       base_PLP _version | 5 | uimsbf |
|       reserved | 3 | ?11 |
|       num_service | 8 | uimsbf |
|       for(j=0;j< num_service ;j++){ | | |
|         service_id | 16 | uimsbf |
|         service_category | 6 | uimsbf |
|         service_hidden_flag | 1 | bslbf |
|         SP_indicator | 1 | bslbf |
|         num_component | 8 | uimsbf |
|         for(k=0;k<num_component;k++){ | | |
|           component_ id | 8 | bslbf |
|           PLP_id | 8 | bslbf |
|         } | | |
|       } | | |
|     } | | |
| } | | |

FIG. 42

| Syntax | No. of bits | Format |
|---|---|---|
| fast_information_descriptor(){ | | |
|     descriptor_tag | 8 | uimsbf |
|     descriptor_length | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP _version | 5 | uimsbf |
|         reserved | 3 | ?11 |
|         num_service | 8 | uimsbf |
|         for(j=0;j< num_service ;j++){ | | |
|             service_id | 16 | uimsbf |
|             service_category | 6 | uimsbf |
|             service_hidden_flag | 1 | bslbf |
|             SP_indicator | 1 | bslbf |
|         } | | |
|     } | | |
| } | | |

FIG. 43

| Syntax | No. of bits | Format |
|---|---|---|
| delivery_system_descriptor (){ | | |
|     descriptor_tag | 8 | uimsbf |
|     descriptor_length | 8 | uimsbf |
|     delivery_system_id | 16 | uimsbf |
|     num_broadcast | 8 | uimsbf |
|     for(i=0;i< num_broadcast;i ++){ | | |
|       broadcast_id | 16 | uimsbf |
|       base_PLP_id | 8 | uimsbf |
|       base_PLP _version | 5 | uimsbf |
|       reserved | 3 | '111' |
|       delivery_system_paramters_length | 8 | uimsbf |
|       delivery_system_parameters () | | |
|     } | | |
| } | | |

FIG. 61

| Count field (4bits) | No. Of concatenated IP packets | Count field (4bits) | No. Of concatenated IP packets |
|---|---|---|---|
| 0000 | 1 | 1000 | 9 |
| 0001 | 2 | 1001 | 10 |
| 0010 | 3 | 1010 | 11 |
| 0011 | 4 | 1011 | 12 |
| 0100 | 5 | 1100 | 13 |
| 0101 | 6 | 1101 | 14 |
| 0110 | 7 | 1110 | 15 |
| 0111 | 8 | 1111 | 16 | t61010

| Count length ID field | Segment length (byte) | Count length ID field | Segment length (byte) |
|---|---|---|---|
| 0000 | 512 (= min_Len) | 1000 | 2560 |
| 0001 | 768 | 1001 | 2816 |
| 0010 | 1024 | 1010 | 3072 |
| 0011 | 1280 | 1011 | 3328 |
| 0100 | 1536 | 1100 | 3584 |
| 0101 | 1792 | 1101 | 3840 |
| 0110 | 2048 | 1110 | 4096 |
| 0111 | 2304 | 1111 | 4352 | t61020

FIG. 68

| Signaling class field (3 bits) | Meaning |
|---|---|
| 000 | Signaling for fast information channel (FIC) |
| 001 | Signaling for emergency alert |
| 010 | Signaling for header compression |
| 011 | Reserved |
| 100 | Reserved |
| 101 | Reserved |
| 110 | Reserved |
| 111 | Various | t68010

| Signaling format field (2 bits) | Meaning |
|---|---|
| 00 | Section table |
| 01 | Descriptor |
| 10 | XML |
| 11 | Other | t68020

FIG. 78

| Signaling_Class [4bits] | Signaling_Class [3bits] | Description |
|---|---|---|
| 0000 | 000 | Signaling for Fast channel scan and Service Acquisition |
| 0001 | 001 | Signaling for Emergency Alert |
| 0010 | 010 | Signaling for Header Compression |
| 0011 - 1110 | 011 - 110 | Reserved |
| 1111 | 111 | Multiple signaling information |

FIG. 79

| Signaling_Class [3bits] | Information Type [3 bits] | Description |
|---|---|---|
| 000 | 000 | Signaling for Service Scan |
| | 001 | Signaling for Service Acquisition |
| | 010 - 111 | Reserved |
| 001 | 000 | Emergency Alert Message |
| | 001 | Link of Emergency Alert Message |
| | 010 | Automatic Tuning Information |
| | 011 | NRT Service Information |
| | 100 - 110 | Reserved |
| | 111 | Wake up Indication |
| 010 | 000 | Initialization Information |
| | 001 | Configuration Parameters |
| | 010 | Static Chain |
| | 011 | Dynamic Chain |
| | 100 - 111 | Reserved |
| 011 – 110 | 000 - 111 | Reserved |
| 111 | 000 | Default |
| | 001 - 111 | Reserved |

FIG. 80

| Signaling_Format [4bits] | Description |
|---|---|
| 0000 | ATSC Signaling format |
| 0001 | Section Table |
| 0010 | Descriptor |
| 0011 | XML |
| 0100 - 1110 | Reserved |
| 1111 | Other |

| Signaling_Format [2bits] | Description |
|---|---|
| 00 | ATSC Signaling format |
| 01 | Section Table |
| 10 | Descriptor |
| 11 | Other |

FIG. 84

|        | Protocol |
|--------|----------|
| 0x0800 | Internet Protocol version 4 (IPv4) |
| 0x0806 | Address Resolution Protocol (ARP) |
| 0x0842 | Wake-on-LAN |
| 0x22F3 | IETF TRILL Protocol |
| 0x6003 | DECnet Phase IV |
| 0x8035 | Reverse Address Resolution Protocol |
| 0x809B | AppleTalk (Ethertalk) |
| 0x80F3 | AppleTalk Address Resolution Protocol (AARP) |
| 0x8100 | VLAN-tagged frame (IEEE 802.1Q) & Shortest Path Bridging IEEE 802.1aq |
| 0x8137 | IPX |
| 0x8138 | IPX |
| 0x8204 | QNX Qnet |
| 0x86DD | Internet Protocol Version 6 (IPv6) |
| 0x8808 | Ethernet flow control |
| 0x8809 | Slow Protocols (IEEE 802.3) |
| 0x8819 | CobraNet |
| 0x8847 | MPLS unicast |
| 0x8848 | MPLS multicast |
| 0x8863 | PPPoE Discovery Stage |
| 0x8864 | PPPoE Session Stage |
| 0x8870 | Jumbo Frames |
| 0x887B | HomePlug 1.0 MME |
| 0x888E | EAP over LAN (IEEE 802.1X) |
| 0x8892 | PROFINET Protocol |
| 0x889A | HyperSCSI (SCSI over Ethernet) |
| 0x88A2 | ATA over Ethernet |
| 0x88A4 | EtherCAT Protocol |
| 0x88A8 | Provider Bridging (IEEE 802.1ad) & Shortest Path Bridging IEEE 802.1aq |
| 0x88AB | Ethernet Powerlink |
| 0x88CC | Link Layer Discovery Protocol (LLDP) |
| 0x88CD | SERCOS III |
| 0x88E1 | HomePlug AV MME |
| 0x88E3 | Media Redundancy Protocol (IEC62439-2) |
| 0x88E5 | MAC security (IEEE 802.1AE) |
| 0x88F7 | Precision Time Protocol (PTP) over Ethernet (IEEE 1588) |
| 0x8902 | IEEE 802.1ag Connectivity Fault Management (CFM) Protocol / ITU-T Recommendation Y.1731 (OAM) |
| 0x8906 | Fibre Channel over Ethernet (FCoE) |
| 0x8914 | FCoE Initialization Protocol |
| 0x8915 | RDMA over Converged Ethernet (RoCE) |
| 0x892F | High-availability Seamless Redundancy (HSR) |
| 0x9000 | Ethernet Configuration Testing Protocol |
| 0x9100 | Q-in-Q |
| 0xCAFE | Veritas Low Latency Transport (LLT) for Veritas Cluster Server |

BROADCAST SIGNAL TRANSMITTING METHOD, BROADCAST SIGNAL RECEIVING METHOD, BROADCAST SIGNAL TRANSMITTING APPARATUS, AND BROADCAST SIGNAL RECEIVING APPARATUS

This application is a 35 USC § 371 National Stage entry of International Application No. PCT/KR2015/007918 filed on Jul. 29, 2015, which claims priority to US Provisional Application No. 62/031,873 filed on Aug. 1, 2014, and US Provisional Application No. 62/036,610 filed on Aug. 12, 2014, all of which are incorporated by reference in their entirety herein.

TECHNICAL FIELD

The present invention relates to broadcast signal transmitting method, broadcast signal receiving method, broadcast signal transmitting apparatus, and broadcast signal receiving apparatus.

BACKGROUND ART

Recently, broadcast environments using an Internet protocol (IP) in a digital broadcast system have become popular. There is a forecast that a hybrid broadcast system for providing a broadcast service in conjunction with a broadcast network and the Internet is established as a next-generation broadcast system. Accordingly, methods for preserving and developing technologies of a digital broadcast system using a typical IP have been considered. However, it takes a significant long time to completely convert a conventional broadcast system using a typical MPEG-2 TS into an IP broadcast system in terms of industry or strategy, and thus a broadcast system that simultaneously supports IP and MPEG-2 TS needs to be considered.

DISCLOSURE

Technical Problem

An object of the present invention devised to solve the problem lies in a broadcast signal transmitting method, broadcast signal receiving method, broadcast signal transmitting apparatus, and broadcast signal receiving apparatus.

Technical Solution

The object of the present invention can be achieved by providing a method for transmitting a broadcast signal including generating a plurality of input packets comprising broadcast data, generating at least one link layer packet using the input packets, wherein a header of the link layer packet comprises packet type information and packet configuration information, the packet type information indicates a type of an input packet included in a payload of the link layer packet, and the packet configuration information indicates a payload configuration of the link layer packet, generating a broadcast signal using the link layer packet, and transmitting the broadcast signal.

When the payload comprises one of segmented segments of an input packet, the header may further include information of a segment sequencer number indicating an order in a corresponding input packet of a segment included in the link layer packet.

In another aspect of the present invention, provided herein is an apparatus for transmitting a broadcast signal including a first module for generating a plurality of input packets comprising broadcast data, a second module for generating at least one link layer packet using the input packets, wherein a header of the link layer packet comprises packet type information and packet configuration information, the packet type information indicates a type of an input packet included in a payload of the link layer packet, and the packet configuration information indicates a payload configuration of the link layer packet, a third module for generating a broadcast signal using the link layer packet, and a fourth module for transmitting the broadcast signal.

When the payload comprises one of segmented segments of an input packet, the header may further include information of a segment sequencer number indicating an order in a corresponding input packet of a segment included in the link layer packet.

Advantageous Effects

The present invention provides an effective broadcast signal transmitting method, an effective broadcast signal receiving method, an effective broadcast signal transmitting apparatus, and an effective broadcast signal receiving apparatus.

In addition, the present invention may enhance data transfer efficiency and enhance robustness for transmitting and receiving a broadcast signal.

DESCRIPTION OF DRAWINGS

FIG. 4 is a diagram illustrating a packet type according to a packet type element according to an embodiment of the present invention.

FIG. 6 is a diagram illustrating meaning of a C/S field and configuration information of a header according to an embodiment of the present invention.

FIG. 7 is a diagram illustrating meaning according to a value of a count field according to an embodiment of the present invention.

FIG. 8 is a diagram illustrating the meaning and segment length according to a value of a Seg_Len_ID field according to an embodiment of the present invention.

FIG. 17 is a diagram illustrating the number of MPEG-2 TS packets included in a payload of a link layer packet according to a value of a count field, according to an embodiment of the present invention.

FIG. 23 is a diagram illustrating the number of concatenated MPEG-2 TS packets according to a value of a count field and a length of a link layer packet according to the number when common PID reduction is applied, according to an embodiment of the present invention.

FIG. 28 is a diagram illustrating an equation for obtaining a length of a link layer packet while MPEG-2 TS packets including the same packet identifier (PID) are encapsulated in a stream including a null packet, according to an embodiment of the present invention.

FIG. 31 is a diagram illustrating syntax of a framed packet, according to an embodiment of the present invention.

FIG. 33 is a diagram illustrating normal format of a section table, according to an embodiment of the present invention.

FIG. 35 is a diagram illustrating meaning of a value of a signaling type field and information about a fixed header and extended header subsequent to the signaling type field, according to an embodiment of the present invention.

FIG. 36 is a diagram illustrating the number of descriptors included in a payload of a link layer packet according to a concatenation count value, according to an embodiment of the present invention.

FIG. 38 is a diagram illustrating syntax of a network information table (NIT) according to an embodiment of the present invention.

FIG. 39 is a diagram illustrating syntax of a delivery system descriptor included in a network information table (NIT), according to an embodiment of the present invention.

FIG. 40 is a diagram illustrating syntax of a fast information table (FIT) according to an embodiment of the present invention.

FIG. 42 is a diagram illustrating syntax of fast information descriptor according to an embodiment of the present invention.

FIG. 43 is a diagram illustrating a delivery system descriptor according to an embodiment of the present invention.

FIG. 61 is a diagram illustrating information indicated by each field in a header of a link layer packet when an IP packet is transmitted to a link layer, according to another embodiment of the present invention.

FIG. 68 is a diagram illustrating information indicated by fields with respect to a configuration of a link layer packet when signaling information is transmitted to a link layer, according to another embodiment of the present invention.

FIG. 78 is a diagram illustrating a Signaling_Class field when signaling information is transmitted to a link layer, according to another embodiment of the present invention.

FIG. 79 is a diagram illustrating a Signaling_Class field and an Information_Type field when signaling information is transmitted to a link layer, according to another embodiment of the present invention.

FIG. 80 is a diagram illustrating a Signaling_Format field when signaling information is transmitted to a link layer, according to another embodiment of the present invention.

FIG. 84 is a diagram illustrating ethernet_type field when a framed packet is transmitted to a link layer, according to another embodiment of the present invention.

BEST MODE

Figure 1:
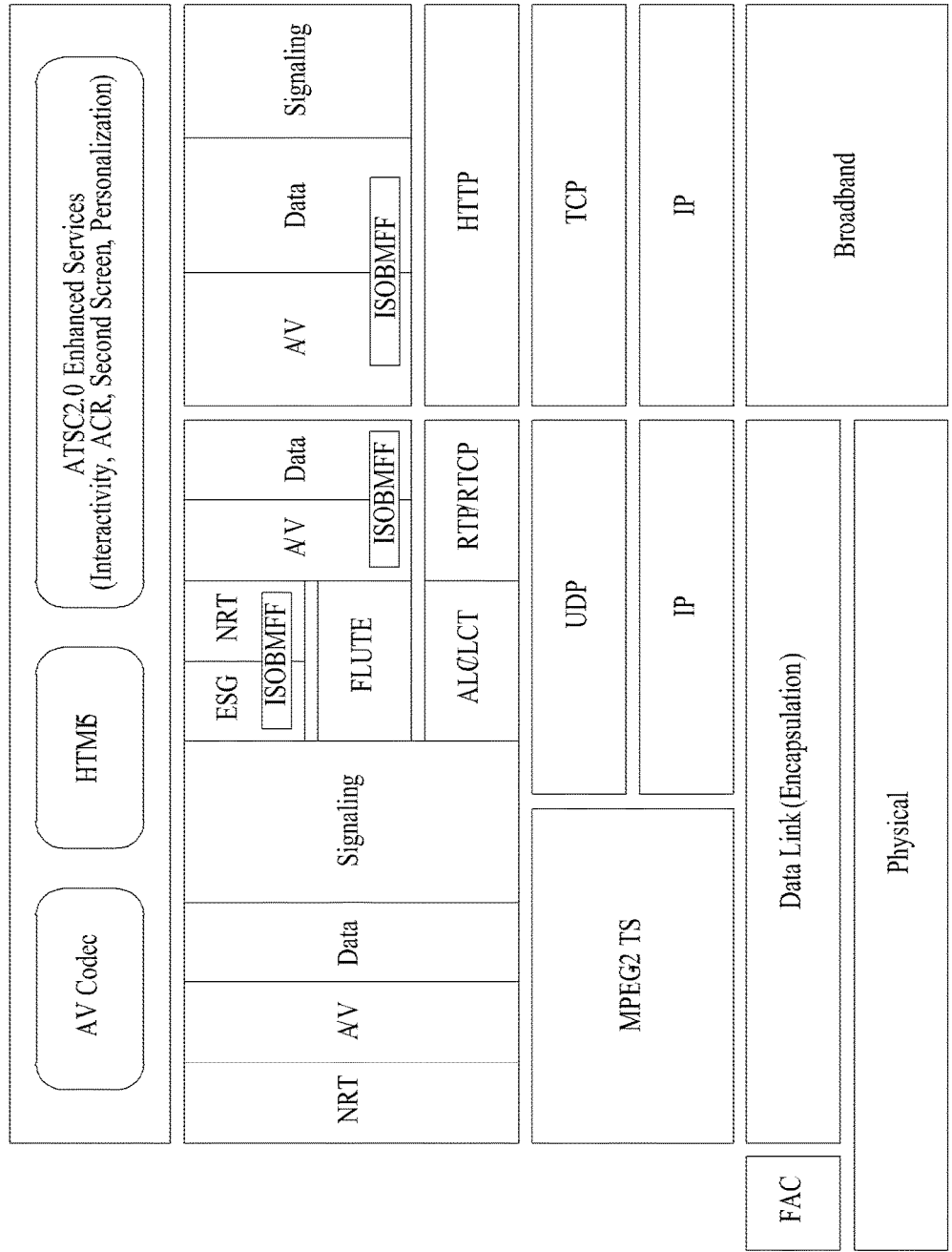
FIG. 1 is a diagram illustrating a protocol stack for a hybrid-based next-generation broadcast system according to an embodiment of the present invention.

Reference will now be made in detail to the embodiments, examples of which are illustrated in the accompanying drawings. However, the embodiments should not be construed as limited to the exemplary embodiments set forth herein Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

In the specification, the term 'signaling' refers to transmission/reception of service information (ST) provided in a broadcast system, an Internet broadcast system, and/or a broadcast/Internet fusion system. The SI includes broadcast service information (e.g., ATSC-SI and/or DVB-SI) provided in each currently existing broadcast system.

In the specification, the term 'broadcast signal' is defined as including signals and/or data provided in bidirectional broadcasting such as Internet broadcasting, broadband broadcasting, communication broadcasting, data broadcasting, and/or video on demand (VOD) as well as terrestrial broadcasting, cable broadcasting, satellite broadcasting, and/or mobile broadcasting.

In the specification, the term 'physical layer pipe (PLP)' refers to a predetermined unit for transmitting data belonging to a physical layer. Accordingly, in the specification, the term 'PLP' may be replaced with a 'data unit' or a 'data pipe'.

One of important applications to be used in a digital broadcast (DTV) service may be a hybrid broadcast service based on connection between a broadcast network and an Internet network. The hybrid broadcast service may transmit enhancement data broadcast audio/video (A/V) content transmitted through a terrestrial broadcasting network or some of the A/V content in realtime through the Internet so as to allow users to experience various contents.

The present invention proposes a method for encapsulating an IP packet and a MPEG-2 TS packet and a packet to be used in other broadcast systems so as to be transmitted to a physical layer in a next-generation digital broadcast system. In addition, the present invention also proposes a method for transmitting layer 2 signaling in the same header format.

The description below may be embodied in a device. For example, the description below may be performed by, for example, a signaling processor, a protocol processor, a processor, and/or a packet generator.

The present invention provides a method and apparatus for transmitting and receiving a broadcast signal for a next-generation broadcast service. A next-generation broadcast service according to to an embodiment of the present invention is interpreted as including a terrestrial broadcasting service, a mobile broadcasting service, an ultra high definition television (UHDTV) service, and the like. According to an embodiment of the present invention, a broadcast signal for the aforementioned next-generation broadcast service may be process a broadcast signal using a non-multi input multi output (MIMO) method or a MIMO method. A non-MIMO method according to an embodiment of the present invention may include a multi input single output (MISO) method, a single input single output (SISO) method, and the like.

Hereinafter, for convenience of description, an example in which a multiple antenna of MISO or MIMO is two antennas, but the description of the present invention may be applied to a system using two or more antennas.

FIG. 1 is a diagram illustrating a protocol stack for a hybrid-based next-generation broadcast system according to an embodiment of the present invention.

The present invention proposes a structure of a data link (encapsulation) portion illustrated in FIG. 1 and proposes a method for transferring a MPEG-2 transport stream (TS) and/or an Internet protocol (IP) packet transmitted from an upper layer to a physical layer. In addition, the present invention proposes a method for transmitting signaling required for an operation of a physical layer and establishes a base for transmitting a new packet type to a physical layer when a higher layer considers the new packet type for future use.

A corresponding protocol layer may also be referred to as various terms such as a data link layer, an encapsulation layer, layer 2, and the like. In the present invention, the protocol layer is referred to as a link layer. In actual application to the present invention, the protocol layer may be substituted with the term 'link layer' or a corresponding layer may also be referred to as a new term.

A broadcast system according to the present invention may correspond to a hybrid broadcast system obtained by combining an IP centric broadcast network and a broadband.

The broadcast system according to the present invention may be designed to maintain compatibility with a conventional MPEG-2-based broadcast system.

The broadcast system according to the present invention may correspond to a hybrid broadcast system based on combination of an IP centric broadcast network, a broadband network, and/or mobile communication network or a cellular network.

Referring to FIG. 1, a physical layer may use a physical protocol employed by a broadcast system such as an ATSC system and/or a DVB system.

An encapsulation layer may acquire IP datagram from information acquired from the physical layer or convert the acquired IP datagram into a specific frame (e.g., RS Frame, GSE-lit e, GSE, or signal frame). Here, the frame may include a set such as IP datagrams.

A fast access channel (FAC) may include information (e.g., mapping information between service ID and frame) for access to a service and/or content.

The broadcast system according to the present invention may use a protocol such as an internet protocol (IP), a user datagram protocol (UDP), a transmission control protocol (TCP), asynchronous layered coding/layered coding transport (ALC/LCT), rate control protocol/RTP control protocol (RCP/RTCP), hypertext transfer protocol (HTTP), and file delivery over unidirectional transport (FLUTE). A stack between these protocols may be understood with reference to the structure illustrated in FIG. 1.

In the broadcast system according to the present invention, data may be transmitted in the form of ISO base media file format (ISOBMFF). Electrical service guide (ESG), non real time (NRT), audio/video (A/V), and/or general data may be transmitted in the form of ISOBMFF.

Transmission of data through a broadcast network may include transmission of linear content and/or transmission of non-linear content.

Transmission of RTP/RTCP-based A/V, and data (closed caption, emergency alert message, etc.) may correspond to transmission of linear content.

A RTP payload may be transmitted to be encapsulated in the form of RTP/AV stream and/or ISO based media file format including a network abstraction layer (NAL). Transmission of the RTP payload may correspond to transmission of linear content. Transmission in the form of encapsulation of ISO based media file format may include a MPEG DASH media segment for A/V, etc.

Transmission of FLUTE-ESG, transmission of non-timed data, and transmission of NRT content may correspond to transmission of non-linear content. These may be transmitted to be encapsulated in the form of a MIME type file and/or ISO based media file format. Transmission in the form of encapsulation of ISO based media file format may include a MPEG DASH media segment for A/V, etc.

Transmission of a broadcast network may be separately considered as transmission of content and transmission of signaling data.

Transmission of content may include transmission of linear content (A/V and data (closed caption, emergency alert message, etc.), transmission of non-linear content (ESG, non-timed data, etc.), and transmission of MPEG DASH-based media segment (A/V and data).

Transmission of signaling data may include transmission containing a signaling table (which includes MPD of MPEG DASH) transmitted in a broadcast network.

The broadcast system according to the present invention may support synchronization between linear/non-linear contents transmitted through a broadcast network or synchronization between content transmitted through a broadcast network and content transmitted through a broadband. For example, when one UD content item is segmented and simultaneously transmitted in a broadcast network and a broadband, a receiver may adjust a timeline dependent upon a transmission protocol and synchronize content of a broadcast network and content of a broadband to reconfigure one UD content item.

An application layer of the broadcast system according to the present invention may embody technological characteristics of interactivity, personalization, second screen, and automatic content recognition (ACR). These characteristics may be important to extension to ATSC3.0 from ATSC2.0 as North America broadcast standard. For example, for characteristics of interactivity, HTML5 may be used.

A presentation of the broadcast system according to the present invention may use HTML and/or HTML5 in order to identify a spatial and temporal relationship between components or interactive applications.

A broadcast system according to another embodiment of the present invention may be formed by adding some features to the aforementioned broadcast system or modifying some feature of the aforementioned broadcast system, and thus the description of components may be substituted with the above description of the aforementioned broadcast system.

A broadcast system according to another embodiment of the present invention may include a system structure that maintains compatibility with an MPEG-2 system. For example, linear/non-linear content transmitted by a conventional MPEG-2 system may be supported to be received and operated in an ATSC 3.0 system or processing of A/V and data may be flexibly adjusted according to data received in the ATSC 3.0 system, that is, whether the data is MPEG-2 TS or IP datagram.

An encapsulation layer of the broadcast system according to another embodiment of the present invention may convert information/data acquired from a physical layer into MPEG-2 TS or IP datagram or convert the information/data into a specific frame (e.g., RS Frame, GSE-lite, GSE, or signal frame) using IP datagram.

The broadcast system according to another embodiment of the present invention may include signaling information that can be flexibly acquired according to whether data received in the ATSC 3.0 system is MPEG-2 TS or IP datagram in order to acquire services/content through a broadcast network. That is, the broadcast system may acquire signaling information based on MPEG-2 TS or acquire signaling information from data according to a UDP protocol.

The broadcast system according to the present invention may support synchronization between broadcast-based linear/non-linear contents encapsulated in the form of MPEG-2 TS and/or IP datagram. In addition, the broadcast system may support synchronization between content fragments transmitted through a broadcast network and a broadband. For example, when one UD content item is segmented and is simultaneously transmitted through a broadcast network and a broadband, a receiver may adjust timeline dependent upon a transmission protocol and synchronize content of a broadcast network and content of a broadband to reconfigure one UD content item.

Figure 2:
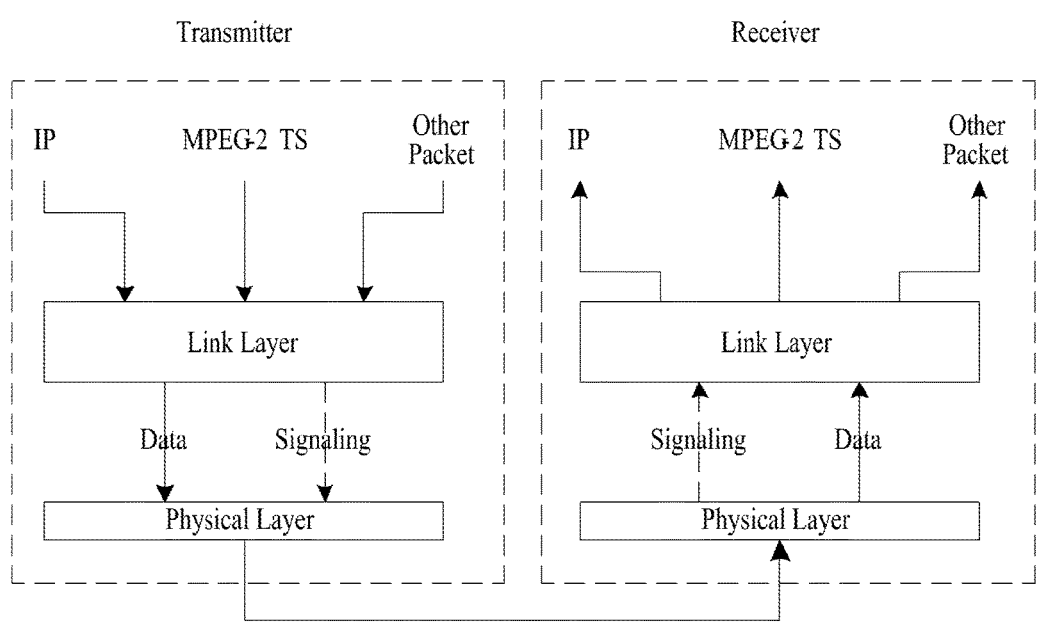
FIG. 2 is a diagram illustrating an interface of a link layer according to an embodiment of the present invention.

FIG. 2 is a diagram illustrating an interface of a link layer according to an embodiment of the present invention.

The case in which an IP packet and/or a MPEG-2 TS packet that are maintain used in digital broadcasting are input to a transmitter may be considered. The transmitter can also support a structure of a packet of a new protocol that can be used in next-generation broadcasting for future use. Data and singling that are encapsulated in a link layer may be transmitted to a physical layer. The transmitter may perform processing appropriate for a protocol of a physical layer supported by a broadcast system on the transmitted data (including signaling data) to transmit a signal including the corresponding data.

A receiver may restore data and signaling transmitted from the physical layer in the form of data that can be processed in a higher layer. The receiver may differentiate whether a packet transmitted from the physical layer is signaling (or signaling data) or data (or content data) by reading a header of a packet or via other methods to be described later.

Signaling (i.e., signaling data) transmitted from a link layer of a transmitter may include signaling that is transmitted from an upper layer and needs to be transmitted to an upper layer of a receiver, signaling that is generated in a link layer and provides information on data processing in a link layer of a receiver, and/or signaling that is generated in an upper layer or a link layer but is transmitted for rapid detection of specific data (e.g., service, content, and/or signaling data) in a physical layer.

Figure 3:
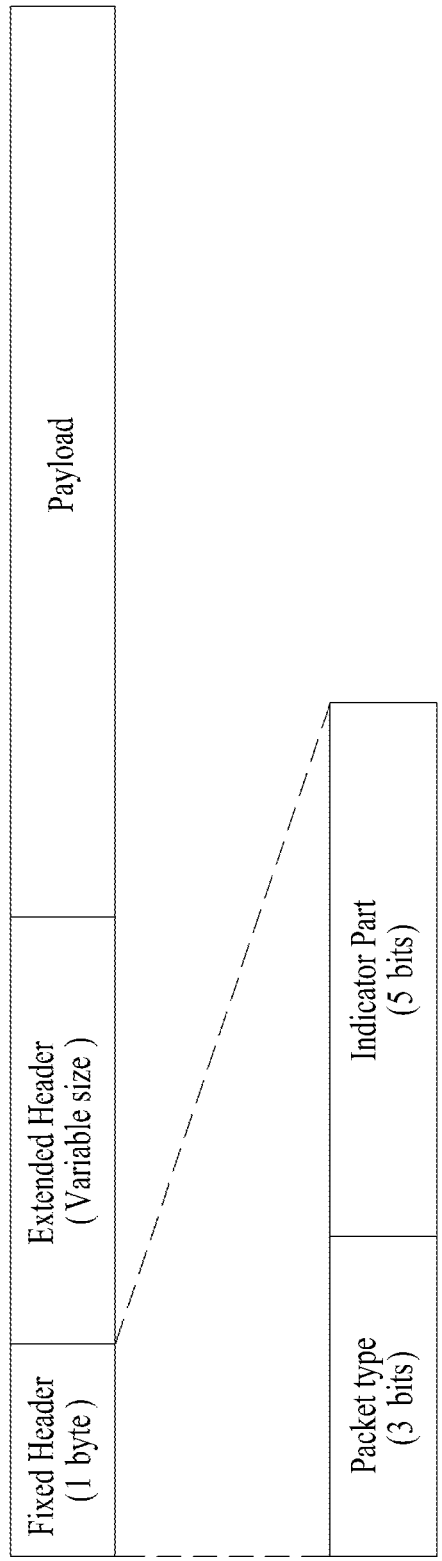
FIG. 3 is a diagram illustrating a structure of a packet of a link layer according to an embodiment of the present invention.

FIG. 3 is a diagram illustrating a structure of a packet of a link layer according to an embodiment of the present invention.

According to an embodiment of the present invention, the packet of the link layer may include a fixed header, an extended header, and/or a payload.

The fixed header may be a header with a fixed size. For example, the fixed header may have a size of 1 byte. The extended header may be a header with a changeable size. The payload containing data transmitted by a higher layer may be positioned behind the fixed header and the extended header.

The fixed header may include a packet type element and/or an indicator part element.

The packet type element may have a size of 3 bits. The packet type element may identify a packet type of a higher layer (a higher layer of a link layer). A packet type identified according to a value of a packet type element will be described later.

The indicator part element may include a method for configuring a payload and/or information for configuring an extended header. The configuring method and/or configuring information indicated by the indicator part element may be changed according to a packet type.

FIG. 4 is a diagram illustrating a packet type according to a packet type element according to an embodiment of the present invention.

For example, when a value of a packet type element is '000', the value may indicate that a packet transmitted to a link layer from a higher layer is a packet of a Internet protocol version 4 (IPv4).

When a value of a packet type element is '001', the value may indicate that a packet transmitted to a link layer form a higher layer is a packet of an Internet protocol version 6 (IPv6).

When a value of a packet type element is '010', the value may indicate that a packet transmitted to a link layer from a higher layer is an encapsulated IP packet.

When a value of a packet type element is '011', the value may indicate that a packet transmitted to a link layer from a higher layer is a packet of MPEG-2 TS.

When a value of a packet type element is '101', the value may indicate that a packet transmitted to a link layer from a higher layer is a packet of a packetized stream. For example, the packetized stream may correspond to a MPEG media transport packet.

When a value of a packet type element is '110', the value may indicate that a packet transmitted to a link layer from a higher layer is a packet for transmitting signaling (signaling data).

When a value of a packet type element is '11', the value may indicate that a packet transmitted to a link layer from a higher layer is a frame packet type.

Figure 5:
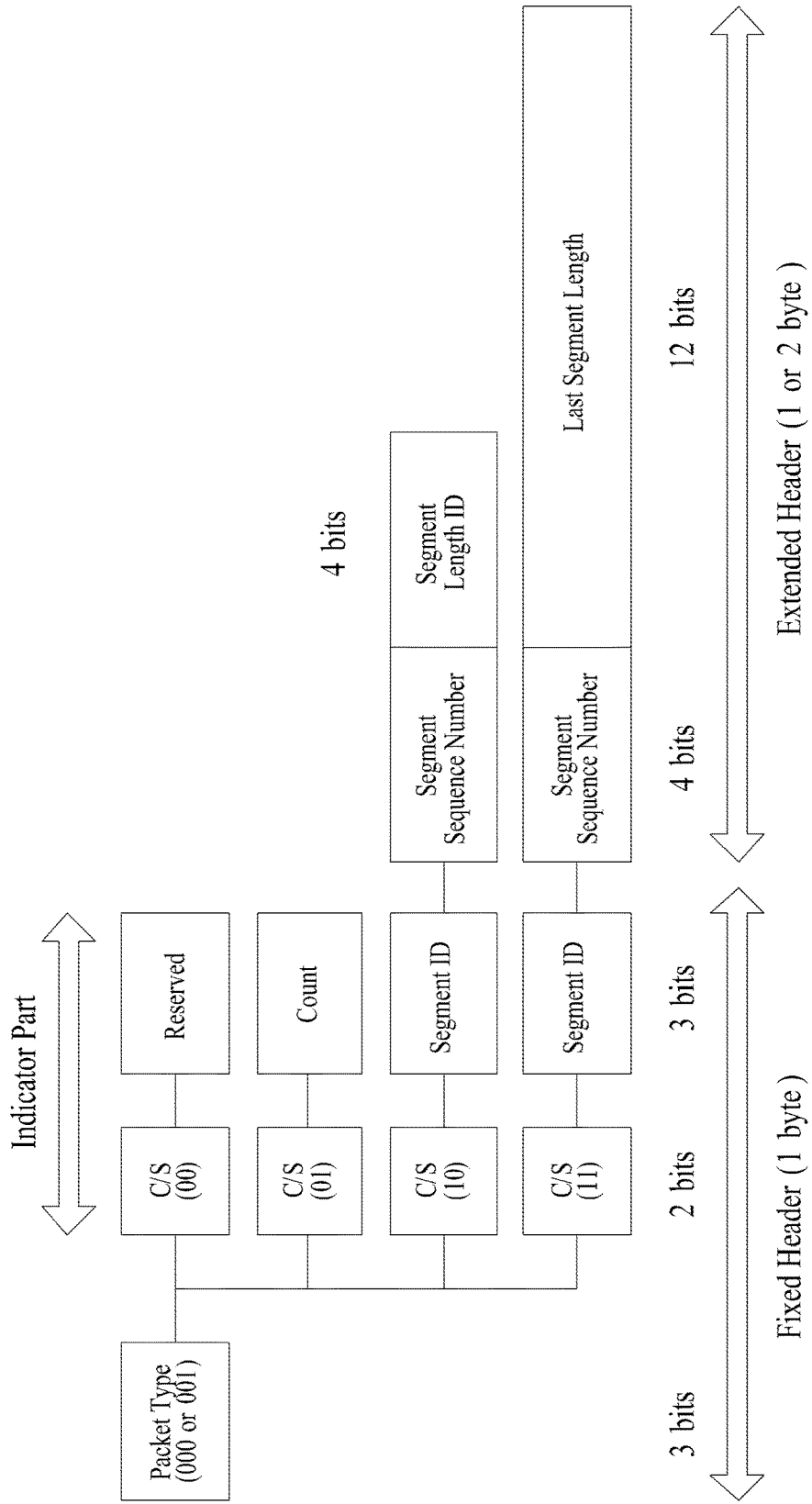
FIG. 5 is a diagram illustrating a structure of a header of a link layer when an IP packet is transmitted to a link layer, according to an embodiment of the present invention.

FIG. 5 is a diagram illustrating a structure of a header of a link layer when an IP packet is transmitted to a link layer, according to an embodiment of the present invention.

When the IP packet is input to a link layer, a value of a packet type element may be 000B (3 bits of 000) or 001B (3 bits of 001).

When the IP packet is input, an indicator part element subsequent to a packet type element may include a concatenation/segmentation (C/S) field and/or an additional field of 3 bits (hereinafter, referred to as an 'additional field') with reference to the header of the packet of the link layer.

With regard to the packet of the link layer, an additional field of the fixed header and information of the extended header may be determined according to 2 bits of a concatenation/segmentation (C/S) field subsequent to the packet type element.

The C/S field may indicate the form in which an input IP packet is processed and include information about a length of an extended header according thereto.

According to an embodiment of the present invention, when a value of a C/S field is 00B (2 bits of 00), the value corresponds to the case in which a payload of a link layer packet includes a normal packet. The normal packet may refer to the case in which an input IP packet is a payload of the link layer packet without changes. In this case, an additional field of a fixed header part may not be used and may be reserved for future use. In this case, an extended header may not be used.

When a value of a C/S field is 01B (2 bits of 01), the value may correspond to the case in which a payload of a link layer packet includes a concatenated packet. The concatenated packet may include one or more IP packets. That is, one or more IP packets may be included in the payload of the link layer packet. In this case, the extended header may not be used, and an additional field subsequent to the C/S field may be used as a count field. The count field will be described in detail.

When a value of a C/S field is 10B (2 bits of 10), the value may correspond to the case in which a payload includes a segmented packet. The segmented packet may be a packet including one segmented by dividing one IP packet into several segments. That is, the payload of the link layer packet may include any one of a plurality of segments included in an IP packet. An additional field subsequent to the C/S field may be used as a segment ID. The segment ID may be information about for uniquely identifying a segment. The segment ID may be an ID denoted when an IP packet is segmented and may indicate that segments that are transmitted for future use are components of the same IP packet when the segments are combined. The segment ID may have a size of 3 bits and may simultaneously support segmentation of 8 IP packets. For example, segments segmented from one IP packet may have the same segment ID. In this case, the extended header may have a length of 1 byte. In this case, the extended header may include a segment sequence number (Seg_SN) field and a segment sequence number field, and/or a segment length (Seg_Len_ID) field.

A segment sequence number (Seg_SN) field may have a length of 4 bits and indicate a sequence number of a corresponding segment in an IP packet. When the IP packet of the Seg_SN field is segmented, the Seg_SN field may be a field used to check a sequence of each segment. Accordingly, link layer packets including a payload segmented from one IP packet may have the same segment ID (Seg_ID) but have different values of a Seg_SN field. The Seg_SN field may have a size of 4 bits, and in this case, one IP packet can be segmented up to 16 segments. In order to segment an IP packet into more segments, a size of a Seg_SN field may be extended and may indicate a sequence and/or number of a segment.

A segment length ID (Seg_Len_ID) field may have a length of 4 bits and may be an ID for identifying a length of a segment. An actual length of a segment according to a value of the Seg_Len_ID field may be identified according to a table to be described later. When an actual length value of a segment instead of the Seg_Len_ID field is signaled, the Seg_Len_ID field of 4 bits may be extended to a segment length field of 12 bits, and in this case, an extended header of 2 bits may be included in a link layer packet.

A value of a C/S field is 11B (2 bits of 11), the value may correspond to the case in which a payload includes a segmented packet like in the case in which a value of the C/S field is 10B. However, the value may indicate that a segment (of a last sequence) positioned last among segments segmented from one IP packet is included in a payload. A receiver may identify a link layer packet for transmitting a last segment and recognize a segment included in a payload of a corresponding packet as a last segment of an IP packet using a value of the C/S field during reconfiguration of one IP packet by collecting segments. An additional field subsequent to the C/S field may be used as a segment ID. In this case, the extended header may have a length of 2 bytes. The extended header may include a segment sequence number (Seg_SN) field and/or a last segment length (L_Seg_Len) field.

A last segment length (L_Seg_Len) field may indicate an actual length of a last segment. When an IP packet is segmented into the same size from a front part using the Seg_Len_ID field, a last segment may have a different size from other previous segments. Accordingly, a length of a segment may be directly indicated using the L_Seg_Len field. The length may be different according to an allocated bit number of the L_Seg_Len field, but according to allocation of a bit number according to an embodiment of the present invention, the L_Seg_Len field may indicate that a length of a last segment is 1 to 4095 bytes.

That is, when one IP packet is segmented into a plurality of segments, the IP packet may be segmented into segments with a predetermined length, but a length of the last segment may be changed according to the length of the IP packet. Accordingly, it may be necessary to separately signal a length of a last segment. A description of a field with the same name is substituted with the above description.

FIG. 6 is a diagram illustrating meaning of a C/S field and configuration information of a header according to an embodiment of the present invention.

When a value of the C/S field is 00, the value may indicate that a normal packet is included in a payload of a link layer packet and an additional field is reserved. The extended header may not be included in the link layer packet. In this case, a total length of a header of the link layer packet may be 1 byte.

When a value of the C/S field is 01, the concatenated packet may be included in a payload of a link layer packet and an additional field may be used as a count field. The count field will be described later. The extended header may not be included in a link layer packet. In this case, a total length of a header of the link layer packet may be 1 byte.

When a value of the C/S field is 10, the segmented packet may be included in a payload of a link layer packet and an additional field may be used as a segment ID. The extended header may be included in the link layer packet. The extended header may include a Seg_SN field and/or a Seg_Len_ID field. A description of the Seg_SN field or the Seg_Len_ID field may be substituted with the above or following description. A total length of the header of the link layer packet may be 2 bytes.

When a value of the C/S field is 11, a segmented packet (a packet including a last segment) may be included in a payload of a link layer packet and an additional field may be used as a segment ID. The extended header may be included in a link layer packet. The extended header may include a Seg_SN field and/or an L_Seg_Len field. A description of the Seg_SN field or the L_Seg_Len field is substituted with the above or following description. A total length of a header of a link layer packet may be 3 bytes.

FIG. 7 is a diagram illustrating meaning according to a value of a count field according to an embodiment of the present invention.

A count field may be used when a payload of a link layer packet includes a concatenated packet. The count field may indicate the number of IP packets included in one payload. A value of the count field may indicate the number of IP packets that are concatenated without changes, but 0 or one concatenation is meaningless, and thus the count field may indicate that an IP packet with the number obtained by adding 2 to the value of the count field is included in a payload. According to an embodiment of the present invention, 3 bits are allocated to the count field, and thus this may indicate that a maximum of 9 IP packets are included in a payload of one link layer packet. When more IP packets need to be included in one payload, a length of the count field may be extended or 9 or more IP packets may be further signaled in the extended header.

FIG. 8 is a diagram illustrating the meaning and segment length according to a value of a Seg_Len_ID field according to an embodiment of the present invention.

The Seg_Len_ID field may be used to represent a length of a segment except for a last segment among a plurality of segments. In order to reduce overhead of a header that is required to represent the length of a segment, the size of a segment may be limited to 16.

A length of a segment may be determined according to an input size of a packet determined according to a code rate of forward error correction (FEC) processed by a physical layer and may be determined as each value of the Seg_Len_ID field. For example, with respect to each value of the Seg_Len_ID field, a length of a segment may be predetermined. In this case, information about a length of a segment according to each value of the Seg_Len_ID field may be generated by a transmitter and transmitted to a receiver, and the receiver may store the information. A length of a segment set according to each value of the Seg_Len_ID field may be changed, and in this case, the transmitter may generate new information about the length of the segment and transmit the information to the receiver, and the receiver may update stored in formation based on the information.

When processing of a physical layer is operated irrespective of the length of the segment, the length of the segment may be acquired as shown in the illustrated equation.

Here, a length unit (Len_Unit) may be a basic unit indicating a segment length and min_Len may be a minimum value of a segment length. Len_Unit and min_Len need to be the same in the transmitter and the receiver, and it may be effective that Len_Unit and min_Len are not changed after being changed once. The values may be determined in consideration of processing capability of FEC of a physical layer in an initialization procedure of a system. For example, as illustrated, the values may indicate a length of a segment that is represented according to the value of the Seg_Len_ID field, and in this case, a value of Len_Unit may be 256 and a value of min_Len may be 512.

Figure 9:
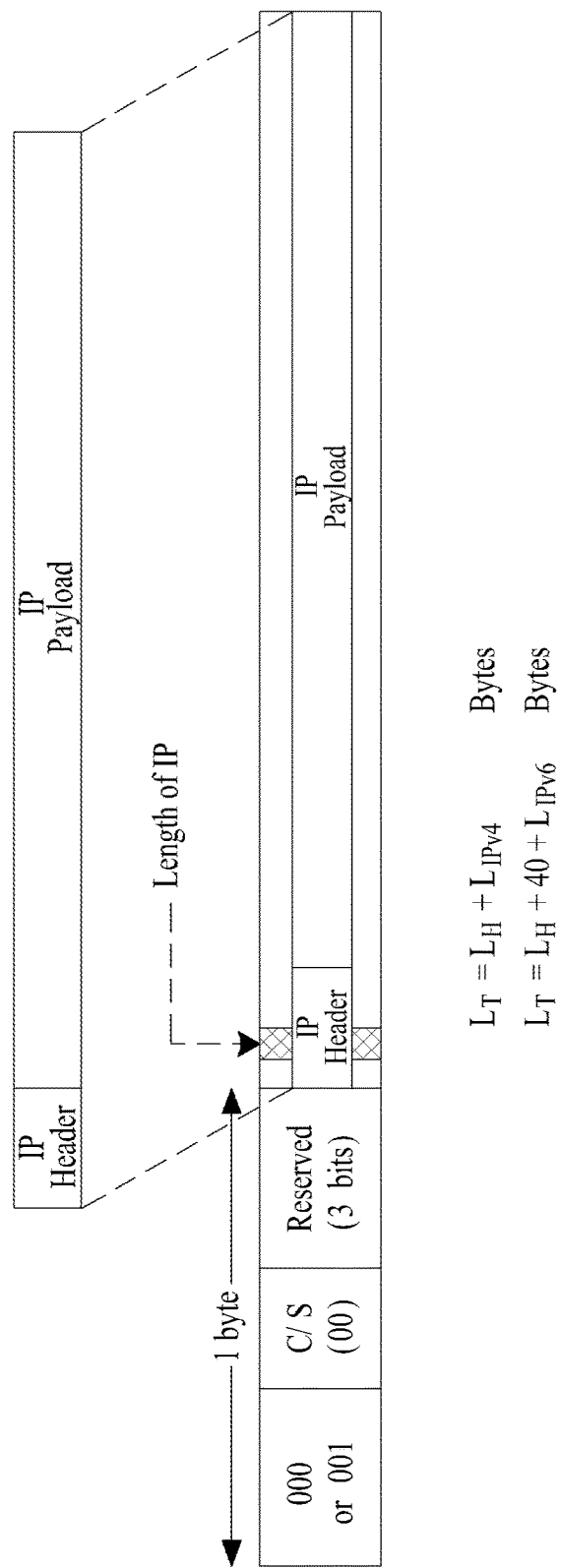
FIG. 9 is a diagram illustrating a procedure of encapsulating a normal packet and an equation of a length of a link layer packet according to an embodiment of the present invention.

FIG. 9 is a diagram illustrating a procedure of encapsulating a normal packet and an equation of a length of a link layer packet according to an embodiment of the present invention.

As described above, when an input IP packet is within a processing range of a physical layer and is concatenated or is not segmented, the input IP packet may be encapsulated as a normal packet. The following description may be applied to an IP packet of IPv4 or IPv6 in the same way. One IP packet may be a payload of a link layer packet without changes, and a value of a packet type element may be 000B (IPv4) or 001B (IPv6), and a value of the C/S field may be 00B (normal packet). The remaining 3 bits of a fixed header may be set as a reserved field for other future use.

The length of the link layer packet may be identified as follows. The header of the IP packet may include a field indicating a length of an IP packet. A field indicating a length is positioned at the same position, and thus the receiver may check a field at a position spaced apart from an initial point (a start point) of a link layer packet by a predetermined offset so as to recognize the length of a payload of a link layer packet. The receiver may read a length field with a length of 2 bytes from a position spaced apart from a start point of a payload by 2 bytes in the case of IPv4 and from a position spaced apart from a start point of a payload by 4 bytes in the case of IPv6.

Referring to the illustrated equation, when a value of a length field of IPv4 is LIPv4, LIPv4 indicates a total length of IPv4, and thus an entire length of the link layer packet may be obtained by adding a header length LH (1 byte) of the link layer packet to the LIPv4. Here, LT indicates a length of the link layer packet.

Referring to the illustrated equation, when a value of a length field of IPv6 is LIPv6, LIPv6 indicates only a length of a payload of an IP packet of IPv6, and thus a length of a link layer packet may be obtained by adding a length of a header of a link layer packet and a length (40 bytes) of a fixed header of IPv6. Here, LT may refer to a length of a link layer packet.

Figure 10:
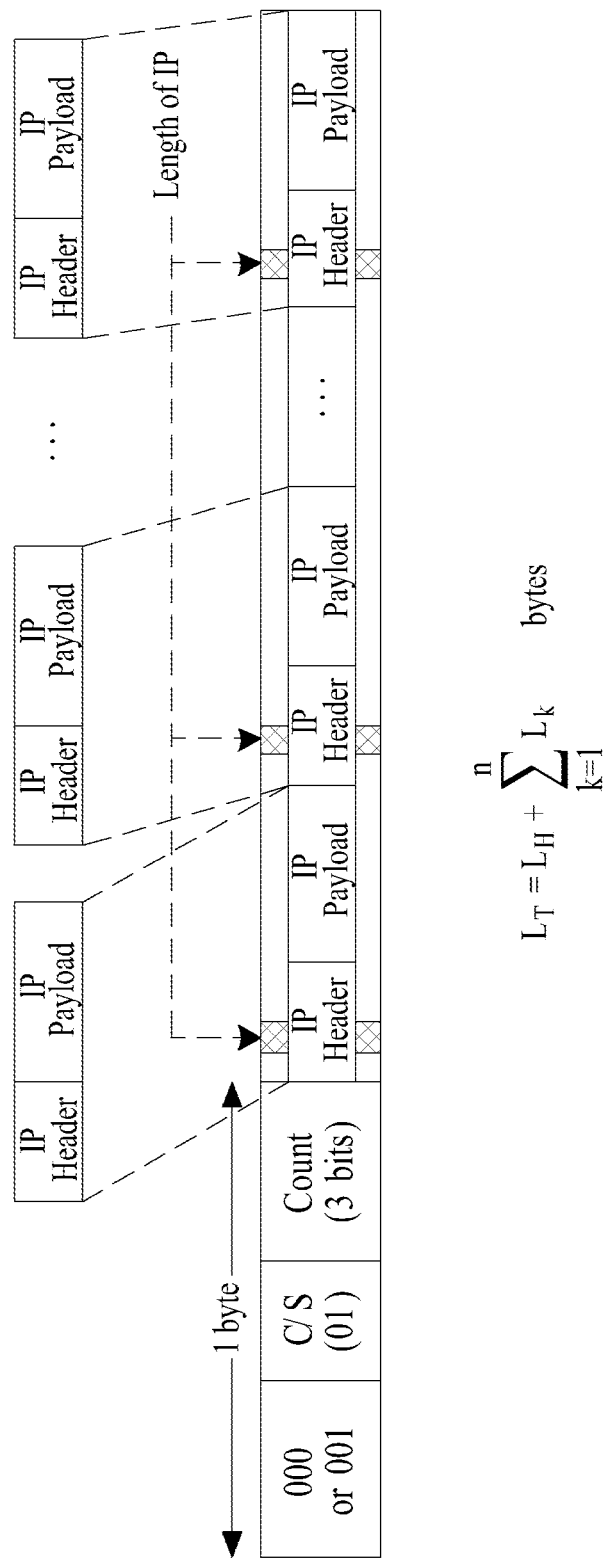
FIG. 10 is a diagram illustrating a procedure for encapsulating a concatenated packet and an equation of a length of a link layer packet according to an embodiment of the present invention.

FIG. 10 is a diagram illustrating a procedure for encapsulating a concatenated packet and an equation of a length of a link layer packet according to an embodiment of the present invention.

When an input IP packet cannot reach a range of processing of a physical layer, several IP packets may be concatenated to encapsulate one link layer packet. The following description may be applied to an IP packet of IPv4 or IPv6 in the same way.

Several IP packets may be a payload of a link layer packet, a value of the packet type element may be 000B (IPv4) or 001B (IPv6), and a value of a C/S field may be 01B (concatenated packet). A 3-bit count field indicating the number of IP packets included in one payload may be subsequent to the C/S field.

In order to obtain a length of a concatenated packet, the receiver may use a similar method to in the case of a normal packet. When the number of concatenated IP packets indicated by a count field is n, a length of a header of a link layer packet is LH, and a length of each IP packet is Lk (here, $1 \leq k \leq n$), an entire length LT of the link layer packet may be calculated as shown in the illustrated equation.

Here, a concatenated packet has only information about a fixed header, and thus LH=1 (byte), and each Lk ($1 \leq k \leq n$) value may be checked by reading a value of a length field present in a header of each IP packet included in the concatenated packet. The receiver may parse a length field of a first IP packet at a point with a predetermined offset from a point in which a header of a link layer packet ends and a payload is started and identify a length of the first IP packet using the length field. The receiver may parse a length field of a second IP packet at a point with a predetermined offset from a point in which the length of the first IP packet ends and identify the length of the second IP packet using the length field. The above method may be repeated by as much as the number of IP packets included in the payload of the link layer packet so as to identify the length of the payload of the link layer packet.

Figure 11:
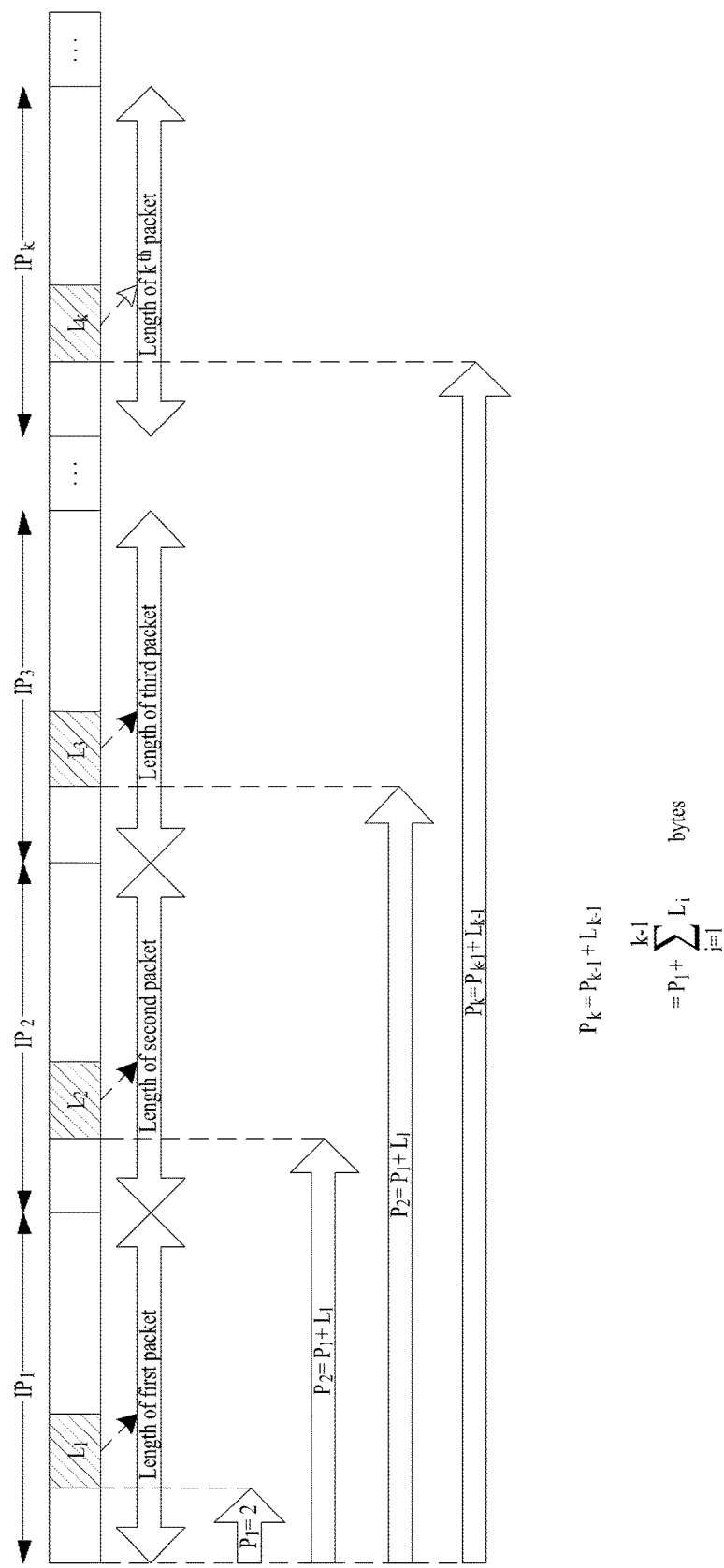
FIG. 11 is a diagram illustrating a procedure for obtaining a length of a concatenated packet including an IPv4 packet and an equation for calculating an offset value at which a length field of an IP packet is positioned according to an embodiment of the present invention.

FIG. 11 is a diagram illustrating a procedure for obtaining a length of a concatenated packet including an IPv4 packet and an equation for calculating an offset value at which a length field of an IP packet is positioned according to an embodiment of the present invention.

When an IP packet is input to a transmitter, it is not difficult to read a length field of an IP packet by the transmitter, but a receiver can know only the number of IP packets included in a link layer packet through a header, and thus a position of each length field may not be known. However, a length field is always positioned at the same position in a header of the IP packet, and thus the position of the length field may be retrieved so as to obtain a length of each IP packet included in a payload of a concatenated packet using the following method.

When n IP packets included in the payload of the concatenated packet are IP1, IP2, . . . , IPk, . . . , IPn, respectively, a length field corresponding to IPk may be positioned to be spaced apart from a start point of the payload of the concatenated packet by Pk bytes. Here, Pk ($1 \leq k \leq n$) may be an offset value in which the length field of a $k^{th}$ IP packet is positioned from the start point of the payload of the concatenated packet and may be calculated according to the shown equation.

Here, P1 of a packet of IPv4 may be 2 bytes. Accordingly, while P1 to Pk are sequentially updated, Lk corresponding thereto may be read and applied to the aforementioned equation of FIG. 10 so as to finally acquire a length of a concatenated packet.

Figure 12:
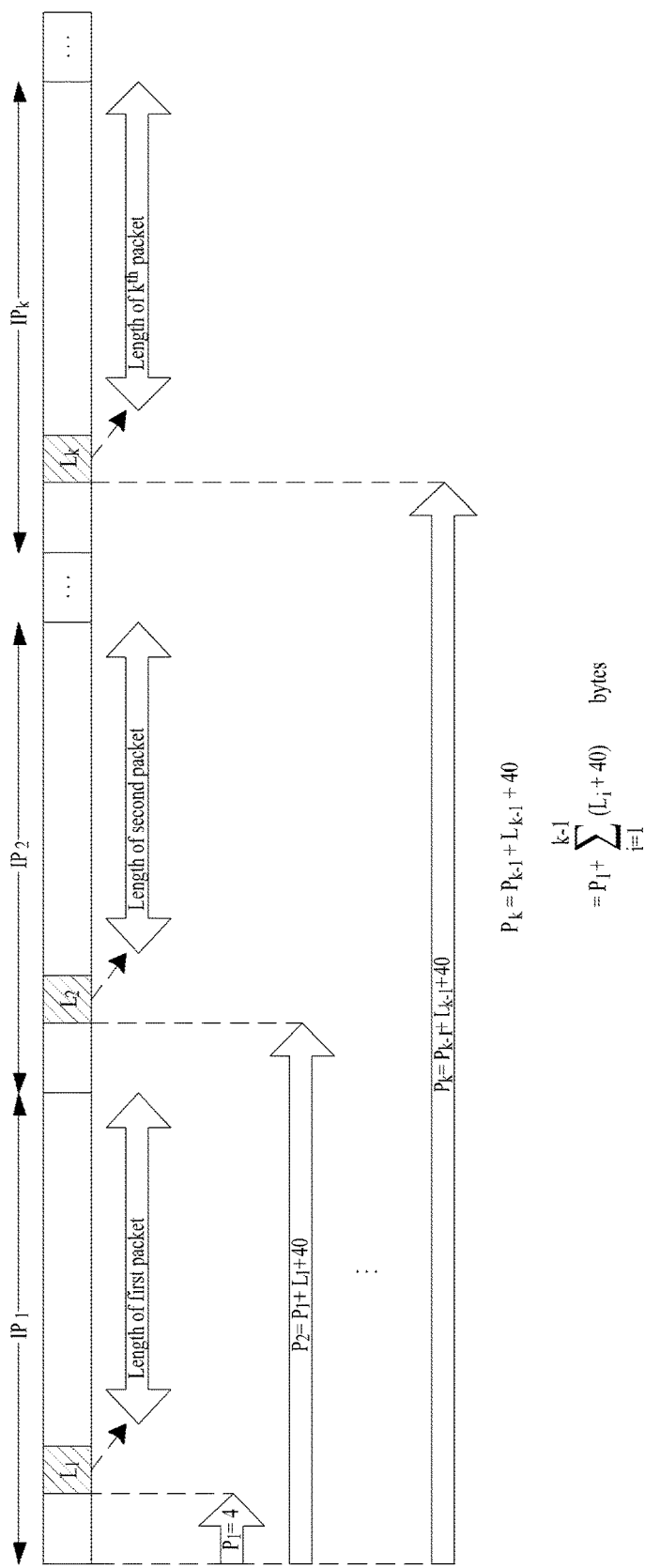
FIG. 12 is a diagram illustrating a procedure for calculating a length of a concatenated packet including an IPv6 packet and an equation for calculating an offset value in which a length field of an IP packet is positioned, according to an embodiment of the present invention.

FIG. 12 is a diagram illustrating a procedure for calculating a length of a concatenated packet including an IPv6 packet and an equation for calculating an offset value in which a length field of an IP packet is positioned, according to an embodiment of the present invention.

When the IPv6 packet is included in a payload of a link layer packet in a concatenated form, a procedure for obtaining a length of the payload will now be described. A length field contained in the IPv6 packet is length information about the payload of the IPv6 packet, and thus 40 bytes as a length of a fixed header of IPv6 may be added to the length of the payload of the IPv6 packet, indicated by the length field, to acquire the length of the IPv6 packet.

When n IP packets included in the payload of the concatenated packet are IP1, IP2, . . . , IPk, . . . , IPn, respectively, a length field corresponding to IPk may be positioned to be spaced apart from a start point of the payload of the concatenated packet by Pk bytes. Here, Pk ($1 \leq k \leq n$) may be an offset value in which the length field of a $k^{th}$ IP packet is positioned from the start point of the payload of the concatenated packet and may be calculated according to the shown equation. Here, in the case of IPv6, P1 may be 4 bytes. Accordingly, while P1 to Pk are sequentially updated, Lk corresponding thereto may be read and applied to the aforementioned equation of FIG. 10 so as to finally acquire a length of a concatenated packet.

Figure 13:
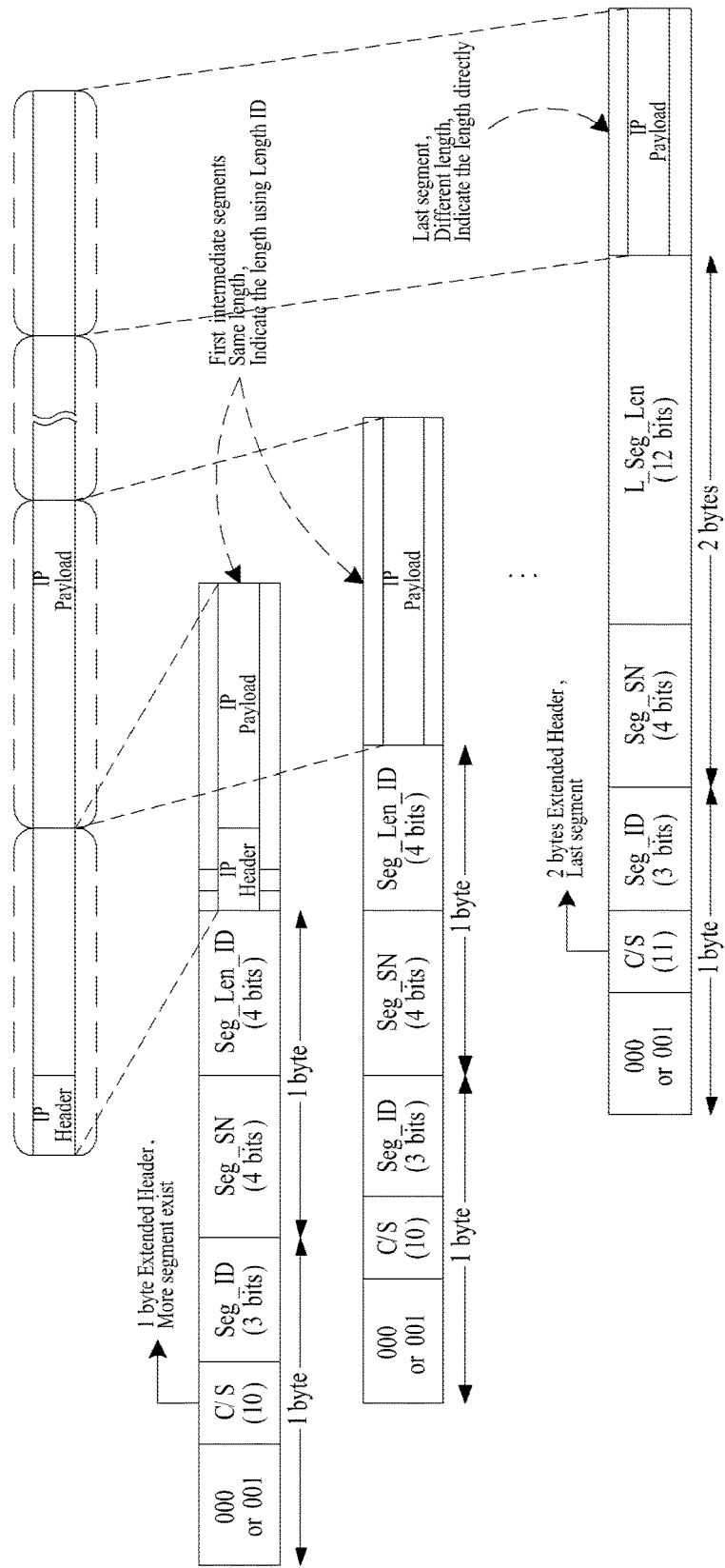
FIG. 13 is a diagram illustrating a procedure for encapsulating a segmented packet according to an embodiment of the present invention.

FIG. 13 is a diagram illustrating a procedure for encapsulating a segmented packet according to an embodiment of the present invention.

The following description may be applied to an IP packet of IPv4 or IPv6 in the same way. One IP packet may be segmented to payload of a plurality of link layer packets, a value of a packet type element may be 000B (IPv4) or 001B (IPv6), and a value of the C/S field may be 10B or 11B according to a configuration of a segment.

With regard to the C/S field, a C/S field value may be 11B only in a segment corresponding to a very last part of the IP packet and may be 10B in the all remaining segments. As described above, a value of the C/S field may indicate information about an extended header of a link layer packet. That is, when a value of the C/S field is 10B, the C/S field may have a header with a length of 2 bytes, and when a value of the C/S field is 11 B, the C/S field may have a header with a length of 3 bytes.

In order to indicate that link layer packets are segmented from the same IP packet, segment ID (Seg_ID) values included in headers of the respective link layer packets need to have the same value. In order to indicate sequence information of segments for recombination of a normal IP packet by a receiver, a Seg_SN value that is sequentially increased may be recorded in the headers of the respective link layer packets.

When an IP packet is segmented, a length of a segment may be determined and segmented may be performed with the same length, as described above. Then a Seg_Len_ID value corresponding to the corresponding length information may be recorded in a header. In this case, a length of a lastly positioned segment may be changed compared with a previous segment, and thus length information may be directly indicated using an L_Seg_Len field.

Length information indicated using a Seg_Len_ID field and a L_Seg_Len field may indicate only information about a segment, that is, a payload of a link layer packet, and thus the receiver may identify total length information of link layer packets by adding a header length of a link layer packet to a payload length of the link layer packet with reference to the C/S field.

Figure 14:
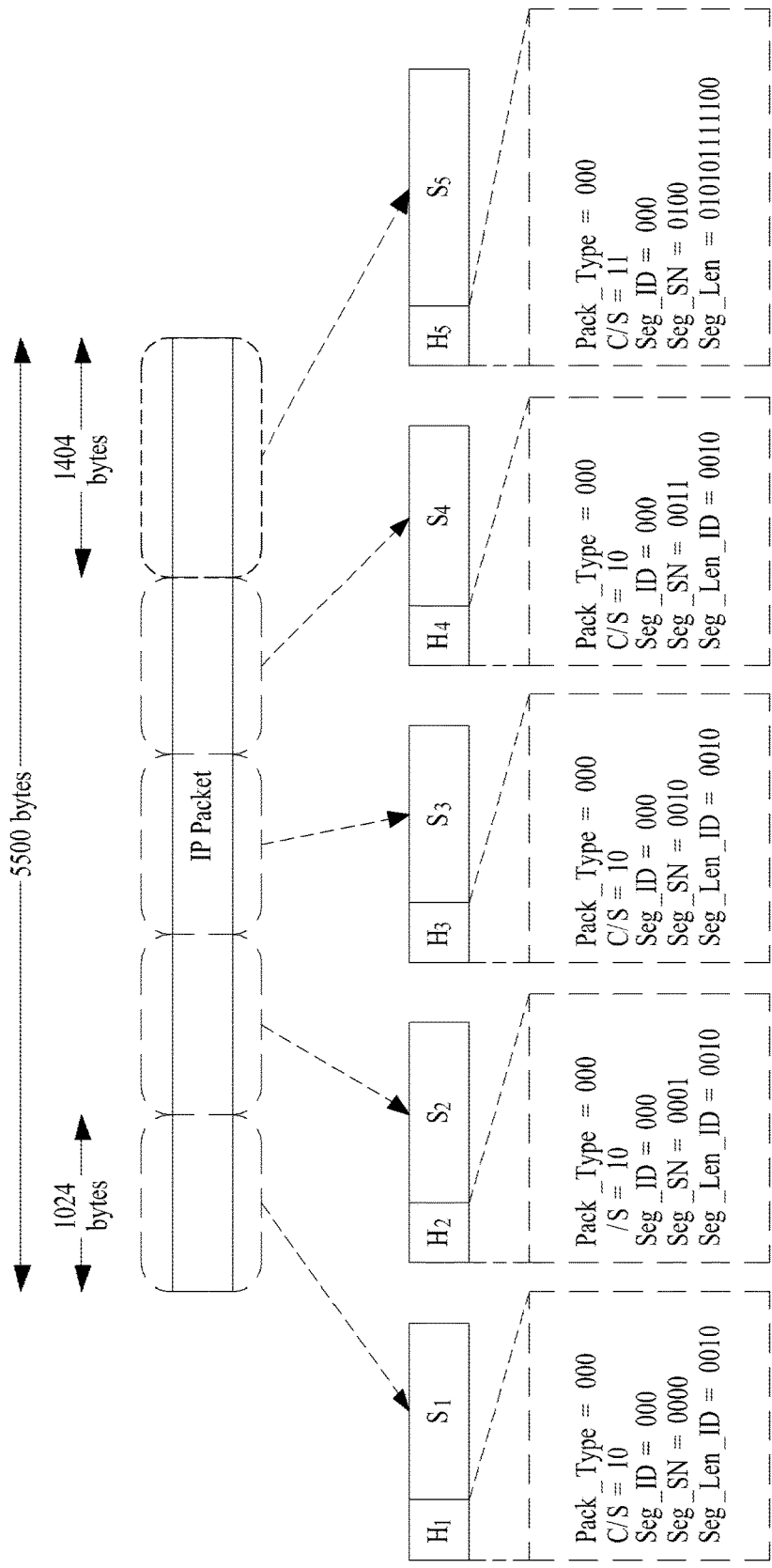
FIG. 14 is a diagram illustrating a procedure for segmenting an IP packet and header information of a link layer packet according to the method, according to an embodiment of the present invention.

FIG. 14 is a diagram illustrating a procedure for segmenting an IP packet and header information of a link layer packet according to the method, according to an embodiment of the present invention.

The diagram also illustrates a field value of a header of each link layer packet while the IP packet is segmented to be encapsulated as link layer packets.

For example, an IP packet of a length of 5500 bytes may be input to a link layer in an IP layer, the IP packet may be five segments S1, S2, S3, S4, and S5, and headers H1, H2, H3, H4, and H5 may be added to the segments SI, S2, S3, S4, and S5 to be encapsulated as respective link layer packets.

In the case of an IPv4 packet, a value of a packet type element may be determined as 000B. A C/S field value of H1 to H4 may be 10B and a C/S field value of H5 may be 11B. All segment IDs (Seg_IDs) indicating the same IP packet configuration may be 000B and Seg_SN fields may sequentially indicate 0000B to 0100B in H1 to H5.

Since a value obtained by dividing 5500 bytes by 5 is 1100 bytes, when a segment with a length of 1024 bytes closest to 1100 bytes is configured, a length of S5 as a last segment may be 1404 bytes (01010111100B). In this case, a Seg_Len_ID field may have a value of 0010B in the aforementioned example.

Figure 15:
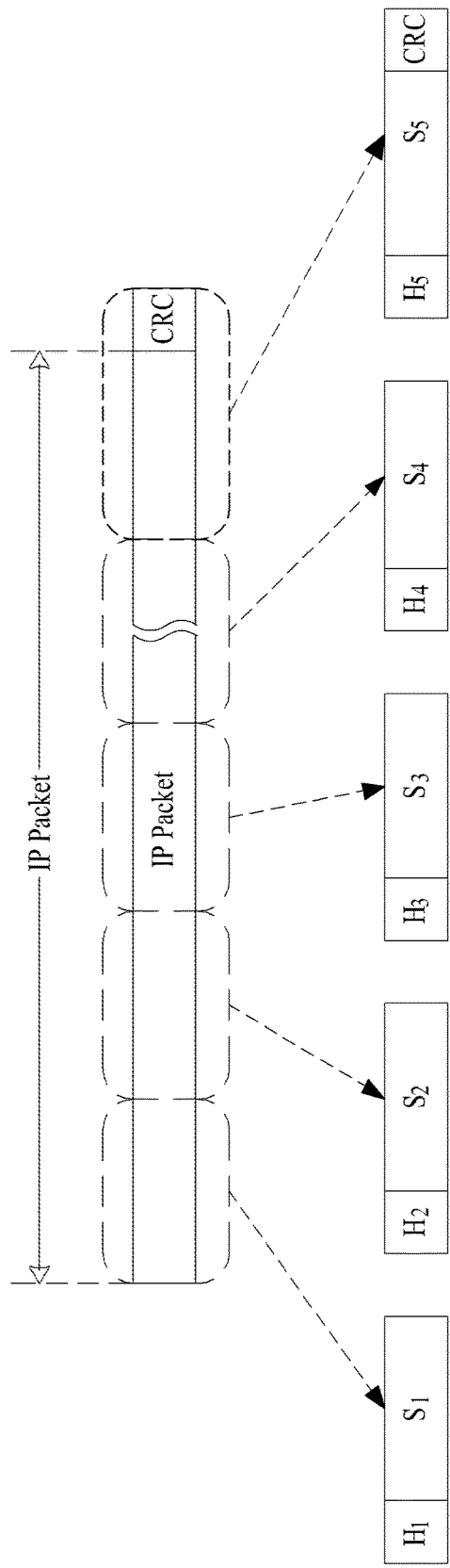
FIG. 15 is a diagram illustrating a procedure for segmenting an IP packet including cyclic redundancy check (CRC) according to an embodiment of the present invention.

FIG. 15 is a diagram illustrating a procedure for segmenting an IP packet including cyclic redundancy check (CRC) according to an embodiment of the present invention.

When an IP packet is segmented and transmitted to a receiver, a transmitter may attach CRC behind the IP packet such that the receiver checks integrity of combined packets. In general, the CRC may be attached to a last packet, and thus the CRC may be included in the last segment after a segmentation procedure.

When the receiver receives data that exceeds a length of the last segment, the receiver may recognize the data as CRC. In addition, the receiver may signal a length containing a length of the CRC as a length of the last segment.

Figure 16:
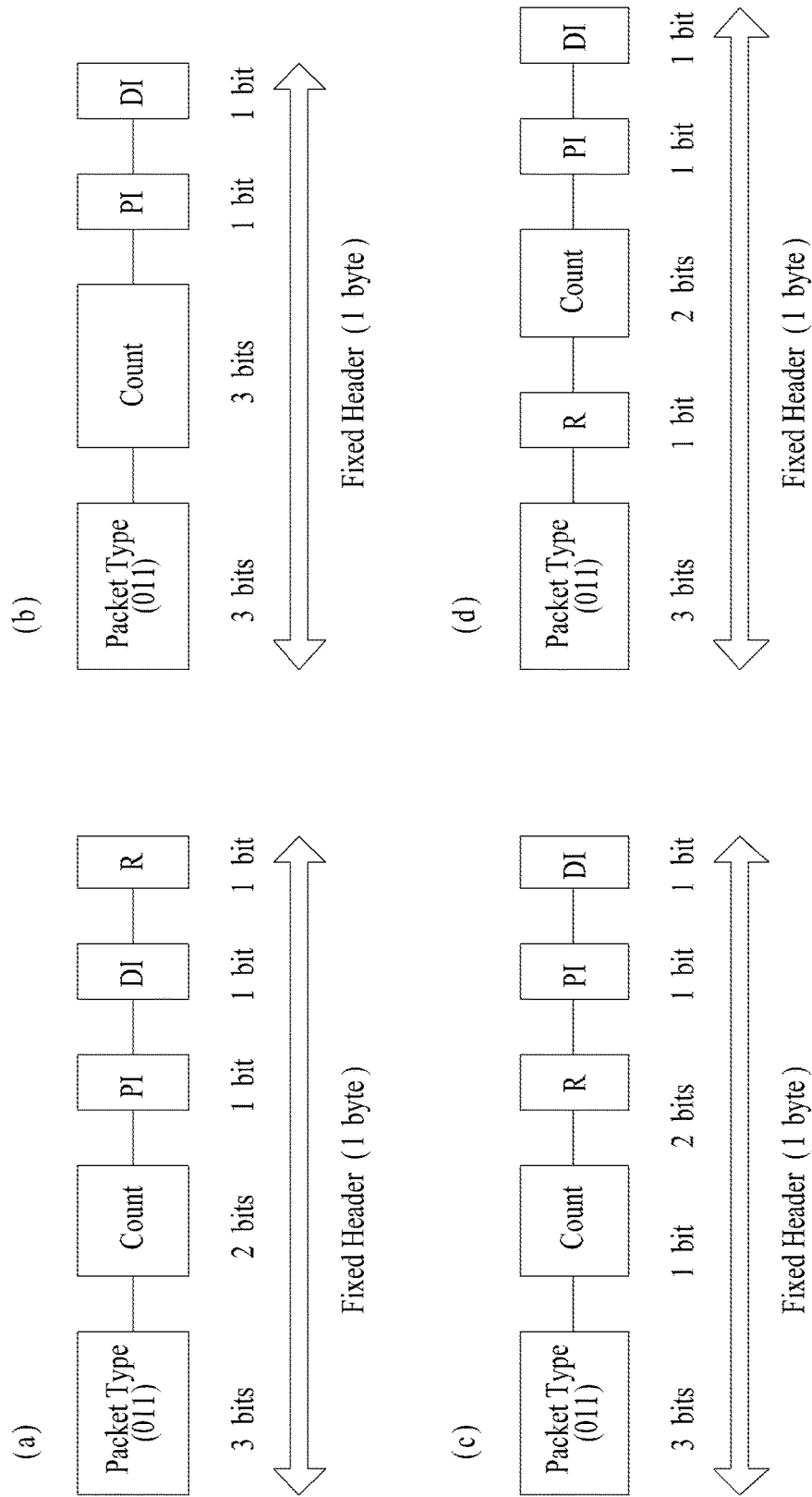
FIG. 16 is a diagram illustrating a header structure of a link layer packet when an MPEG-2 transport stream (TS) is input to a link layer, according to an embodiment of the present invention.

FIG. 16 is a diagram illustrating a header structure of a link layer packet when an MPEG-2 transport stream (TS) is input to a link layer, according to an embodiment of the present invention.

A packet type element may identify that an MPEG-2 TS packet is input to a link layer. For example, in this case, a value of the packet type element may be 011B.

The diagram illustrates a header structure of a link layer packet when the MPEG-2 TS is input. When the MPEG-2 TS packet is input to the link layer, a header of the link layer packet may include a packet type element, a count field, a PID indicator (P1) field, and/or a deleted null packet indicator (DI) field.

For example, a count field of 2 bits or 3 bits, a PID indicator (PI) field of 1 bit, and a deleted null packet indicator (DI) of 1 bit may be subsequent to a packet type element of a header of a link layer packet. When 2 bits are used as a count field, the remaining 1 bit may be reserved as a reserved field for other future use. According to apposition of the reserved field, a fixed header part may be configured with various structures as illustrated in FIGS. 16(a) to 16(d). Although the present invention is described in terms of a header illustrated in FIG. 16(a), the same description may also be applied to other types of headers.

When a MPEG-2 TS packet is input to a link layer, an extended header may not be used in packet type=011.

A count field may identify the number of MPEG-2 TS packets contained in a payload of a link layer packet. A size of one MPEG-2 TS packet is very small compared with an input size of low-density parity-check (LDPC) as an FEC scheme that is likely to be employed in a physical layer of a next-generation broadcasting system, and thus concatenation of MPEG-2 TS packets in a link layer may be basically considered. That is, one or more MPEG-2 TS packets may be contained in a payload of a link layer packet. However, the number of concatenated MPEG-2 TS packets may be limited to be identified as 2 bits or 3 bits. A length of a MPEG-2 TS packet has a predetermined size (e.g., 188 bytes), and thus a receiver can also infer a size of a payload of a link layer packet using a count field. An example for determining the number of MPEG-2 TS packets according to a count field value will be described later.

A common PID indicator (PI) field may be set to 1 when packet identifiers (PIDs) of MPEG-2 TS packets contained in a payload of one link layer packet are the same, and otherwise, the common PI field may be set to 0. The common PI field may have a 1 bit size.

A null packet deletion indicator (DI) field may be set to 1 when a null packet contained and transmitted in a MPEG-2 TS packet is deleted, and otherwise, the null packet DI may be set to 0. The null packet DI field may have a size of 1 bit. When a DI field is 1, the receiver may reuse some fields of the MPEG-2 TS packet in order to support null packet deletion in a link layer.

FIG. 17 is a diagram illustrating the number of MPEG-2 TS packets included in a payload of a link layer packet according to a value of a count field, according to an embodiment of the present invention.

When the count field is 2 btis, there may be 4 numbers of cases with respect to the number of concatenated MPEG-2 TS packets. The size of the payload of the link layer packet except for a sync byte (47H) may also be identified by the count field.

The number of MPEG-2 TS packets allocated according to the number of count fields may be changed according to a system designer.

Figure 18:
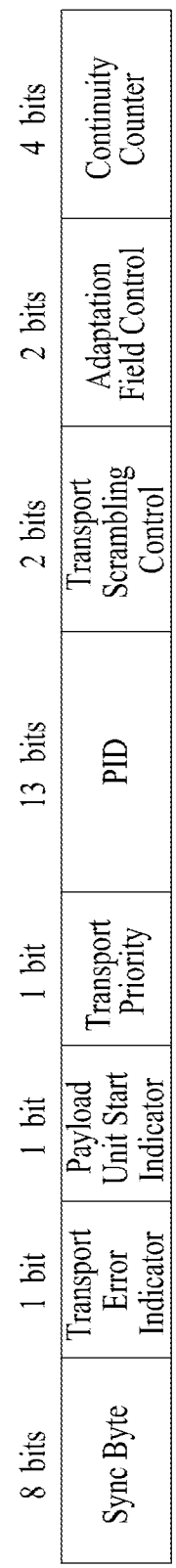
FIG. 18 is a diagram illustrating a header of an MPEG-2 TS packet according to an embodiment of the present invention.

FIG. 18 is a diagram illustrating a header of an MPEG-2 TS packet according to an embodiment of the present invention.

The header of the MPEG-2 TS packet may include a sync byte field, a transport error indicator field, a payload unit start indicator field, a transport priority field, a PID field, a transport scrambling control field, an adaptation field control field, and/or a continuity counter field.

The sync byte field may be used for packet synchronization and excluded during encapsulation in a link layer. A transport error indicator (EI) positioned immediately after the sync byte field may not be used by a transmitter, and when an unrestorable error occurs in the receiver, the transport EI may be used to indicate the error to a higher layer. Due to this purpose, the transport EI field may be a bit that is not used by the transmitter.

When error cannot be corrected in a stream, the transport EI field may be field that is set during a demodulation process and indicates that there is error that cannot be corrected in a packet.

The payload unit start indicator field may identify whether a packetized elementary stream (PES) or program-specific information (PSI) is started.

The transport priority field may identify whether a packet has higher priority than other packets having the same PID.

The PID field may identify a packet.

The transport scrambling control field may identify whether a scramble is used and/or whether a scramble is used using an odd numbered key or an even numbered key.

The adaptation field control field may identify whether an adaptation field is present.

The continuity counter field may indicate a sequence number of a payload packet.

Figure 19:
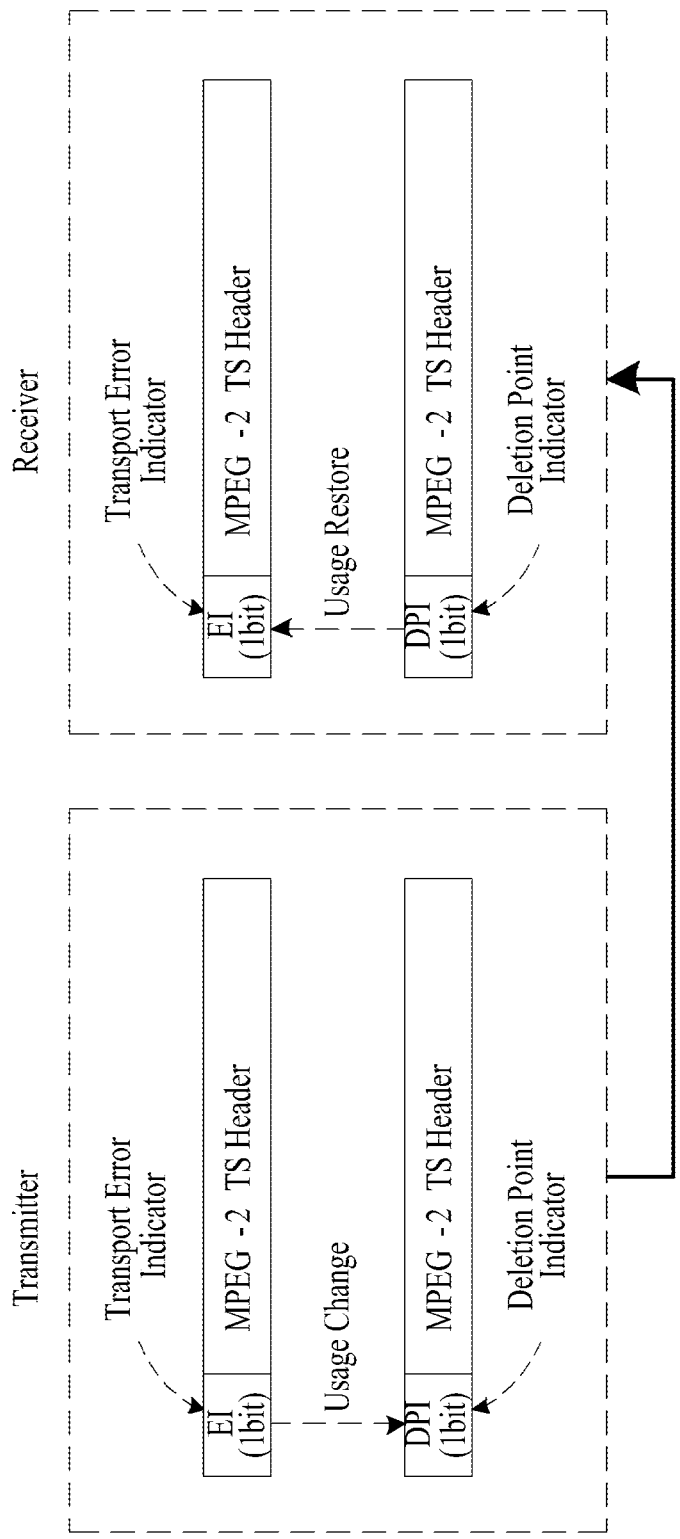
FIG. 19 is a diagram illustrating a procedure for changing use of a transport EI field by a transmitter according to an embodiment of the present invention.

FIG. 19 is a diagram illustrating a procedure for changing use of a transport EI field by a transmitter according to an embodiment of the present invention.

As illustrated, when a DI field is 1, a transport error indicator field may be changed to use of a deletion point indicator (DPI) field in a link layer of the transmitter.

The DPI field may be restored to the transport error indicator field after a null packet related processing is completed in the link layer of the receiver. That is, the DI field may be a field that simultaneously indicates whether use of the transport error indicator field is changed as well as whether a null packet is deleted.

Figure 20:
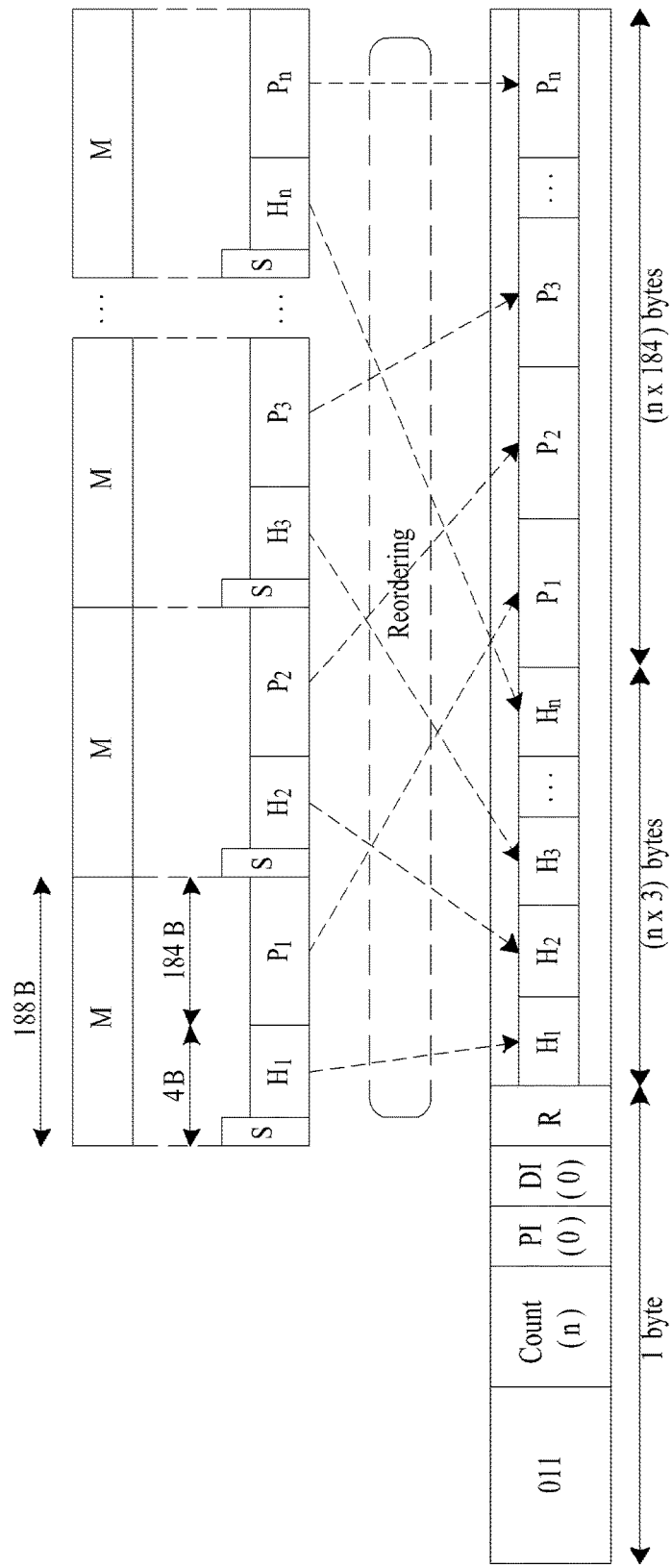
FIG. 20 is a diagram illustrating a procedure for encapsulating an MPEG-2 TS packet according to an embodiment of the present invention.

FIG. 20 is a diagram illustrating a procedure for encapsulating an MPEG-2 TS packet according to an embodiment of the present invention.

Basically, the MPEG-2 TS packet is concatenated, and thus a payload of one link layer packet may include a plurality of MPEG-2 TS packets, and the number of the MPEG-2 TS packets may be determined according to the aforementioned method. When the number of MPEG-2 TS packets included in a payload of one link layer packet is n, each MPEG-2 TS packet may be represented by Mk ($1 \leq k \leq n$).

The MPEG-2 TS packet may include a fixed header of 4 bytes and a payload of 184 bytes in general. 1 byte of a header of 4 bytes may be the sync byte that has the same value 47H. Accordingly, one MPEG-2 TS packet 'Mk' may include a sync part S of 1 byte, a fixed header part Hk of 3 bytes except for sync byte, and/or a payload part Pk of 184 bytes (here, $1 \leq k \leq n$).

When the adaptation field is used in a header of the MPEG-2 TS packet, the fixed header part may be included in a portion immediately in front of the adaptation field and the payload part may be included in the remaining adaptation part.

When n input MPEG-2 TS packets are [M1, M2, M3, . . . , Mn], the input MPEG-2 TS packets may have arrangement of [S, H1, P1, S, H2, P2, . . . , S, Hn, Pn]. The sync part may always have the same value, and in this regard, even if the transmitter does not transmit the sync part, the receiver may find a corresponding position in the receiver and re-insert the sync part into the corresponding position. Accordingly, when a payload of a link layer packet is configured, the synch part may be excluded to reduce the size of a packet. When a combination of an MPEG-2 TS packet having the arrangement is configured with a payload of a link layer packet, a header part and a payload part may be segmented with [H1, H2, . . . , Hn, P1, P2, . . . , Pn].

When a PI field value is 0, and a DI field value is 0, a length of a payload of a link layer packet is (n×3)+(n×184) bytes, and when 1 byte of a header length of the link layer packet is added, a total link layer packet length may be obtained. That is, the receiver may identify a length of a link layer packet through this procedure.

Figure 21:
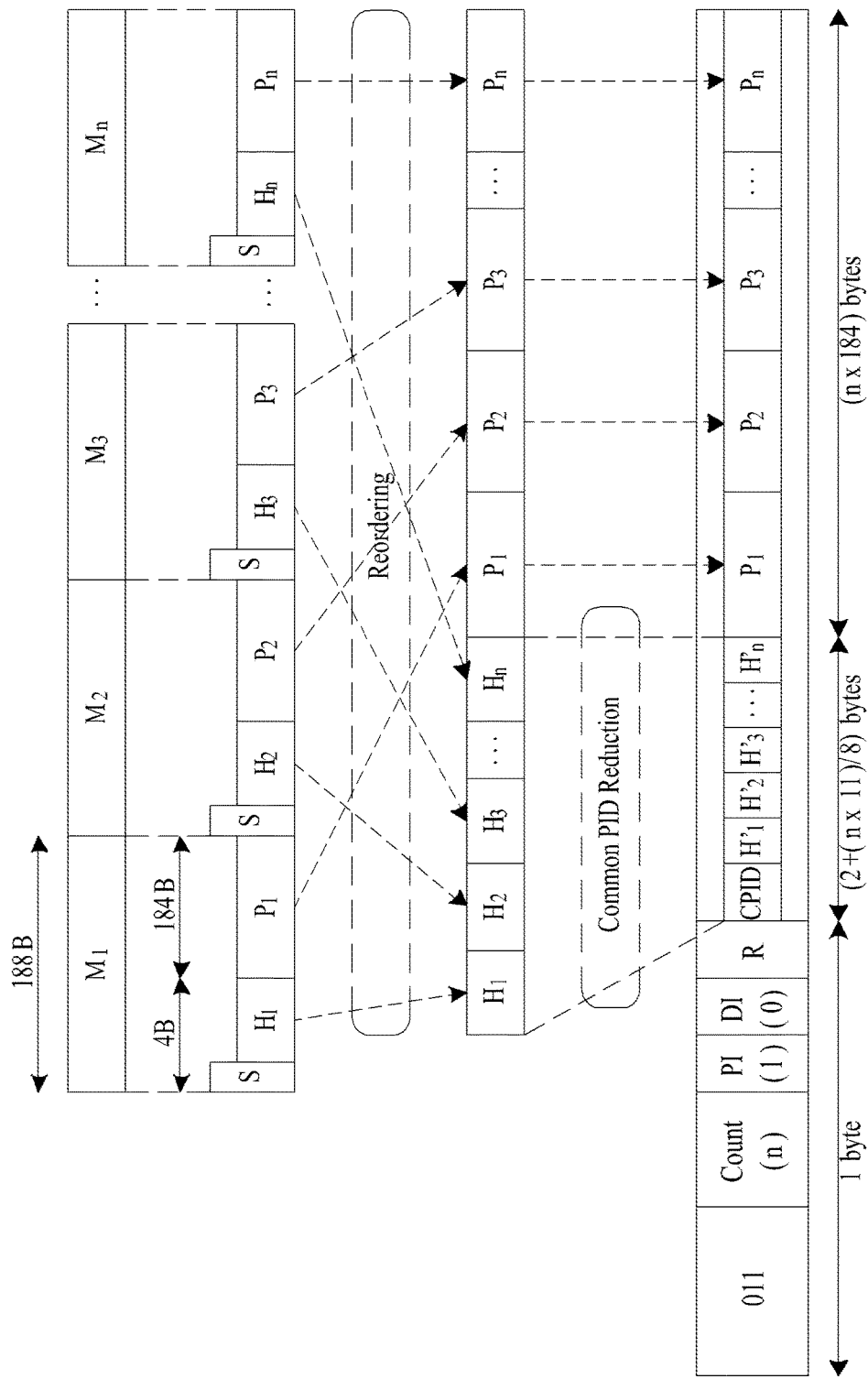
FIG. 21 is a diagram illustrating a procedure for encapsulating MPEG-2 TS packets having the same PIDs, according to an embodiment of the present invention.

FIG. 21 is a diagram illustrating a procedure for encapsulating MPEG-2 TS packets having the same PIDs, according to an embodiment of the present invention.

When broadcasting data is continuously streamed, PID values of MPEG-2 TSs included in one link layer packet may be the same. In this case, repeated PID values may be simultaneously marked so as to reduce a size of a link layer packet. In this case, a PID indicator (PI) field in a header of a link layer packet may be used.

A common PID indicator (PI) value of the header of the link layer packet may be set to 1. As described above, in the payload of the link layer packet, n input MPEG-2 TS packets [M1, M2, M3, . . . , Mn] may be arranged in [H1, H2, . . . , Hn, P1, P2, . . . , Pn] by excluding the sync part and segmenting a header part and a payload part. Here, the case in which a header part [H1, H2, . . . , Hn] of the MPEG-2 TS has the same PID, and thus even if a PID is marked only once, the receiver may restore the PID to an original header. When a common PID is a common PID (CPID) and a header obtained by excluding PID from a header Hk of the MPEG-2 TS packet is H'k ($1 \leq k \leq n$), a header part [H, H2, . . . , Hn] of the MPEG-2 TS included in a payload of a link layer packet is reconfigured as [CPID, H'1, H'2, . . . , H'n]. This procedure may be referred to as common PID reduction.

Figure 22:
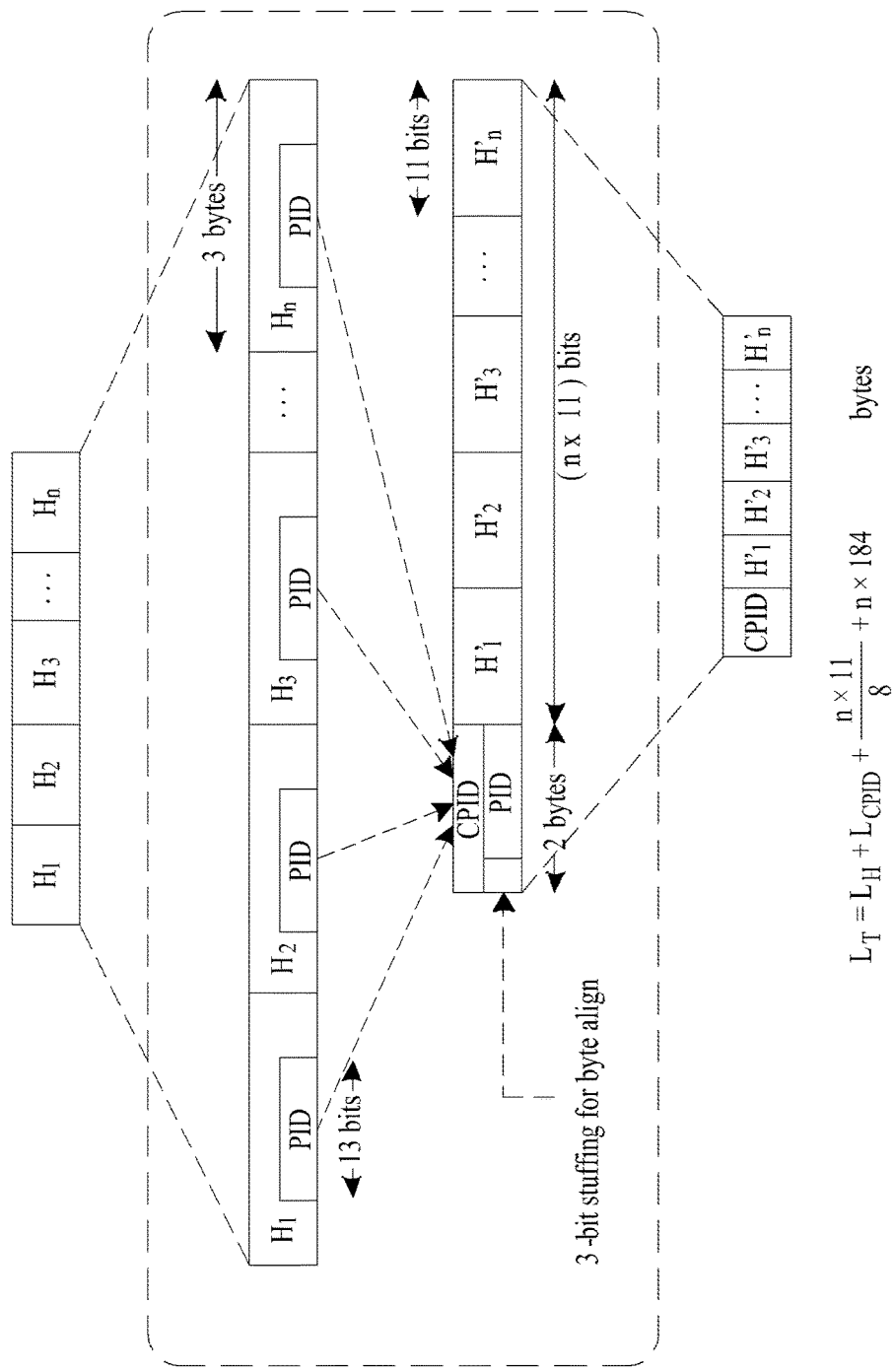
FIG. 22 is a diagram illustrating an equation for obtaining a length of a link layer packet during a common PID reduction procedure and a common PID reduction procedure, according to an embodiment of the present invention.

FIG. 22 is a diagram illustrating an equation for obtaining a length of a link layer packet during a common PID reduction procedure and a common PID reduction procedure, according to an embodiment of the present invention.

A header part of a MPEG-2 TS packet may include a PID with a size of 13 bits. When MPEG-2 TS packets included in a payload of a link layer packet have the same PID value, PIDs may be repeated by as much as the number of concatenated packets. Accordingly, a PID part may be excluded from a header part [H1, H2, . . . , Hn] of an original MPEG-2 TS packet to reconfigure [H'1, H'2, . . . , H'n], a value of the common PID may be set to a value of a common PID (CPID), and then the CIPD may be positioned in front of the reconfigured header part.

The PID value may have a length of 13 bits, and a stuffing bit may be added in order to form all packets in the form of a byte unit. The stuffing bit may be positioned in front of or behind the CPID and may be appropriately arranged according to a configuration of other concatenated protocol layers or embodiments of a system.

In the case of encapsulation of MPEG-2 TS packets having the same PID, the PID may be excluded from the header part of the MPEG-2 TS packet and an encapsulation procedure is performed, and thus the length of a payload of a link layer packet may be obtained as follows.

As illustrated, a header of a MPEG-2 TS packet obtained by excluding the sync byte may have a length of 3 bytes, and when a PID part of 13 bits may be excluded from the header of the MPEG-2 TS packet, the header of the MPEG-2 TS packet may be 11 bits. Accordingly, when n packets are concatenated, the packets have (n×11) bits, and when the number of concatenated packets is set to a multiple of 8, (n×11) bits may be a length of a byte unit. Here, a stuffing bit with a length of 3 bits may be added to 13 bits as a common PID length to configure a CPID part with a length of 2 bytes.

Accordingly, in the case of a link layer packet formed by encapsulating n MPEG-2 TS packets having the same PID, when a header length of a link layer packet is LH, a length of a CPID part is LCPID, and a total length of a link layer packet is LT, LT may be obtained according to the shown equation.

In the embodiment illustrated in FIG. 21, LH may be 1 byte and LCPID may be 2 bytes.

FIG. 23 is a diagram illustrating the number of concatenated MPEG-2 TS packets according to a value of a count field and a length of a link layer packet according to the number when common PID reduction is applied, according to an embodiment of the present invention.

When the number of the concatenated MPEG-2 TS packets are determined, if all packets have the same PID, the aforementioned common PID reduction procedure may be applied, and the receiver may acquire a length of a link layer packet according to the equation described in relation to the procedure.

Figure 24:
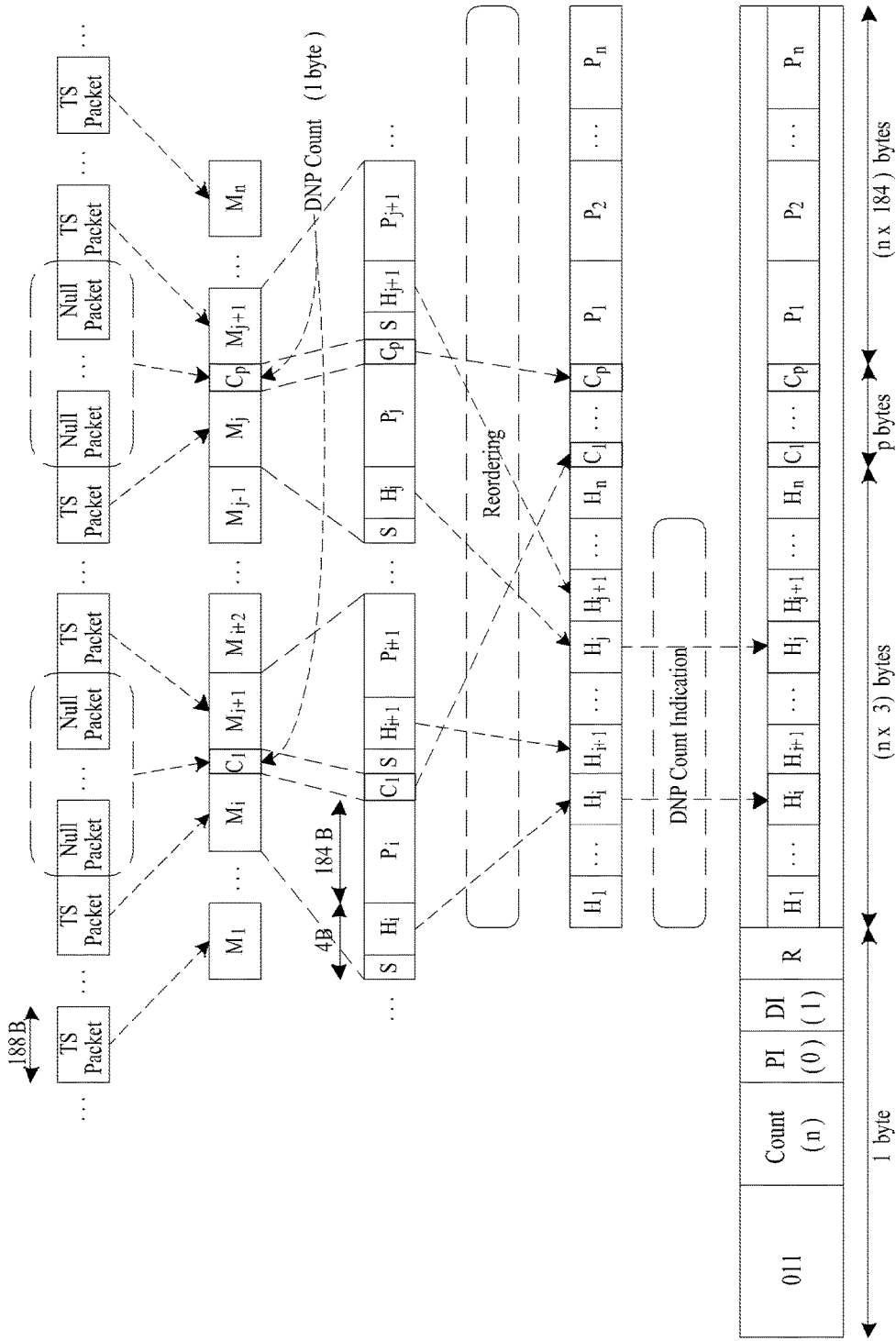
FIG. 24 is a diagram illustrating a method for encapsulating an MPEG-2 TS packet including a null packet, according to an embodiment of the present invention.

FIG. 24 is a diagram illustrating a method for encapsulating an MPEG-2 TS packet including a null packet, according to an embodiment of the present invention.

During transmission of the MPEG-2 TS packet, the null packet may be included in a transport stream for adjustment to a fixed transfer rate. The null packet is an overhead part in terms of transmission, and thus even if a transmitter does not transmit the null packet, a receiver may restore the null packet. In order to delete and transmit the null packet by the transmitter and find and restore the number and position of the deleted packets by the receiver, a null packet deletion indicator (DI) field in the header of the link layer packet may be used. In this case, a value of the null packet deletion indictor (DI) of the header of the link layer packet may be set to 1.

Encapsulation when a null packet is positioned at an arbitrary point between input transport streams may be performed by sequentially concatenating n packets except for the null packet. The number of counted null packets that are continuously excluded may be contained in a payload of a link layer packet, and the receiver may generate and fill a null packet in an original position based on the count value.

When n MPEG-2 TS packets except for the null packet is [M1, M2, M3, . . . , Mn], the null packet may be positioned at any position between M1 to Mn. One link layer packet may include a counted number of null packets with a number of times of 0 to n. That is, when a number of times that null packets are counted in one link layer packet is p, a range of p may be 0 to n.

When a count value of null packets is Cm, a range of m may be 1≤m≤p, and when p=0, Cm is not present. As described above, MPEG-2 TS packets between which Cm is positioned may be indicated using a field in a header of the MPEG-2 TS packet, in which use of a transport error indicator (EI) is changed to a deletion point indicator (DPI).

The present invention proposes a case in which Cm has a length of 1 byte and also considers a case in which Cm is extended when there is a margin for a length of a packet for future use. Cm of I-byte length may count a maximum of 256 null packets. A field that functions as an indicator of a null packet is positioned in a header of a MPEG-2 TS packet, and thus calculation may be performed by excluding null packets by as much as a value obtained by adding 1 to a value indicated by Cm. For example, in the case of Cm=0, one null packet may be excluded, and in the case of Cm=123, 124 null packets may be excluded. When continuous null packets exceed 256, a 257$^{th}$ null packet may be processed as a normal packet, and next null packets may be processed as null packets using the aforementioned method.

As illustrated, when null packets may be positioned between MPEG-2 TS packets corresponding to Mi and Mi+1, a counted number of the null packets is C1, and when a null packet is positioned between MPEG-2 TS packets corresponding to Mj and Mj+1, a counted number of the null packets is Cp, and in this case, an actual transmission sequence may be [ . . . , Mi, C1, Mi+1, . . . , Mj, Cp, Mj+1, . . . ].

In a procedure for segmenting and reordering a header part and a payload part of an MPEG-2 TS packet instead of a null packet in order to configure a payload of a link layer packet, a count value Cm (1≤m≤p) of null packets may be disposed between the header part and the payload of the MPEG-2 TS packet. That is, the payload of the link layer packet may be disposed like [H1, H2, . . . . Hn, C1, . . . , Cp, P1, P2, . . . , Pn], and a receiver may sequentially check a count value on a byte-by-byte basis at an order indicated in a DPI field of Hk and restore a null packet at an original order of an MPEG-2 TS packet by as much as the count value.

Figure 25:
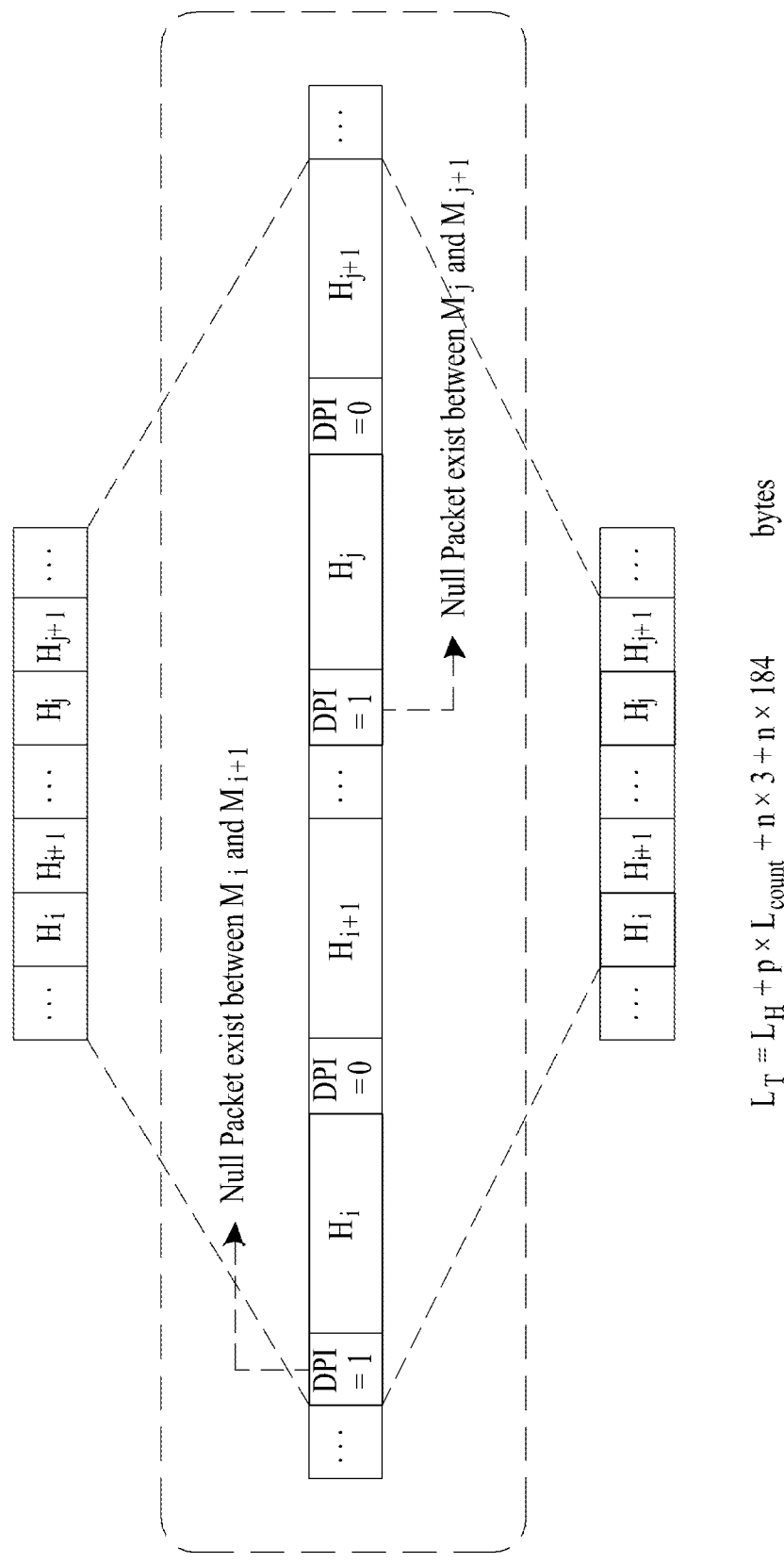
FIG. 25 is a diagram illustrating a procedure for processing an indicator for counting deleted null packets and an equation for obtaining a length of a link layer packet during the procedure, according to an embodiment of the present invention.

FIG. 25 is a diagram illustrating a procedure for processing an indicator for counting deleted null packets and an equation for obtaining a length of a link layer packet during the procedure, according to an embodiment of the present invention.

A value of a DPI field may be set to indicate that null packets are deleted and a count value of the deleted null packets is present. As illustrated, when a value of a DPI field in Hi of a header of a plurality of MPEG-2 TS packets is 1, this may indicate that the MPEG-2 TS packets are encapsulated by excluding an null packet between Hi and Hi+1 and 1-byte count value according thereto is positioned between a header part and a payload part.

During this procedure, a length of a link layer packet may be calculated according to the shown equation. Accordingly, in the case of a link layer packet obtained by encapsulating n MPEG-2 TS packets from which a null packet is excluded, when a header length of the link layer packet is LH, a length of a count value Cm (1≤m≤p) of a null packet is LCount, and a total length of the link layer packet is LT, LT may be acquired according to the shown equation.

Figure 26:
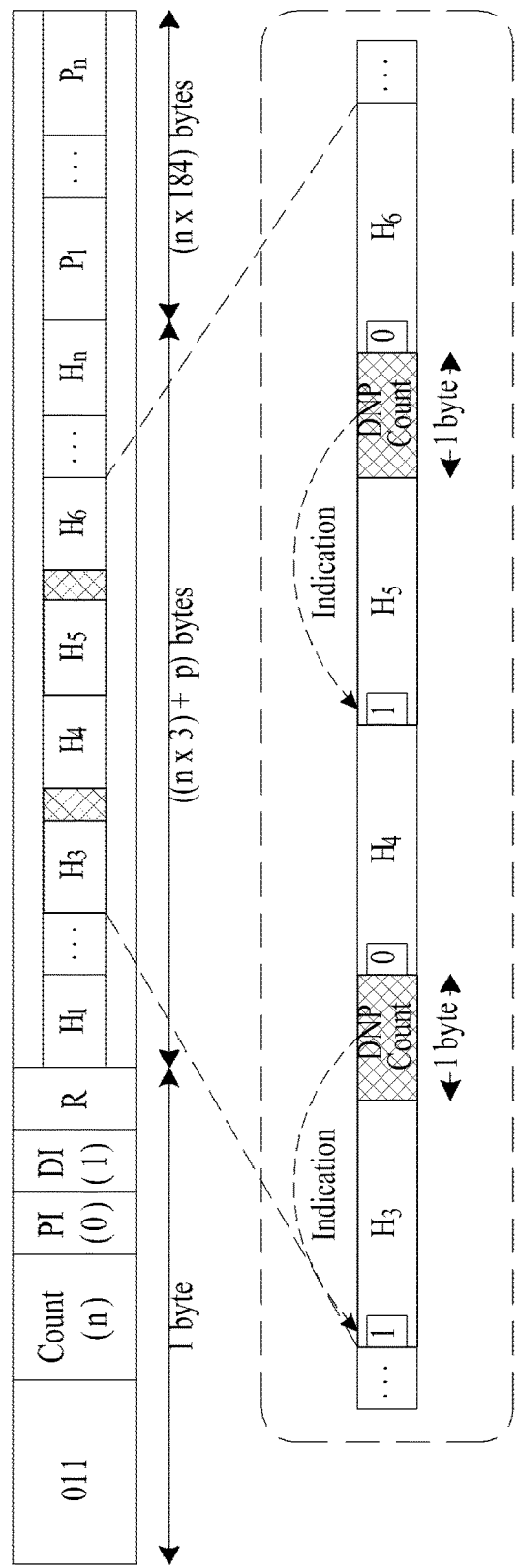
FIG. 26 is a diagram illustrating a procedure for encapsulating an MPEG-2 TS packet including a null packet, according to another embodiment of the present invention.

FIG. 26 is a diagram illustrating a procedure for encapsulating an MPEG-2 TS packet including a null packet, according to another embodiment of the present invention.

Another encapsulation method for excluding a null packet, a payload of a link layer packet may be configured. According to another embodiment of the present invention, in a procedure for segmenting and reordering a header part and a payload part of a MPEG-2 TS packet in order to configure a payload of a link layer packet, a count value Cm (1≤m≤p) of null packets may be positioned in a header part and an order of the null packets may be maintained. That is, a header of each MPEG-2 TS may include a count value of null packets at a point in which a header ends. Accordingly, upon reading a value of a DPI field contained in a header of each MPEG-2 TS and determining that the null packets are deleted, the receiver may read a count value contained in a last part of the corresponding header, regenerate null packets by as much as the corresponding count value, and contain the null packets in a stream.

Figure 27:
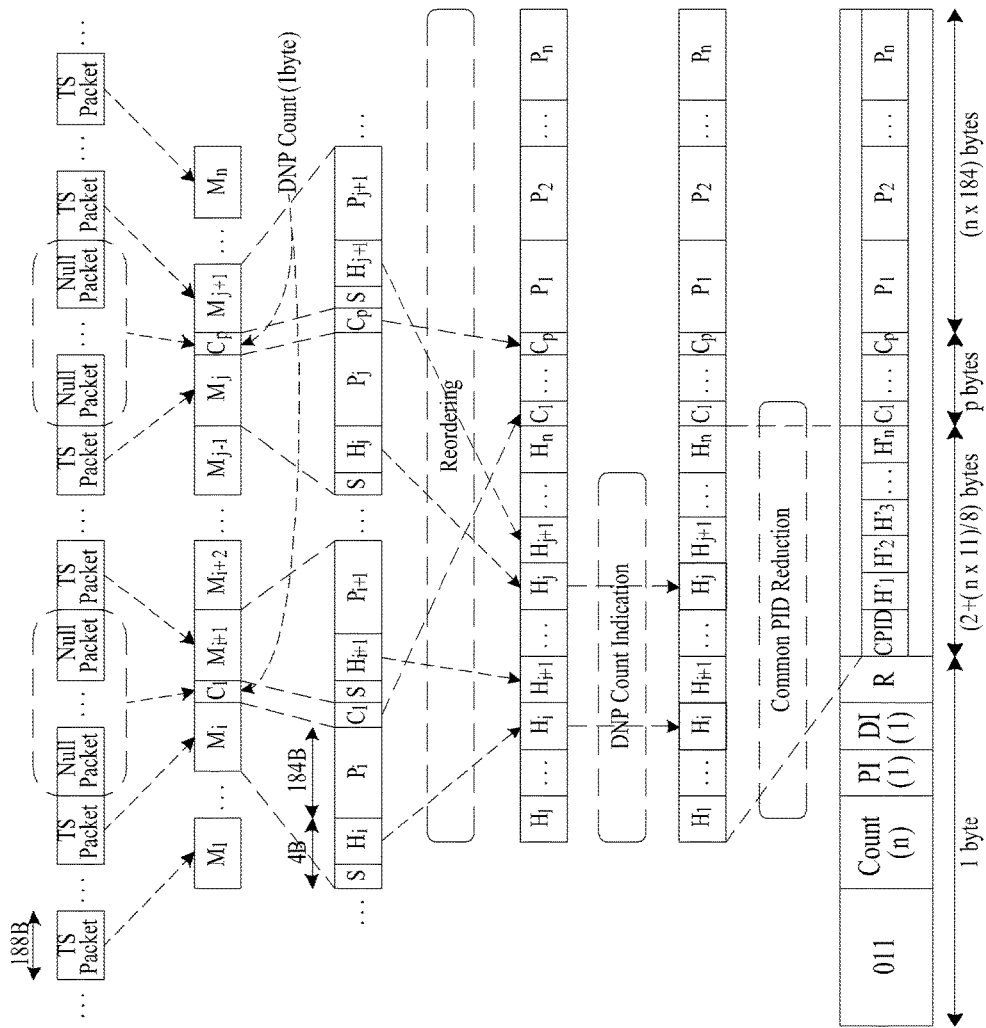
FIG. 27 is a diagram illustrating a procedure for encapsulating MPEG-2 TS packets including the same packet identifier (PID) in a stream including a null packet, according to an embodiment of the present invention.

FIG. 27 is a diagram illustrating a procedure for encapsulating MPEG-2 TS packets including the same packet identifier (PID) in a stream including a null packet, according to an embodiment of the present invention.

According to an embodiment of the present invention, in a stream including null packets, a procedure for encapsulating MPEG-2 TS packets including the same packet identifier (PID) may be performed by combining a procedure for encapsulating a link layer packet by excluding the aforementioned null packet and a procedure for encapsulating MPEG-2 TS packets having the same PID as a link layer packet.

Since null packets are allocated separate PIDs indicating the respective null packet, when the null packet are contained in an actual transport stream, the null packets are not processed with the same PID. However, after a procedure for excluding a null packet is performed, since only a count value of null packets is contained in a payload of a link layer packet, the remaining n MPEG-2 TS packets have the same PID, and thus the null packets may be processed using the aforementioned method.

FIG. 28 is a diagram illustrating an equation for obtaining a length of a link layer packet while MPEG-2 TS packets including the same packet identifier (PID) are encapsulated in a stream including a null packet, according to an embodiment of the present invention.

While MPEG-2 TS packets including the same packet identifier (PID) are encapsulated in a stream including null packets, a length of a link layer packet may be derived according to the equation of FIGS. 22 and/or 25. This may be summarized to obtain the illustrated equation.

Figure 29:
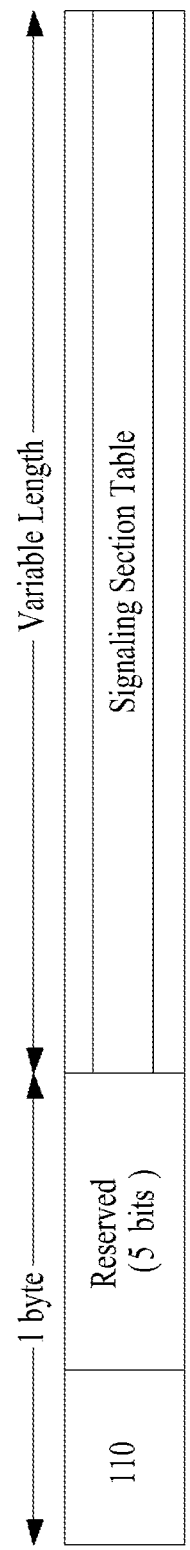
FIG. 29 is a diagram illustrating a configuration of a link layer packet for signaling transmission, according to an embodiment of the present invention.

FIG. 29 is a diagram illustrating a configuration of a link layer packet for signaling transmission, according to an embodiment of the present invention.

In order to transmit signaling information as well as information about update of IP header encapsulation information and broadcasting channel scan information prior to reception of an IP packet or an MPEG-2 TS packet by a receiver, the present invention proposes a packet form for transmitting signaling (e.g., signaling data) to a link layer.

According to an embodiment of the present invention, when a value of a packet type element included in a header of a link layer packet is '110B', a section table (or a descriptor) for signaling may be contained and transmitted in a payload of a link layer packet. The signaling section table may include a signaling table/table section included in DVB-service information (SI), PSI/PSIP, non real time (NRT), ATSC 2.0, and mobile/handheld (MH), which are conventionally present.

Figure 30:
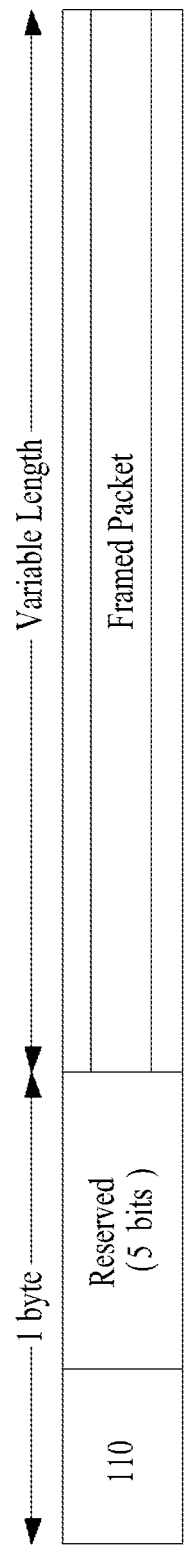
FIG. 30 is a diagram illustrating a configuration of a link layer packet for transmission of a framed packet, according to an embodiment of the present invention.

FIG. 30 is a diagram illustrating a configuration of a link layer packet for transmission of a framed packet, according to an embodiment of the present invention.

A packet used in a general network other than an IP packet or an MPEG-2 TS packet may be transmitted through a link layer packet. In this case, a packet type element of a header of a link layer packet may have a value of '111 B', and the value may indicate that a framed packet is included in a payload of a link layer packet.

FIG. 31 is a diagram illustrating syntax of a framed packet, according to an embodiment of the present invention.

The syntax of the framed packet may include ethernet_type, length, and/or packet( ) fields. The ethernet_type field of 16 bits may identify a type of a packet in the packet( ) field according to an IANA registry. Here, only the registered values may be used. The length field of 16 bits may set a total length of a packet( ) configuration in a byte unit. The packet( ) field with a variable length may include a network packet.

Figure 32:
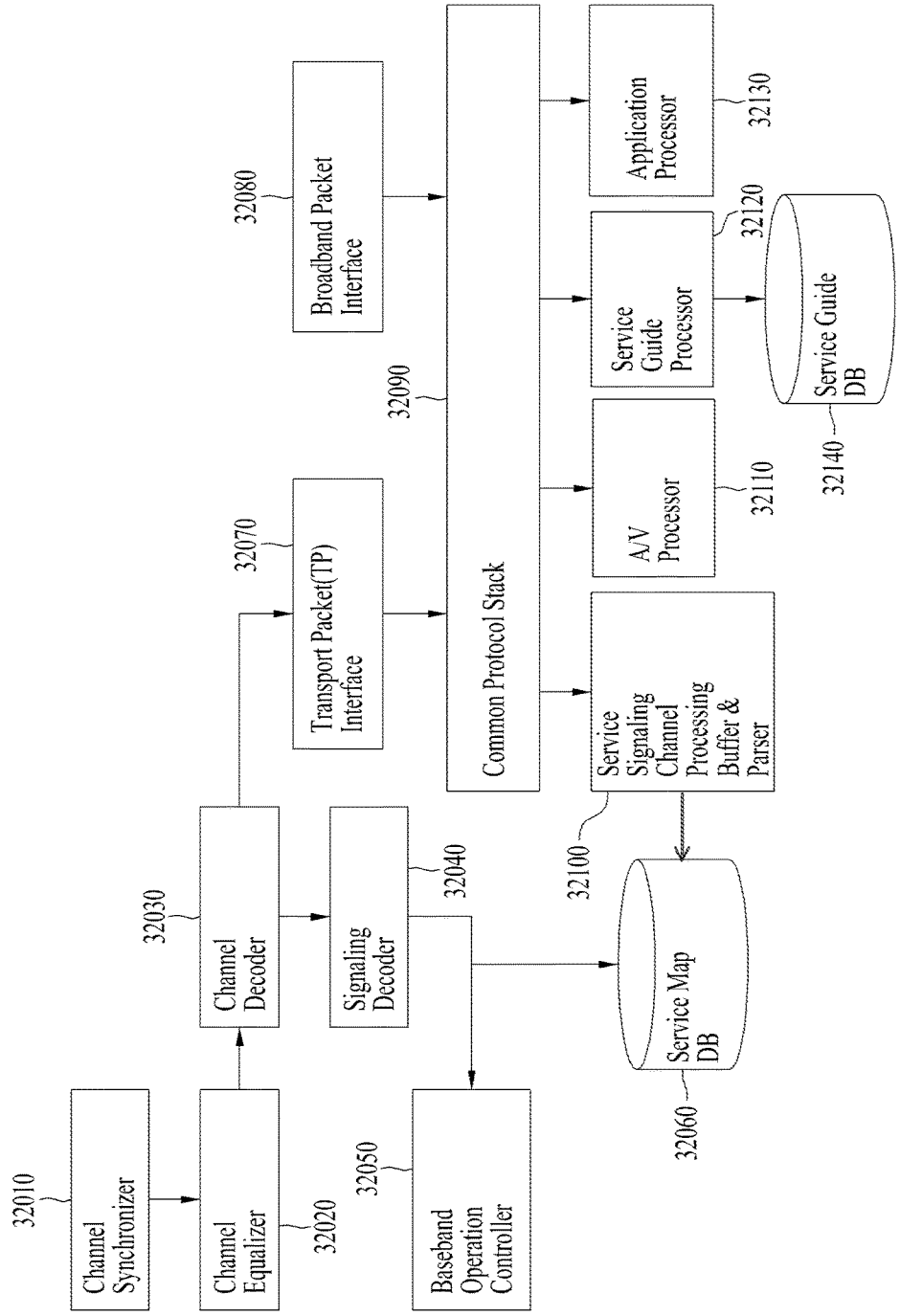
FIG. 32 is a diagram illustrating a receiver of a next-generation broadcast system, according to an embodiment of the present invention.

FIG. 32 is a diagram illustrating a receiver of a next-generation broadcast system, according to an embodiment of the present invention.

The receiver according to an embodiment of the present invention may include a receiving unit (not shown), a channel synchronizer 32010, a channel equalizer 32020, a channel decoder 32030, a signaling decoder 32040, a baseband operation controller 32050, a service map database (DB) 32060, a transport packet interface 32070, a broadband packet interface 32080, a common protocol stack processor 32090, a service signaling channel processing buffer & parser 32100, an audio/video (A/V) processor 32110, a service guide processor 32120, an application processor 32130, and/or a service guide DB 32140.

The receiver (not shown) may receive a broadcast signal.

The channel synchronizer 32010 may synchronize a symbol frequency and timing so as to decode a signal received in a baseband. Here, the baseband may refer to a region in which a broadcast signal is transmitted and received.

The channel equalizer 32020 may perform channel equalization on a received signal. The channel equalizer 32020 may compensate for the received signal when the received signal is distorted due to a multipath, the Doppler Effect, and so on.

The channel decoder 32030 may restore the received signal to a transport frame having meaning. The channel decoder 32030 may perform forward error detection (FEC) on data or a transport frame contained in the received signal.

The signaling decoder 32040 may extract and decode signaling data contained in the received signal. Here, the signaling data may include signaling data and/or service information (SI), which will be described later.

The baseband operation controller 32050 may control signal processing in a baseband.

The service map DB 32060 may store signaling data and/or service information. The service map DB 32060 may store signaling data contained and transmitted in a broadcast signal and/or signaling data contained and transmitted in a broadband packet.

The transport packet interface 32070 may extract a transport packet from a transport frame or a broadcast signal. The transport packet interface 32070 may extract signaling data or IP datagram from the transport packet.

The broadband packet interface 32080 may receive a broadcast related packet through the Internet. The broadband packet interface 32080 may extract a packet acquired through the Internet and combine or extract signaling data or A/V data from the corresponding packet.

The common protocol stack processor 32090 may process a received packet according to a protocol contained in a protocol stack. For example, the common protocol stack processor 32090 may perform processing in each protocol to process the received packet using the aforementioned method.

The service signaling channel processing buffer & parser 32100 may extract signaling data contained in the received packet. The service signaling channel processing buffer & parser 32100 may extract signaling information associated with scan and/or acquisition of a service and/or content from IP datagram and so on and may parse the signaling information. Signaling data in the received packet may be present in a predetermined position or channel. The position or channel may be referred to as a service signaling channel. For example, the service signaling channel may have a specific IP address, a UDP Port number, a transport session identifier, and so on. The receiver may recognize data transmitted with the specific IP address, the UDP Port number, the transport session, and so on as signaling data.

The A/V processor 32110 may perform decoding and presentation processing on received and video data.

The service guide processor 32120 may extract announcement information from the received signal, manage the service guide DB 32140, and provide a service guide.

The application processor 32130 may extract application data and/or application related information contained in the received packet and process the application data and/or application related information.

The service guide DB 32140 may store service guide data.

FIG. 33 is a diagram illustrating normal format of a section table, according to an embodiment of the present invention.

According to an embodiment of the present invention, the section table may include a table_id field, a section_syntax_indicator field, a section_length field, a version_number field, a current_next indicator field, a section_number field, a last_section_number field, and/or a section data field.

The table_id field may indicate a unique ID value of a corresponding table.

The section_syntax_indicator field may indicate a format of a table section subsequent to a corresponding field. When a value of the corresponding field is 0, the value may indicate that a corresponding table section is a short format. When a value of the corresponding field is 1, the corresponding table section follows a normal long format. According to an embodiment of the present invention, a corresponding field value may always have a fixed value 1.

The section_length field may indicate a length of a corresponding section. A length to a last part of the corresponding section from a next field of the corresponding field may be indicated in a byte unit.

The version_number field may indicate a version of a corresponding table.

When a value of the current_next_indicator field is 1, the value may indicate that a corresponding section table is effective, and when the value is 0, the value may indicate that a section table for next transmission is effective.

The section_number field may indicate a number of a section included in the corresponding table. In the case of a first section contained in the corresponding table, a value of the section_number field may be 0 and may be gradually increased.

The last_section_number field may refer to a number of a last section among sections included in a corresponding table.

The section data field may include data including a corresponding section.

In the drawing, a field denoted by Specific Use may refer to a field that is differently configured according to each table. A bit number allocated to the field denoted by Specific Use may be maintained.

Figure 34:
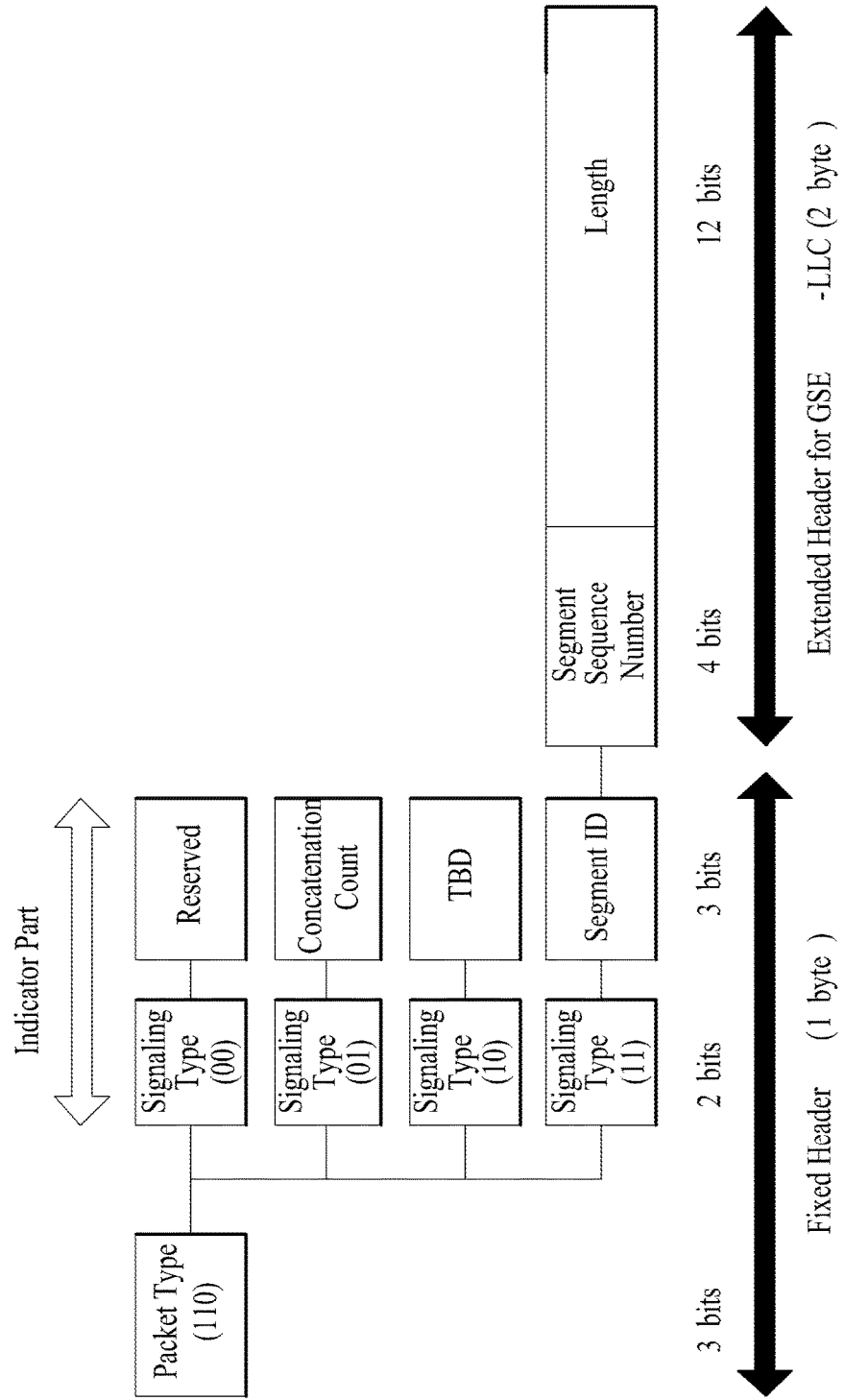
FIG. 34 is a diagram illustrating a structure of a link layer packet for transmission of signaling, according to an embodiment of the present invention.

FIG. 34 is a diagram illustrating a structure of a link layer packet for transmission of signaling, according to an embodiment of the present invention.

According to an embodiment of the present invention, when signaling information is transmitted using a link layer packet, a value of a packet type element may indicate 110B.

The drawing illustrates a structure of a header of a link layer packet during transmission of signaling. Referring to the drawing, when signaling is transmitted, a signaling type field of 2 bits is present behind the packet type element. The signaling type field may indicate a type of signaling to be transmitted. According to a signaling type field, information of the remaining 3-bit parts of a fixed header subsequent thereto and information about an extended header may be determined.

According to an embodiment of the present invention, when a value of a signaling type field is 00B, a signaling type is a section table type. In the case of the section table, a field contained in the table contains information about segmentation of a section and information about a length of the section, and thus the link layer packet may indicate only a packet type and a signaling type and transmitted without separate processing. When the signaling type is a section table form, the remaining 3 bits obtained by excluding a packet type element and a signaling type field from a fixed header part may be reserved for future use without being used. When the signaling type is a section table form, an extended header is not basically used, but when a length of a link layer packet needs to be indicated, an extended header of 1 or 2 bytes may be added and used as a length field.

According to an embodiment of the present invention, when a value of a signaling type field is 01B, the value may indicate that a signaling type is a descriptor form. In general, the descriptor may be used as a part of the section table, and the descriptor corresponds to simple signaling, and thus the descriptor may be transmitted in a corresponding signaling type in order to transmit only the descriptor. The descriptor may have a shorter length than the section table, and thus a plurality of descriptors may be contained and transmitted in one link layer packet. According to an embodiment of the present invention, 3 bits corresponding to an indicator part of a fixed header may be used to indicate the number of descriptors contained in one link layer packet. When a signaling type is a descriptor type, the length of the link layer packet may be indicated using information about the length of the corresponding descriptor, contained in the descriptor, without using an extended header. When the length of the link layer packet needs to be separately indicated, an extended header of 1 or 2 bytes may be added and used as a length field.

According to an embodiment of the present invention, a signaling type field value 10B may be reserved for another type of signaling for future use.

According to an embodiment of the present invention, when a value of a signaling type field is 11 B, the value may indicate that a signaling type is GSE-LLC. The GSE-LLC signaling may have a structure to be segmented. Accordingly, when a signaling type is GSE-LLC, the remaining 3-bit fields obtained by excluding a packet type element and a signaling type field from a fixed header part may be used as a segment ID. When a signaling type is GSE-LLC, an extended header of 2 bytes may be added, and the aforementioned extended header of 2 bytes may include a segment sequence number (segment sequence number) of 4 bits and a length field of 12 bits.

According to an embodiment of the present invention, GSE-LLC may stand for generic stream encapsulation logical link control and refer to one of two attached layers of a data link layer of an OSI model.

FIG. 35 is a diagram illustrating meaning of a value of a signaling type field and information about a fixed header and extended header subsequent to the signaling type field, according to an embodiment of the present invention.

According to an embodiment of the present invention, when a value of the signaling type field is 00B, a field subsequent to the signaling type field may not be present.

According to an embodiment of the present invention, when a value of the signaling type field is 01B, a concatenation count field may be present after the signaling type field. The concatenation count field may be present when only a descriptor instead of a section table is transmitted. The concatenation count field may indicate the number of descriptors contained in a payload of a link layer packet. The concatenation count field will be described in detail.

According to an embodiment of the present invention, when a value of the signaling type field is 11B, a segment ID (Seg_ID) field, a segment sequence number (Seg_SN) field, and/or a length field may be present after the signaling type field. In the case of LLC signaling data that can be transmitted using DVB_GSE, the LLC signaling data may be autonomously segmented. The segment ID (Seg_ID) field may refer to an ID for identifying a segmented segment when LLC data is segmented. When segments of the transmitted LLC data are combined as one, a receiving side may recognize that segments of each LLC data item are components of the same LLC data using a segment ID (Seg_ID) field. The segment ID (Seg_ID) may have a size of 3 bits and identify 8 segmentations. The segment sequence number (Seg_SN) field may refer to a sequence of each segment when LLC data is segmented. Since a front part of the LLC data contains an index of a corresponding data table, when a receiver receives packets, segmented segments need to be sequentially aligned. Link layer packets having payloads segmented from one LLC data item have the same Seg_ID but have different Seg_SNs. A segment sequence number (Seg_SN) field may have a size of 4 bits. One LLC data item may be segmented to a maximum of 16 segments. The length field may indicate a length of LLC data corresponding to a payload of a current link layer packet in a byte unit. Accordingly, a total length of the link layer packet may be a value obtained by adding 3 bytes as a header length to a value indicated by the length field.

According to an embodiment of the present invention, DVB_GSE may stand for DVB-generic stream encapsulation and refer to a data link layer protocol defined by DVB.

FIG. 36 is a diagram illustrating the number of descriptors included in a payload of a link layer packet according to a concatenation count value, according to an embodiment of the present invention.

According to an embodiment of the present invention, the concatenation count value may indicate that descriptors, the number of which is obtained by adding 1 to a value of the concatenation count field, are included in a payload of one link layer packet. Accordingly, a bit number allocated to the concatenation count field is 3 bits, and thus a maximum of 8 descriptors may be signaled to constitute one link layer packet.

Figure 37:
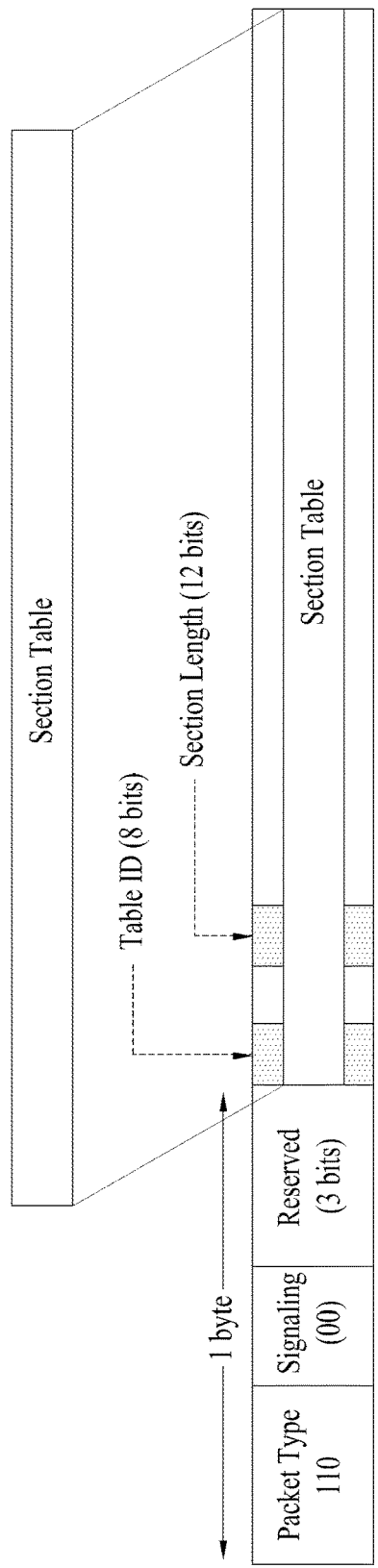
FIG. 37 is a diagram illustrating a procedure for encapsulating a section table in a payload when signaling information input to a payload of a link layer packet is a section table, according to an embodiment of the present invention.

FIG. 37 is a diagram illustrating a procedure for encapsulating a section table in a payload when signaling information input to a payload of a link layer packet is a section table, according to an embodiment of the present invention.

According to an embodiment of the present invention, one section table is a payload of a link layer packet without changes, and in this case, a value indicated by a packet type element is 110B (signaling), and a value indicated by a signaling type field may be 00B (section table). In the drawing, the remaining 3 bits obtained by excluding a packet type element and a signaling type field from a fixed header may be reserved as a reserved field for other future use.

According to an embodiment of the present invention, fields contained in the section table may include a field indicating a length of a corresponding section. The aforementioned field indicating the length of the corresponding section is always positioned in the same position in the section table, and thus a field present in a point spaced apart from a start point of a payload of a link layer packet by a predetermined offset may be checked to identify a length of the payload. In the case of a section table, a section_length_field with a length of 12 bits is present at a position spaced apart from a point in which a payload is started by 12 bits. The section_length_field may indicate a length to a last part of the section immediately after the section_length_field. Accordingly, a length of a part that is not included in the section_length_field and a length of a header of a link layer packet may be added to a value indicated by the section_length_field so as to derive a total length of a link layer packet. Here, the part (3 bytes) that is not included in the section_length_field may include a length of a table_id field and section_length_field. In addition, the length of a header of a link layer packet may be 1 byte. That is, a total length of the link layer packet may be a value obtained by adding 4 bytes to a value indicated by the section_length_field.

According to an embodiment of the present invention, upon receiving a link layer packet including a section table, a receiving apparatuses may acquire and use information about the corresponding section table through a value of a table_id field with a length of 8 bits, which is immediately after a fixed header of a link layer packet.

FIG. 38 is a diagram illustrating syntax of a network information table (NIT) according to an embodiment of the present invention.

According to an embodiment of the present invention, when a section table for signaling is included and transmitted in a payload of a link layer packet, a network information table indicating current broadcast network related information as a section table may be included in a payload of a link layer packet.

According to an embodiment of the present invention, the network information table may include a table_id field, a section_syntax_indicator field, a section_length field, a network_id field, a version_number field, a current_next_indicator field, a section_number field, a last_section_number field, a network_descriptors_length field, a descriptor( ), a transport_stream_loop_length field, a broadcast_id field, an original_network_id field, a delivery_system_descriptor_length field, and/or a delivery_system_descriptor( ).

According to an embodiment of the present invention, a description of a field having the same name as a field described with reference to a diagram illustrating a normal format of the aforementioned section table among fields contained in the network information table will be substituted with the above description.

The network_id field may indicate a unique identifier of a currently used broadcast network.

The network_descriptors_length field may indicate a length of a descriptor that states network related information in a network level.

The descriptor( ) may indicate a descriptor that states network related information in a network level.

The transport_stream_loop_length field may indicate a length of a stream related information transmitted in a broadcast network.

The broadcast_id field may indicate a unique identifier of a broadcasting station present in a used broadcast network.

The original_network_id field may indicate a unique identifier of an originally used broadcast network. When the originally used broadcast network is different from a currently used broadcast network, NIT may include information about the originally used broadcast network through the original_network_id field.

The delivery_system_descriptor_length field may indicate a length of a descriptor that states detailed information related to a delivery_system in a current broadcast network.

The delivery_system_descriptor( ) may indicate a descriptor including detailed information related to a delivery_system in a current broadcast network.

FIG. 39 is a diagram illustrating syntax of a delivery system descriptor included in a network information table (NIT), according to an embodiment of the present invention.

According to an embodiment of the present invention, the delivery system descriptor may include information about a physical layer pipe (PLP) for transmitting signaling data and so on, related to data items transmitted by a specific broadcasting station in a delivery system.

According to an embodiment of the present invention, the delivery system descriptor may include a descriptor_tag field, a descriptor_length field, a delivery_system_id field, a base_PLP_id field, a base_PLP_version field, and/or a delivery_system_parameters( ).

The descriptor_tag field may indicate an identifier indicating that a corresponding descriptor is a delivery system descriptor.

The descriptor_length field may indicate a length of a corresponding descriptor.

The delivery_system_id field may indicate a unique delivery system identifier of a used broadcast network.

The base_PLP_id field may indicate an identifier of a representative physical layer pipe (PLP) for decoding components for configuring a broadcast service transmitted from a specific broadcasting station identified by the broadcast_id. Here, the PLP may refer to a data pipe of a physical layer and a broadcast service transmitted from a specific broadcasting station may include PSI/SI information and so on.

The base_PLP_version field may indicate version information according to change in data transmitted through a PLP identified according to the base_PLP_id. For example, when service signaling such as PSI/SI is transmitted through the base_PLP, a value of the base_PLP_version field may be increased on a 1-by-1 basis whenever service signaling is changed.

The delivery_system_parameters( ) may include a parameter indicating broadcast transmitting system characteristics. The parameter may include a bandwidth, a guard interval, a transmission mode, a center frequency, and so on.

FIG. 40 is a diagram illustrating syntax of a fast information table (FIT) according to an embodiment of the present invention.

According to an embodiment of the present invention, when a section table for singling is included and transmitted in a payload of a link layer packet, a fast information table (FIT) as a section table may be included in the payload of the link layer packet. According to an embodiment of the present invention, a receiving apparatus may rapidly and easily scan and acquire a broadcast service through the FIT.

According to an embodiment of the present invention, the FIT may include a table_id field, a private_indicator field, a section_length field, a table_id_extension field, a FIT_data_version field, a current_next_indicator field, a section_number field, a last_section_number field, a num_broadcast field, a broadcast_id field, a delivery_system_id field, a base_PLP_id field, a base_PLP_version field, a num_service field, a service_id field, a service_category field, a service_hidden_flag field, a SP_indicator field, a num_component field, a component_id field, and/or a PLP_id field.

According to an embodiment of the present invention, a description of a field having the same name as a field described with reference to a diagram illustrating a normal format of the aforementioned section table among fields contained in the FIT will be substituted with the above description.

The table_id field may indicate that a corresponding table includes information related to rapid scan of a service and indicate that the corresponding table corresponds to a fast information table.

The private_indicator field may always be set to 1.

The table_id_extension field may provide a scope of reserved fields that logically correspond to a portion of the table_id field.

The FIT_data_version field may indicate syntax included in a fast information table and version information about semantics. According to an embodiment of the present invention, a receiving apparatus may determine whether signaling contained in a corresponding table is processed using the FIT_data_version field.

The num_broadcast field may indicate the number of broadcasting stations that transmit a broadcast service or content through a frequency or a transmitted transport frame.

The broadcast_id field may indicate a unique identifier of a broadcasting station that transmits a broadcast service or content through a frequency or a transmitted transport frame. In the case of a broadcasting station that transmits MPEG-2 TS-based data, the broadcast_id may have the same value as the transport_stream_id of MPEG-2 TS.

The delivery_system_id field may indicate an identifier of a broadcast transmitting system that applies and processes the same transport parameter in a used broadcast network.

The base_PLP_id field may indicate an identifier of a PLP for transmitting broadcast service signaling transmitted by a specific broadcasting station identified by the broadcast_id. The base_PLP_id field may indicate an identifier of a representative physical layer pipe (PLP) for decoding components included in a broadcast service transmitted by a specific broadcasting station identified by the broadcast_id. Here, the PLP may refer to a data pipe of a physical layer and the broadcast service transmitted by a specific broadcasting station may include PSI/SI information and so on.

The base_PLP_version field may refer to version information according to change in data transmitted through a PLP identified by the base_PLP_id. For example, when service signaling such as PSI/SI is transmitted through the base_PLP, a value of the base_PLP_version field may be increased on a 1-by-1 basis whenever service signaling is changed.

The num_service field may refer to the number of broadcast services transmitted by a broadcasting station identified by the broadcast_id in a corresponding frequency or a transport frame.

The service_id field may refer to an identifier for identifying a broadcast service.

The service_category field may refer to a category of a broadcast service. For example, when a value of the service_category field is 0x01, the value may indicate a basic TV, when the value is 0x02, the value may indicate a basic radio, when the value is 0x03, the value may indicate an RI service, when the value is 0x08, the value may indicate a service guide, and when the value is 0x09, the value may indicate emergency alerting.

The service_hidden_flag field may indicate whether a corresponding broadcast service is hidden. When the service is hidden, the corresponding service is a text service or a service that is autonomously used, and thus a receiving apparatus according to an embodiment of the present invention may ignore the aforementioned hidden broadcast service or hide it in a service list.

The SP_indicator field may indicate whether service protection is applied to one or more components in a corresponding broadcast service.

The num_component field may indicate the number of components included in a corresponding broadcast service.

The component_id field may indicate an identifier for identifying a corresponding component in a broadcast service.

The PLP_id field may indicate an identifier for identifying a PLP for transmitting a corresponding component in a broadcast service.

Figure 41:
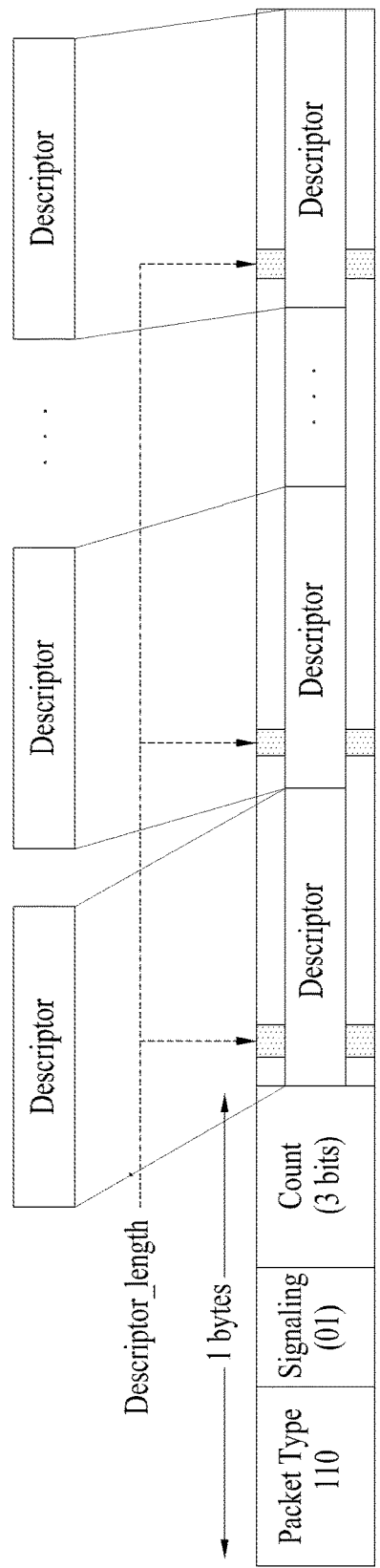
FIG. 41 is a diagram illustrating a procedure for encapsulating a descriptor in a payload when signaling information input to a payload of a link layer packet is a descriptor, according to an embodiment of the present invention.

FIG. 41 is a diagram illustrating a procedure for encapsulating a descriptor in a payload when signaling information input to a payload of a link layer packet is a descriptor, according to an embodiment of the present invention.

According to an embodiment of the present invention, one or more descriptors may be included in the payload of the link layer packet, and in this case, a value indicated by the packet type element may be 110B (signaling), and a value indicated by the signaling type field may be 01B (descriptor). In the drawing, the remaining 3 bits obtained by excluding a packet type element and a signaling type field from a fixed header may indicate a count field indicating the number of descriptors contained in a payload of one link layer packet. The payload of one link layer packet may include a maximum of 8 descriptors.

According to an embodiment of the present invention, all descriptors may include a descriptor_tag field of 1 byte and a descriptor_length field of 1 byte in a start part of the descriptor. According to an embodiment of the present invention, a length of a concatenated packet may be obtained using the aforementioned descriptor_length field. The descriptor_length field is always positioned at the same position in a descriptor, and thus a filed at a position spaced apart from a start point of a payload of a link layer packet by a predetermined offset may be checked so as to recognize a length of the payload. In the case of a descriptor, the descriptor_length field with a length of 8 bits may be present a position spaced apart from a start point of the payload by 8 bits. The descriptor_length field may indicate a length to a last part of the descriptor immediately after the corresponding field. Accordingly, a length (1 byte) of a part that is not included in the descriptor_length field and a length (1 byte) of the descriptor_length field may be added to a value indicated by the descriptor_length field so as to derive a length of one descriptor. In addition, lengths of respective descriptors may be added by as much as the number of descriptors indicated by the count field so as to derive a total length of the link layer packet. For example, according to an embodiment of the present invention, a second descriptor included in a payload of a link layer packet may be started at a position spaced apart from a initial part of the payload by as much as a length of a first descriptor and a descriptor_length field of the second descriptor is present at a position spaced apart from the position at which the descriptor is started by a predetermined offset, and in this regard, the field may be checked so as to derive a total length of the second descriptor. During this process, each of one or more descriptor length included in the payload of the link layer packet may be derived, and the sum of lengths of respective descriptors and a length of a header of a link layer packet may be added so as to derive a total length of the link layer packet.

According to an embodiment of the present invention, upon receiving a link layer packet including one or more descriptors, a receiving apparatus may acquire and use signaling information included in each descriptor through a value of the descriptor_tag field with a length of 8 bits, included in each descriptor.

FIG. 42 is a diagram illustrating syntax of fast information descriptor according to an embodiment of the present invention.

According to an embodiment of the present invention, when a descriptor for signaling is included and transmitted in a payload of a link layer packet, the fast information descriptor may be included in the payload of the link layer packet. According to an embodiment of the present invention, a receiving apparatus may rapidly and easily scan and acquire a broadcast service through the fast information descriptor.

According to an embodiment of the present invention, the fast information descriptor may include a descriptor_tag field, a descriptor_length field, a num_broadcast field, a broadcast_id field, a delivery_system_id field, a base_PLP_id field, a base_PLP_version field, a num_service field, a service_id field, a service_category field, a service_hidden_flag field, and/or a SP_indicator field.

According to an embodiment of the present invention, a description of a field having the same name as a field included in the aforementioned FIT among fields contained in the FIT will be substituted with the above description.

The descriptor_tag field may indicate that the corresponding descriptor is a fast information descriptor containing information related to rapid service scan.

The descriptor_length field may indicate a length of a corresponding descriptor.

FIG. 43 is a diagram illustrating a delivery system descriptor according to an embodiment of the present invention.

According to an embodiment of the present invention, when a descriptor for signaling is included and transmitted in a payload of a link layer packet, a delivery system descriptor may be included in the payload of the link layer packet. The delivery system descriptor m may include information about a physical layer pipe (PLP) for transmitting signaling data and so on associated with data items transmitted by a specific broadcasting station in a delivery system.

According to an embodiment of the present invention, the delivery system descriptor may include a descriptor_tag field, a descriptor_length field, a delivery_system_id field, a num_broadcast field, a base_PLP_id field, a base_PLP_version field, a delivery_system_parameters_length field, and/or a delivery_system_parameters( ).

The descriptor_tag field may indicate that a corresponding descriptor is a delivery system descriptor.

The descriptor_length field may indicate a length of a corresponding descriptor.

The delivery_system_id field may indicate an identifier for identifying a delivery system using the same parameter in a used broadcast network.

The num_broadcast field may indicate the number of broadcasting stations that transmit a broadcast service or content through a frequency or a transmitted transport frame.

The base_PLP_id field may indicate an identifier of a representative physical layer pipe (PLP) for decoding components included in a broadcast service transmitted by a specific broadcasting station identified by the broadcast_id. Here, the PLP may refer to a data pipe of a physical layer, and the broadcast service transmitted from the specific broadcasting station may include PSI/SI information and so on.

The base_PLP_version field may indicate version information according to change in data transmitted through a PLP identified by the base_PLP_id. For example, when service signaling such as PSI/SI is transmitted through the base_PLP, a value of the base_PLP_version field may be increased on a 1-by-1 basis whenever service signaling is changed.

The delivery_system_parameters_length field may indicate a length of a delivery_system_parameters( ) subsequent to a corresponding field.

The delivery_system_parameters( ) may include a parameter indicating broadcast transmitting system characteristics. The parameter may include a bandwidth, a guard interval, a transmission mode, a center frequency, and so on.

According to an embodiment of the present invention, the delivery system descriptor may be included and transmitted in the aforementioned network information table (NIT). Syntax of the delivery system descriptor when the delivery system descriptor is included and transmitted in the network information table has been described above with regard to the description of the network information table.

Figure 44:
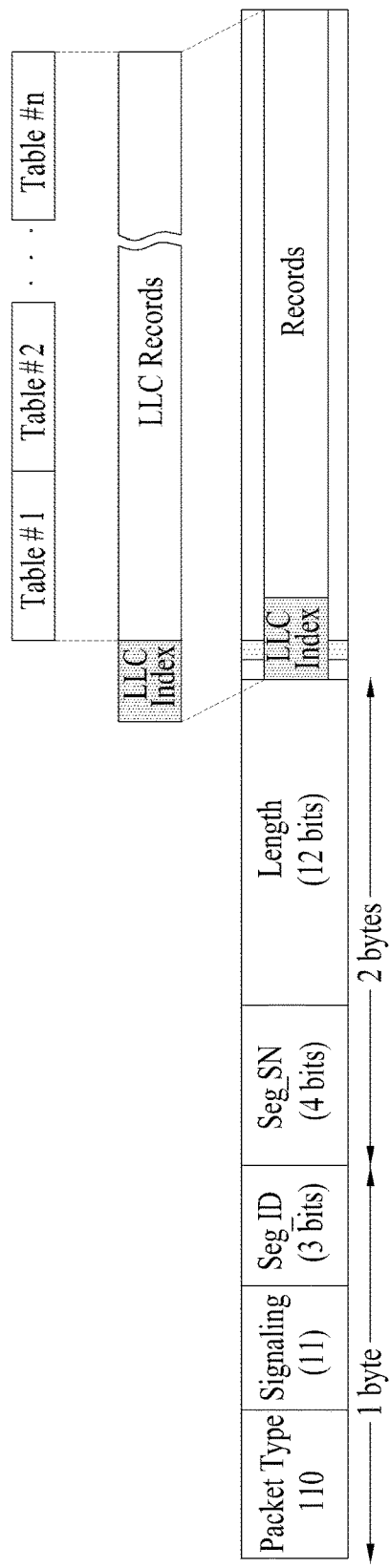
FIG. 44 is a diagram illustrating a procedure for encapsulating one GSE-LLC item in a payload of one link layer packet when signaling information input to a payload of a link layer packet is a GSE-LLC type used in the DVB-GSE standard, according to an embodiment of the present invention.

FIG. 44 is a diagram illustrating a procedure for encapsulating one GSE-LLC item in a payload of one link layer packet when signaling information input to a payload of a link layer packet is a GSE-LLC type used in the DVB-GSE standard, according to an embodiment of the present invention.

According to an embodiment of the present invention, the LLC data may be divided into an index part and a record part, and the record part may be re-divided into several tables. Here, a table included in the record part may have a GSE table structure or a normal section table structure.

In the drawing, according to an embodiment of the present invention, one LLC item may be a payload of one link layer packet, and in this case, a value indicated by the packet type element may be 110B (signaling), and a value indicated by the signaling type field may be 11B (GSE-LLC). According to an embodiment of the present invention, when GSE-LLC type of signaling is transmitted, the link layer packet may have an extended header of 2 bytes, and the aforementioned extended header of 2 bytes may include a segment sequence number (Seg_SN) field of 4 bits and a length field of 12 bits. The aforementioned length field may be allocated a value indicating a total length of a link layer packet according to a system configuration or allocate a value indicating a length of only a payload of a link layer packet.

Figure 45:
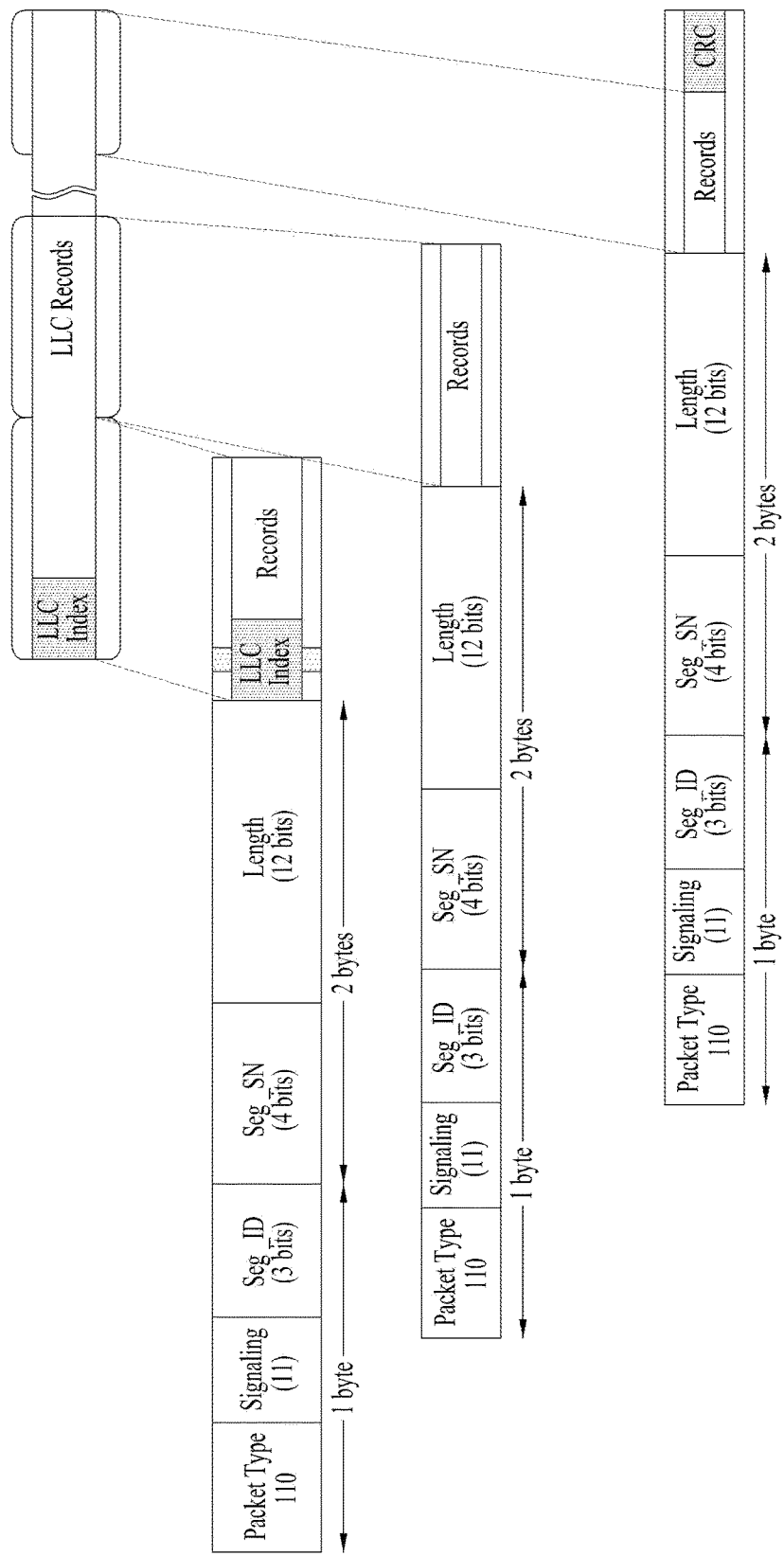
FIG. 45 is a diagram illustrating a procedure for encapsulating one GSE-LLC data item in payloads of a plurality of link layer packets when signaling information input to a payload of a link layer packet is a GSE-LLC type used in the DVB-GSE standard, according to an embodiment of the present invention.

FIG. 45 is a diagram illustrating a procedure for encapsulating one GSE-LLC data item in payloads of a plurality of link layer packets when signaling information input to a payload of a link layer packet is a GSE-LLC type used in the DVB-GSE standard, according to an embodiment of the present invention.

According to an embodiment of the present invention, when the LLC data is segmented, values of the Seg_ID field may be the same in order to indicate that data is segmented from the same LLC data.

According to an embodiment of the present invention, the Seg_SN field may include sequence information of the segmented segments such that a receiving apparatus receives the segmented LLC data and recombines the segmented data according to an order. When one LLC data item is included in a payload of one link layer packet, a value of the Seg_SN field may be 0.

According to an embodiment of the present invention, a receiving apparatus may recognize the number of segmented obtained by segmenting the LLC data with respect to the corresponding Seg_ID through the LLC index part.

Figure 46:
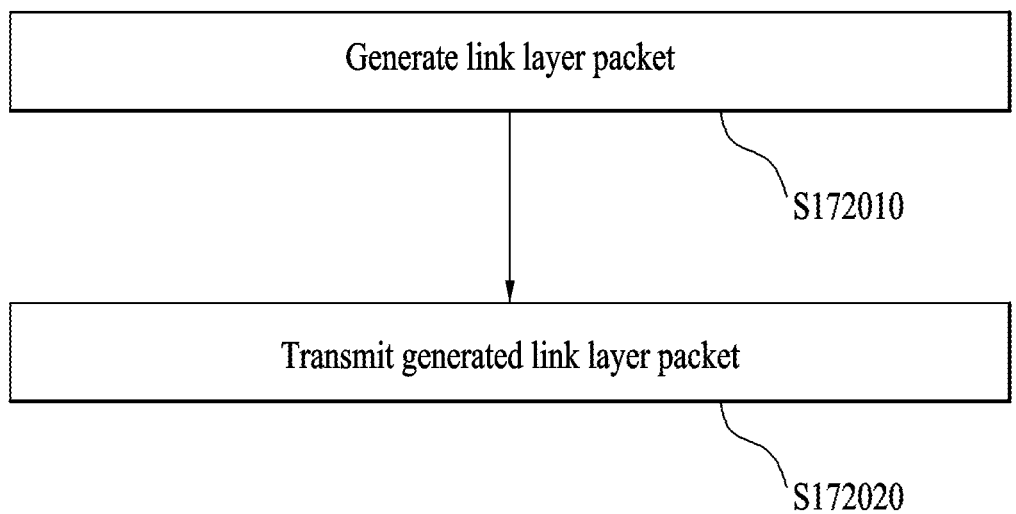
FIG. 46 is a diagram illustrating a method for transmitting signaling information according to an embodiment of the present invention.

FIG. 46 is a diagram illustrating a method for transmitting signaling information according to an embodiment of the present invention.

According to an embodiment of the present invention, the signaling information transmitting method may include generating a link layer packet including signaling information (S14010) and/or transmitting the generated link layer packet (S14020). In the generating of the link layer packet including the signaling information (S14010), the link layer packet may include a fixed header and a payload, and the signaling information may include information about a broadcast program and data and information required to receive a broadcast program and data. In addition, the signaling information may be included in a payload of a link layer packet. The aforementioned fixed header may include a packet type element for identifying a type of data included in a payload of a link layer packet according to an embodiment of the present invention and a signaling type element for identifying a type of signaling information included in the payload of the link layer packet according to an embodiment of the present invention. A transmitting side may transmit the link layer packet generated via the aforementioned procedure (S14020). The link layer packet, the packet type element, and the signaling type element have been described above in detail.

According to another embodiment of the present invention, a type of signaling information identified by the aforementioned signaling type element may be a section table.

According to another embodiment of the present invention, a type of signaling information identified by the aforementioned signaling type element may be a descriptor.

According to another embodiment of the present invention, a type of signaling information identified by the aforementioned signaling type element may be GSE-LLC. The signaling type element has been described above in detail.

According to another embodiment of the present invention, when one or more descriptors are included in a payload of one link layer packet, the aforementioned fixed header may include a concatenation count field indicating the number of descriptors included in the payload of one link layer packet. The count field has been described above in detail.

According to another embodiment of the present invention, when GSE-LLC data is segmented to one or more segments and one segment of one or more segments is included in a payload of one link layer packet, the aforementioned fixed header may include a segment identification element for identifying GSE-LLC to which a segment included in a payload of a link layer packet belongs. The segment identification element has been described above in detail.

According to another embodiment of the present invention, the aforementioned link layer packet may include an extended header, and the aforementioned extended header may include a segment sequence element indicating segment sequence information included in a payload of a link layer packet, required for recombination of the aforementioned GSE-LLC data, and/or a packet length element indicating a total length of the link layer packet. The segment sequence element and the packet length element have been described above in detail.

According to another embodiment of the present invention, the aforementioned total length of the link layer packet may indicate a value obtained by adding a header length of the link layer packet and a payload length of the link layer packet, and when a payload includes a section table, the aforementioned length of the payload of the link layer packet may indicate a length of a section table included in the payload of the link layer packet. The aforementioned length of the section table may indicate a value obtained by adding a value indicated by the section_length_field at a position spaced apart from a start part of the section table by a predetermined offset, a length of the predetermined offset, and a length of the section_length_field. The aforementioned section_length_field may indicate a length to a last part of a corresponding section after the aforementioned section_length_field. According to an embodiment of the present invention, the aforementioned predetermined offset may be 12 bits that correspond to a value obtained by adding a table_id field length (8 bits), a section_syntax_indicator field length (1 bit), a specific use field length (1 bit), and a reserved field length (2 bit), which are included in the section table. The method for obtaining the length of the payload of the link layer packet has been described above in detail.

According to another embodiment of the present invention, the aforementioned payload of the link layer packet may include a fast information table or fast information descriptor including signaling information for rapid service scan and acquisition. The aforementioned fast information table and fast information descriptor have been described above in detail.

Figure 47:
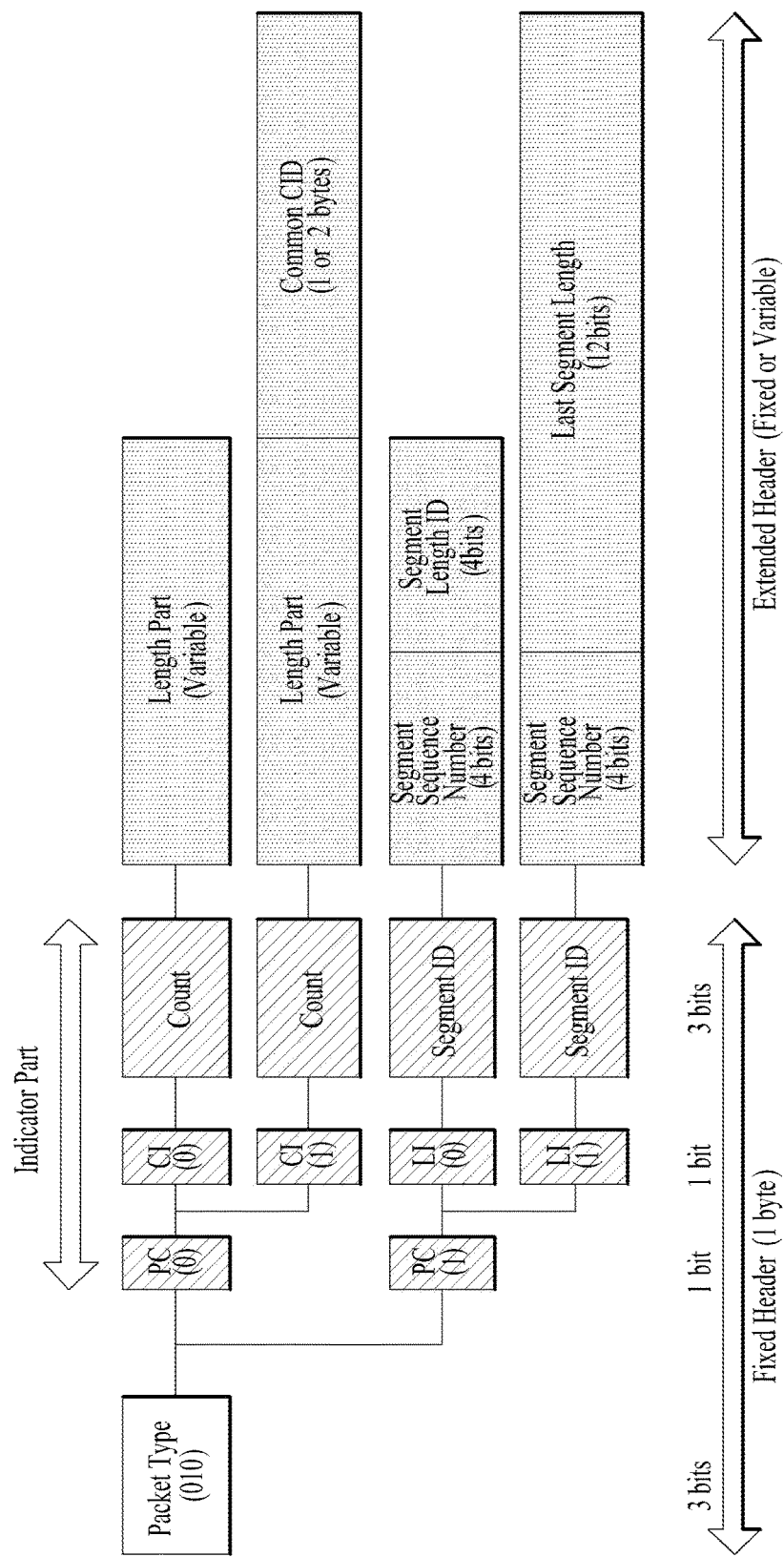
FIG. 47 is a diagram illustrating a header of a link layer packet for RoHC transmission, according to an embodiment of the present invention.

FIG. 47 is a diagram illustrating a header of a link layer packet for RoHC transmission, according to an embodiment of the present invention.

In an IP-based broadcast environment, an IP packet may also be encapsulated and transmitted as the aforementioned link layer packet. When streaming is performed in the IP-based broadcast system, header information of the IP packet may be barely changed and may be maintained. Based on this point, the header of the IP packet may be encapsulated.

A robust header compression (RoHC) scheme may be mainly used to encapsulate a header (=IP header) of an IP packet. The present invention proposes an encapsulation method when an RoHC packet is input to a link layer.

When the RoHC packet is input to a link layer, a value of the aforementioned packet type element may be $010_B$. As described above, the value may indicate that a packet transmitted to a link layer from a higher layer is a compressed IP packet.

When the RoHC packet is input, a header of the link layer packet may include a fixed header and/or an extended header like the other aforementioned packets.

The fixed header may include a packet type field and/or a packet configuration (PC) field. The fixed header may have a total size of 1 byte. Here, the packet type field may have a value of 010 in the case of the compressed IP packet. The extended header may have a variable or fixed size in some embodiments.

The PC field of the fixed header may indicate a form in which an RoHC packet included in a payload of a link layer packet is processed. According to a value of the PC field, the remaining part of a fixed header subsequent to the PC field and information of the extended header may be determined. In addition, the PC field may contain length information of an extended header according to a form in which the RoHC packet is processed. The PC field may have a size of 1 bit.

A case in which a value of the PC field is $0_B$ will now be described.

When the PC field has a value $0_B$, the payload of the link layer packet includes one RoHC packet or two or more RoHC packets are concatenation. Concatenation may refer to the case in which packets with a short length are connected to configure a payload of a link layer packet.

When a value of the PC field is $0_B$, a common CID indicator (CI) field of 1 bit and a count field of 3 bits may be subsequent to the PC field. Accordingly, the common CID information and a length part may be added to the extended header. The length part may indicate a length of an RoHC packet.

The common CID indicator (CI) field may be set to 1 when context IDs (CIDs) of RoHC packets included in a payload of one link layer packet are the same, and otherwise, the CI field may be set to 0. When the CI value is 1, an overhead processing method for a common CID may be applied. The CI field may be 1 bit.

The count field may indicate the number of RoHC packets included in a payload of one link layer packet. That is, with regard to concatenation, the number of concatenated RoHC packets may be indicated by the count field. The count field may be 3 bits. Accordingly, as shown in the following table, a maximum of 8 RoHC packets may be included in a payload of one link layer packet. When the count field has a value of 000, the value may indicate that RoHC packets are not concatenated and one RoHC packet is included in a payload of a link layer packet.

TABLE 1

| Count (3 bits) | No. of Concatenated RoHC packets |
|---|---|
| 000 | 1 |
| 001 | 2 |
| 010 | 3 |
| 011 | 4 |
| 100 | 5 |
| 101 | 6 |
| 110 | 7 |
| 111 | 8 |

As described above, the length part may indicate a length of the RoHC packet. In the case of the RoHC packet, length information is deleted from a header of the RoHC packet. Accordingly, a length field in the header of the RoHC packet cannot be used.

Accordingly, the header of the link layer packet may include a length part such that a receiver recognizes a length of a corresponding RoHC packet.

When a maximum transmission unit (MTU) is not determined, an IP packet may have a maximum length of 65535 bytes. Accordingly, length information of 2 bytes is required in order to support an RoHC packet up to a maximum length. In addition, when a plurality of RoHC packets is concatenated, a length field may be added by as much as the number determined by the count field. In this case, the length part may include a plurality of length fields. However, when one RoHC packet is included in a payload, the length part may include only one length field. Length fields may be arranged in the same way as an order of RoHC packets included in a payload of a link layer packet. Each length field may have a value in a byte unit.

A common CID field may be a field in which a common CID is transmitted. A header part of the RoHC packet may include a context ID (CID) for checking a relationship between compressed headers. The CID may be maintained in the same value in a stable link state. Accordingly, RoHC packets included in the payload of one link layer packet may include the same CID. In this case, in order to reduce overhead, CID may be deleted from the header part of the RoHC packet included in concatenated payload, and a value of the common CID field may be indicated in a header of the link layer packet. A receiver may recombine CIDs of the RoHC packet using the common CID field. When there is a common CID field, a value of the aforementioned CI field needs to be 1.

The case in which a value of the PC field $1_B$ will now be described.

When the value of the PC field is $1_B$, a payload of a link layer packet includes segmented packets of an RoHC packet. Here, the segmented packet may refer to the case in which an RoHC packet with a long length is segmented to a plurality of segments and one of the segments is included in a payload of a link layer packet.

When a value of the PC field is $1_B$, a last segment indicator (LI) of 1 byte and a segment ID field of 3 bits may be subsequent to the PC field. In addition, in order to add information about segmentation, a segment sequence number field, a segment length ID field, a last segment length field, and so on may be added to an extended header.

A last segment indicator (L1) field may be used when an RoHC packet is segmented. The RoHC packet may be segmented to a plurality of segments. When an LI value is 1, the value may indicate that a segment included in a current link layer packet is a segment that is lastly positioned among segments segmented from one RoHC packet. When an LI value is 0, the value may indicate that a segment included in a current link layer packet is not a last segment. The LI field may be used to determine whether all segments are received when the receiver collects segments to reconfigure one RoHC packet. The LI field may be 1 bit.

A segment ID (Seg_ID) field may indicate an ID provided to an RoHC packet when an RoHC packet is segmented. Segments from one RoHC packet may have a segment ID of the same value. When transmitted segments are combined as one segment, the receiver may determine whether components are from the same RoHC packet using a segment ID.

The segment ID field may be 3 bits. Accordingly, segmentation of 8 RoHC packets may be simultaneously supported.

A segment sequencer number (Seg_SN) field may be used to check a sequence of each segment when an RoHC packet is segmented. That is, link layer packets having segments from one RoHC packet as a payload may have the same Seg_ID but have different Seg_SNs. The Seg_SN may be 4 bits. Accordingly, one RoHC packet may be segmented to a maximum of 16 segments.

A segment length ID (Seg_Len_ID) field may be used to indicate each segment length. However, the segment length ID field may be used to indicate a length of a segment except for a last segment among a plurality of segments. The length of the last segment may be indicated by a length field of a last segment, which will be described below. When a payload of a link layer packet is not a last segment of an RoHC packet, that is, when a value of LI is 0, a segment length ID field may be present.

In order to reduce overhead of a header, a length of a segment may be limited to 16. An input size of a packet may be determined according to a code rate of FEC processed in a physical layer. A length of a segment may be determined according to the input size and determined as the Seg_Len_ID. When a physical layer is operated irrespective of a segment length, the length of the segment may be determined as follows.

Segment Length=Seg_Len_ID×Len_Unit+min_Len [bytes]  [Equation 1]

Here, a length unit (Len_Unit) may be a basic unit indicating a length of a segment and min_Len may refer to a minimum of a segment length. The Len_Unit and the min_Len may have the same value in a transmitter and a receiver and it is effective in terms of system management when the Len_Unit and the min_Len are not changed after being determined once. In addition, the Len_Unit and the min_Len may be determined in consideration of processing capability of FEC of a physical layer during an initialization procedure of a system.

The following table summarizes a length of a segment, which is represented according to a Seg_Len_ID, and a length allocated to the Seg_Len_ID may be an embodiment and may be changed according to a designer's intention. According to the present embodiment, a value of the Len_Unit may be 256 and a value of the min_Len may be 512.

TABLE 2

| Seg_Len_ID | Segment Length (byte) |
| --- | --- |
| 0000 | 512 (=min_Len) |
| 0001 | 768 |
| 0010 | 1024 |
| 0011 | 1280 |
| 0100 | 1536 |
| 0101 | 1792 |
| 0110 | 2048 |
| 0111 | 2304 |
| 1000 | 2560 |
| 1001 | 2816 |
| 1010 | 3072 |
| 1011 | 3328 |
| 1100 | 3584 |
| 1101 | 3840 |
| 1110 | 4096 |
| 1111 | 4352 |

A last segment length (L_Seg_Len) field may be used when a segment included in a payload of a link layer packet is a last segment of the RoHC packet. That is, when a value of the LI field is 1, the last segment length (L_Seg_Len) field may be used. An RoHC packet may be segmented with the same size from a front part using the Seg_Len_ID. However, in this case, a last segment may not be segmented to a size indicated by the Seg_Len_ID. Accordingly, a length of a last segment may be directly indicated by the L_Seg_Len field. The L_Seg_Len field may indicate 1 to 4095 bytes, which is changed in some embodiments.

Figure 48:
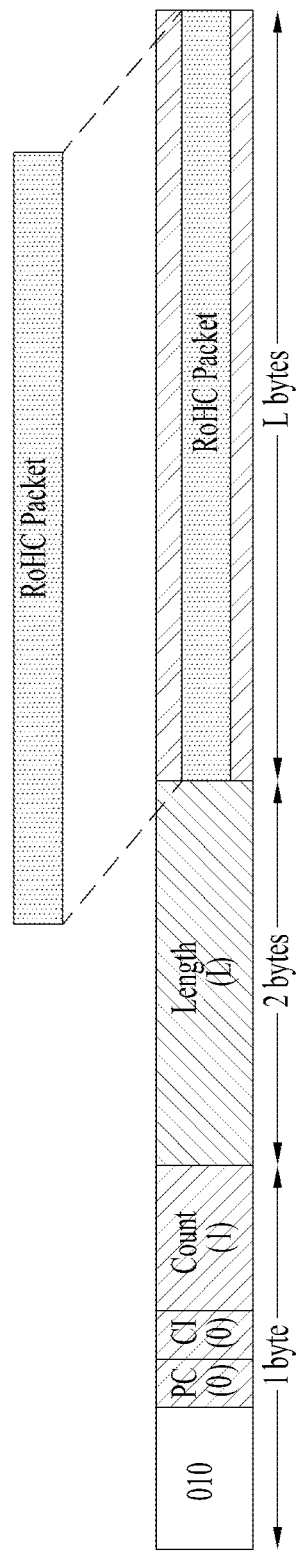
FIG. 48 is a diagram illustrating a method for transmitting an RoHC packet through a link layer packet according to Embodiment #1 of the present invention.

FIG. 48 is a diagram illustrating a method for transmitting an RoHC packet through a link layer packet according to Embodiment #1 of the present invention.

The present embodiment may correspond to the case in which one RoHC packet is included in a payload of a link layer packet when the RoHC packet is within a processing range of a physical layer. In this case, the RoHC packet may not be concatenated or segmented.

In this case, one RoHC packet may be a payload of a link layer packet without changes. A value of the packet type may be $010_B$, a value of the PC field may be $0_B$, and a value of a CI field may be $0_B$. In the case of the aforementioned count field, since one RoHC packet is included in a payload without changes (one), the RoHC packet may have a value of $000_B$ as described above. Then a length field of 2 bytes indicating a length of the RoHC packet may be subsequent to the RoHC packet. In this case, sine only one packet is included in a payload, a length part may include only one length field.

According to the present embodiment, a total of 3 bytes of a link layer header may be added. Accordingly, when a length of a RoHC packet indicated by the length field is L bytes, a total length of the link layer packet may be (L+3) bytes.

Figure 49:
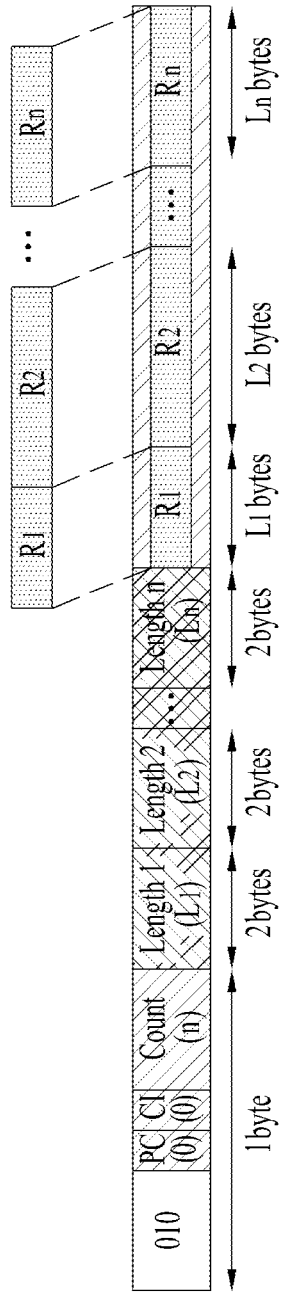
FIG. 49 is a diagram of a method for transmitting an RoHC packet through a link layer packet according to Embodiment #2 of the present invention.

FIG. 49 is a diagram of a method for transmitting an RoHC packet through a link layer packet according to Embodiment #2 of the present invention.

According to the present embodiment, since the RoHC packet does not reach a processing range of a physical layer, a plurality of RoHC packets are concatenated and are included in a payload of a link layer packet (concatenation).

In this case values of the PC field and the CI field may be the same as in a case in which one RoHC packet is included in a payload. A count field is subsequent to the PC field and the CI field. The count field may have a value of $001_B$ to $111_B$ according to the number of RoHC packet included in a payload, as described above.

Then length fields with a length of 2 bytes may be positioned subsequent to the count field by as much as the number indicated by the count field. The length field may be referred to as a length part.

Here, when a value indicated by the count field is n, RoHC packets $R_1, R_2, \ldots, R_n$ with a length of $L_1, L_2, \ldots, L_n$ may be concatenated in a payload of a link layer packet.

A total extended header may have a length of 2n bytes. A total length $L_T$ of a link layer packet may be represented according to the following equation.

$$L_T = 1 + 2n + \sum_{k=1}^{n} L_k \text{ [bytes]} \quad \text{[Equation 2]}$$

Figure 50:
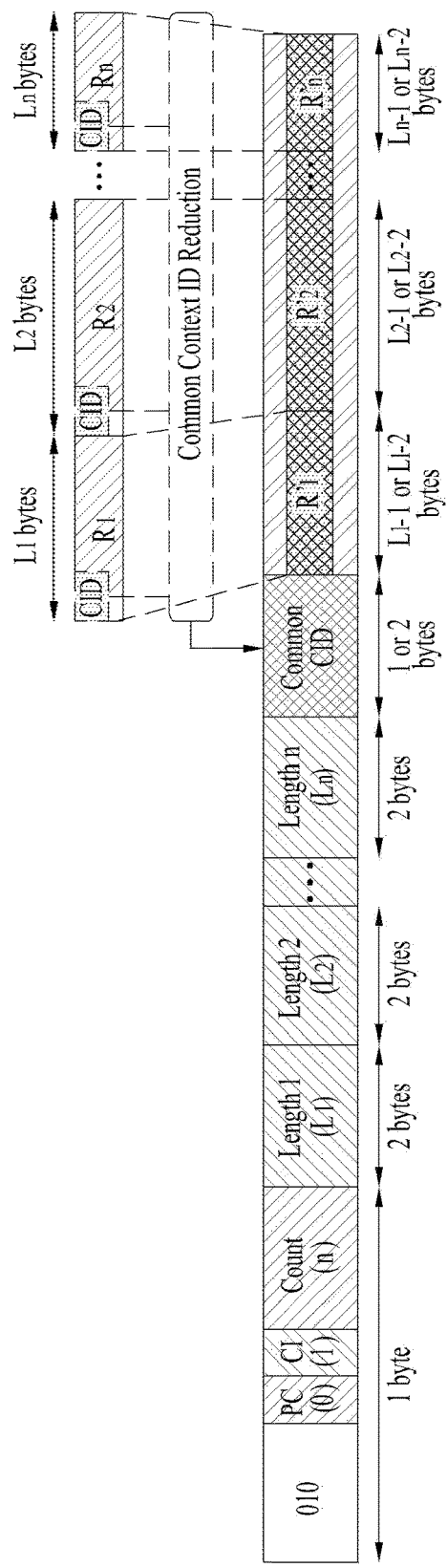
FIG. 50 is a diagram illustrating a method for transmitting an RoHC packet of a link layer packet according to Embodiment #3 of the present invention.

FIG. 50 is a diagram illustrating a method for transmitting an RoHC packet of a link layer packet according to Embodiment #3 of the present invention.

According to the present embodiment, when a plurality of RoHC packets is concatenated to configure a payload of a link layer packet, the concatenated RoHC packets have the same context ID (CID).

When the RoHC packets have the same CID, even if the CID is marked and transmitted once, a receiver may restore an RoHC packet and a header thereof to an original state. Accordingly, a CID common to RoHC packets may be extracted and transmitted once, and in this case, overhead may be reduced.

In this case, a value of the aforementioned CI field may be 1. This means that processing is performed on the same CID. RoHC packets having the same CID may be represented by [R1, R2, R3, . . . , Rn]. The common CID may be referred to as Common CID. A packet obtained by excluding a CID from a header of an RoHC packet may be denoted by R'k (k is 1, 2, . . . . n).

A payload of a link layer packet may include R'k (k is, 2, . . . , n). A common CID field may be added to a last part of an extended header of a link layer packet. The common CID field may be a field in which a common CID is transmitted. The common CID field may be transmitted to one part of the extended header or transmitted to one part of the payload of the link layer packet. According to system management, the common CID field may be appropriately reordered at a position in which a position of the common CID field can be checked.

A size of the common CID field may be changed according to a configuration of the RoHC packet.

When the configuration of the RoHC packet is a small CID configuration, a size of a CID of the RoHC packet may be 4 bits. However, when a CID is extracted from the RoHC packet and is reordered, an add-CID octet may be entirely processed. That is, the common CID field may have a length of 1 byte. Alternatively, an add-CID octet of 12 byte may be extracted from the RoHC packet, only a CID of 4 bits may be allocated to a common CID field, and the remaining 4 bits may be reserved for future use.

When a configuration of the RoHC packet is a large CID configuration, a CID size of the RoHC packet may have a length of 1 byte or 2 bytes. The size of the CID may be determined during an RoHC initialization procedure. According to the size of the CID, the common CID field may have a length of 1 byte or 2 bytes.

According to the present embodiment, a length of a payload of a link layer packet may be calculated as follows. Lengths of n RoHC packets $R_1, R_2, \ldots, R_n$ having the same CID may be referred to as $L_1, L_2, \ldots, L_n$, respectively. When a length of a header of a link layer packet is $L_H$, a length of a common CID field is $L_{CID}$, and a total length of a link layer packet is $L_T$, $L_H$ may be represented as follows.

$$L_H = 1 + 2n + L_{CID} \text{ bytes} \quad \text{[Equation 3]}$$

In addition, $L_T$ may be calculated as follows.

$$L_T = L_H + \sum_{k=1}^{n} (L_k - L_{CID}) \text{ bytes} \quad \text{[Equation 4]}$$

As described above, $L_{CID}$ may be determined according to a CID configuration of RoHC. That is, in the case of a small CID configuration, $L_{CID}$ may be 1 byte, and in the case of a large CID configuration, $L_{CID}$ may be 1 byte or 2 bytes.

Figure 51:
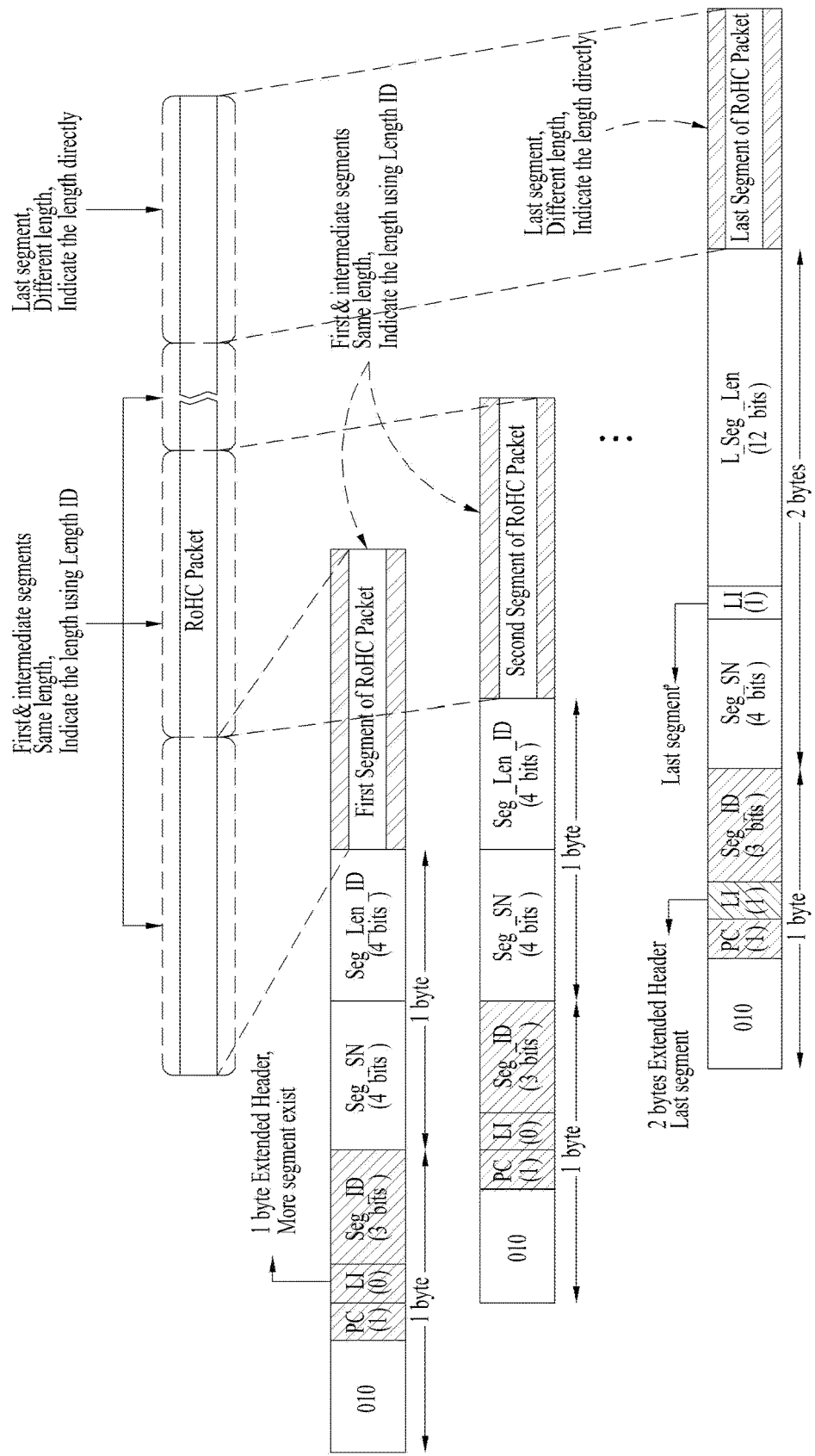
FIG. 51 is a diagram illustrating a method for transmitting a RoHC packet through a link layer packet according to Embodiment #4 of the present invention.

FIG. 51 is a diagram illustrating a method for transmitting a RoHC packet through a link layer packet according to Embodiment #4 of the present invention.

According to the present embodiment, when an input RoHC packet exceeds a processing range of a physical layer (segmentation), segmented segments may each be encapsulated as a payload of a link layer packet.

In order to indicate that a payload of a link layer packet includes segmented RoHC packets, a value of the PC field may be $1_B$. A value of the LI field may be $1_B$ only when a segment corresponding to a last part of the RoHC packet is a payload, and a value of the LI field may be $0_B$ with respect to the all remaining segments. A value of the LI field may indicate information about an extended header of a link layer packet. That is, when a value of the LI field is $0_B$, an extended header with a length of 1 byte may be added, and when a value of the L1 field is $1_B$, an extended header with a length of 2 bytes may be added.

In order to indicate segments are segmented from the same RoHC packet, the Seg_ID needs to have the same value. In order to indicate a sequence order of segments for recombination of normal RoHC packets, a receiver may record a value of the Seg_SN, which is sequentially increased, in a header.

During segmentation of the RoHC packet, a length of a segment may be determined to perform segmentation, as described above. A value of the Seg_Len_ID according to the length may be recorded in the header. As described above, the length of the last segment may be recorded directly in an L_Seg_Len field of 12 bits.

Length information indicated using the Seg_Len_ID and the L_Seg_Len field may indicate only information about a segment, that is, a payload of a link layer packet. Accordingly, total length information of a link layer packet may be calculated by adding header lengths of the link layer packet, which are known through the LI field.

During recombination of segments of a RoHC packet, a receiving side needs to check integrity of the recombined RoHC packet. To this end, CRC may be added behind the IP packet during the segmentation procedure. In general, the CRC is added to a last part of the RoHC packet, and thus the CRC may be included in the last segment after the segmentation procedure.

Figure 52:
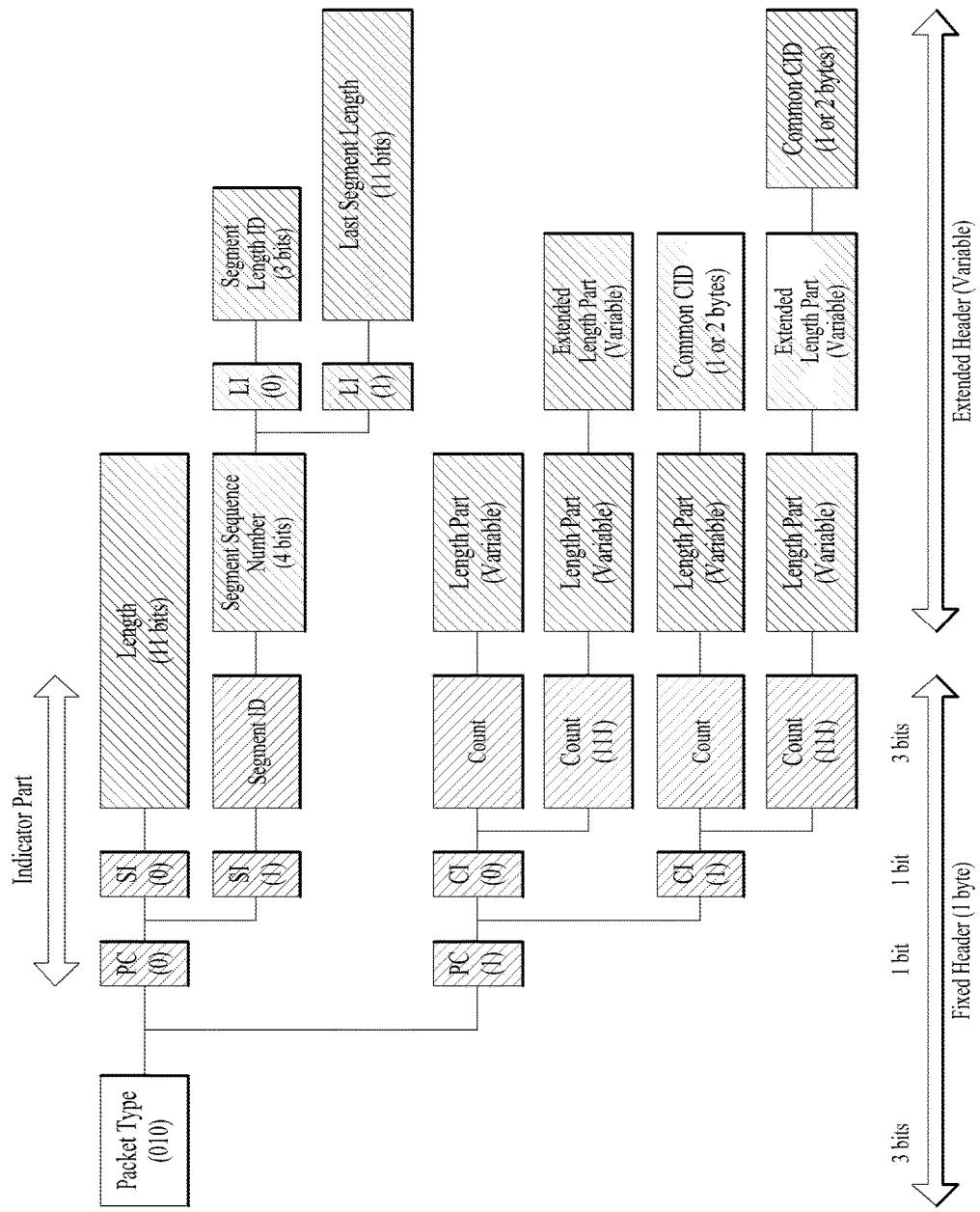
FIG. 52 is a diagram illustrating a header of a link layer packet for RoHC transmission when MTU is 1500, according to an embodiment of the present invention.

FIG. 52 is a diagram illustrating a header of a link layer packet for RoHC transmission when MTU is 1500, according to an embodiment of the present invention.

In general, an RoHC scheme may be applied during video and audio streaming. In this case, a maximum transmission unit (MTU) of the IP packet may be set to 1500 bytes. This means that the RoHC packet also has a shorter length than 1500 bytes.

As described above, a PC field of the fixed header may indicate a form in which a RoHC packet included in a payload of a link layer packet is processed. According to a value of the PC field, information about the remaining part of the fixed header and the extended header, subsequent to the PC field, may be determined. In addition, the PC field may include length information of an extended header according to the form in which the RoHC packet is processed. The PC field may have a size of 1 bit.

The case in which a value of the PC field is $0_B$ will now be described.

When the value of the PC field is $0_B$, a payload of a link layer packet includes one RoHC packet or includes segmented packets of the RoHC packet. An SI field may be subsequent to the PC field. The segment indicator (SI) may indicate whether the payload of the link layer packet includes one RoHC packet or segments of the RoHC packet. According to a value of the SI field, fields of the fixed header and extended header parts may be determined.

As described above, the SI field may indicate whether the payload of the link layer packet includes one RoHC packet or includes segments of the RoHC packet. In the case of a value of 0, the value may mean that the payload includes one RoHC packet, and in the case of 1, the value may man that the payload includes segments of the RoHC packet. The SI field may be 1 byte.

A segment ID (Seg_ID) field may indicate an ID provided to an RoHC packet when the RoHC packet is segmented. This is the same as the aforementioned Seg_ID field.

The segment sequencer number (Seg_SN) field may be used to check a sequence of each segment when the RoHC packet is segmented. This is the same as the aforementioned Seg_SN field.

The last segment indicator (LI) field may indicate whether a segment included in a current link layer packet is a lastly positioned segment among segments segmented from the RoHC packet when the RoHC packet is segmented. This is the same as the aforementioned LI field.

A segment length ID (Seg_Len_ID) field may be used to indicate a length of each segment. This is the same as the aforementioned Seg_Len_ID field. However, unlike in the aforementioned case, the number of lengths of the segment may be limited to 8 instead of 16. In this case, a length of the segment represented according to a value of the Seg_Len_ID may be summarized according to the following table. A length allocated to the Seg_Len_ID is an embodiment and may be changed according to a designer's intention. According the present embodiment, the Len_Unit may have a value of 64 and the min_Len may have a value of 256.

TABLE 3

| Seg_Len_ID | Segment Length (byte) |
| --- | --- |
| 000 | 256 (=min_Len) |
| 001 | 320 |
| 010 | 384 |
| 011 | 448 |
| 100 | 512 |
| 101 | 576 |
| 110 | 640 |
| 111 | 704 |

The last segment length (L_Seg_Len) field may be used to represent a length of a last segment. This is the same as the aforementioned L_Seg_Len field. However, unlike in the aforementioned case, the L_Seg_Len field may be represented in 1 to 2048 bytes. This may be modified in some embodiments.

The case in which a value of the PC field is $1_B$ will now be described.

When the value of the PC field is $1_B$, two or more RoHC packets are concatenated in a payload of a link layer packet. A common CID indicator (CI) field of 1 byte and a count field of 3 bits may be subsequent to the PC field. Accordingly, common CID information and a length part may be added to the extended header.

The common context ID indictor (CI) field may indicate whether context IDs (CIDs) of RoHC packets included in a payload of one link layer packet are the same. The CI field is the same as in the aforementioned case.

The count field may indicate the number of RoHC packets included in a payload of one link layer packet. Unlike in the aforementioned count field, a value 000 may be allocated to indicate that two RoHC packets are concatenated. When a value of the count field is 111, the value may indicate that 9 or more RoHC packets are concatenated. This may be summarized according to the following table.

TABLE 4

| Count (3 bits) | No. of Concatenated RoHC packets (MTU = 1500 bytes) |
|---|---|
| 000 | 2 |
| 001 | 3 |
| 010 | 4 |
| 011 | 5 |
| 100 | 6 |
| 101 | 7 |
| 110 | 8 |
| 111 | 9 or more packets, Extended length field is used |

The length part may indicate a length of an RoHC packet. The length part may include a plurality of length fields as described above. Each length field may indicate a length of each RoHC packet.

According to the present embodiment, the MTU may be 1500 bytes, and thus the length field may be allocated 11 bits as a minimum bit number in order to indicate that the MTU is 1500 bytes. Since up to 2048 bytes can be indicated by 11 bits, and thus when the MTU is extended to 2048 bytes for future use, the method proposed by the present invention may be used. The length field may directly indicate a length thereof or may indicate the length by mapping with a separate value. As described above, the length field may be added by as much as the number determined by the counted field.

When the number of concatenated RoHC packets is 9 or more, the extended length part may be used to indicate a length of an RoHC packet after a $9^{th}$ RoHC packet. That is, the extended length part may be used when a value of the count field is $111_B$. The extended length part may include a length field of 11 bits and an X field of 1 bit. The two fields may be alternately positioned.

The common CID field may be a field in which a common CID is transmitted. This may be the same as in the aforementioned common CID field.

Figure 53:
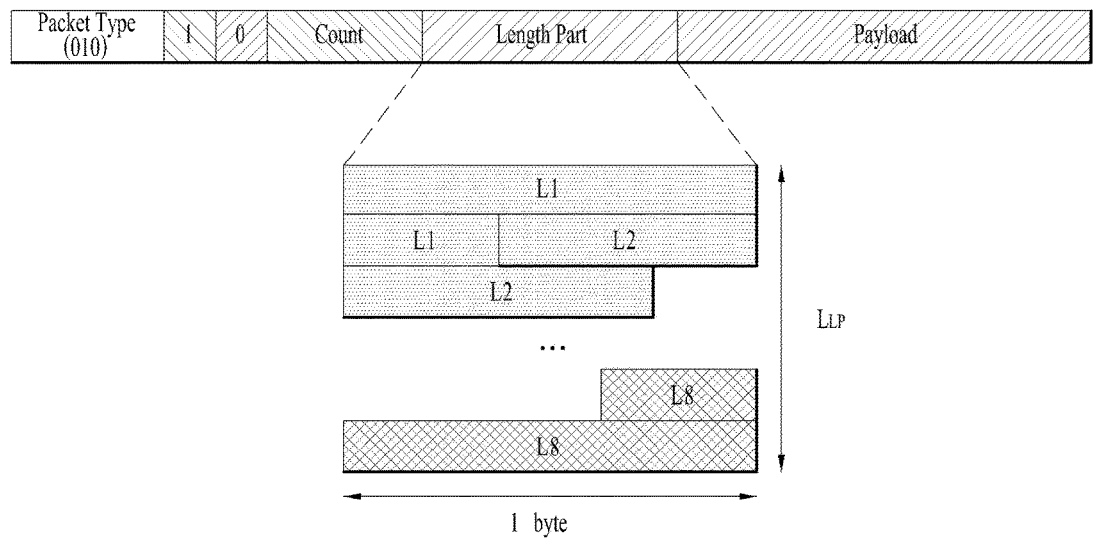
FIG. 53 is a diagram illustrating a method for transmitting a RoHC packet through a link layer packet when a MTU is 1500 according to Embodiment #1 of the present invention.

FIG. 53 is a diagram illustrating a method for transmitting a RoHC packet through a link layer packet when a MTU is 1500 according to Embodiment #1 of the present invention.

According to the present embodiment, when the MTU is 1500, a PC field may be 1 and a count value may not be $111_B$.

In this case, the length part may have length fields, the number of which corresponds to the number determined by the count field value, as described above. One length field is 11 bits, and thus a padding bit may be added according to the number of length fields. That is, when a number determined by the count field is k and a size of one length field is s (bit), a total length $L_{LP}$ of a length part may be calculated as follows.

$$L_{LP} = \left\lceil \frac{k \times s}{8} \right\rceil \text{ [Bytes]} \quad \text{[Equation 5]}$$

In addition, a size of the padding bit added to the length part may be calculated as follows.

$$L_{padding} = (8 \times L_{LP}) - (k \times s)\text{[Bits]} \quad \text{[Equation 6]}$$

As described above, a length s of the length field may be 11 bits. Based thereon, sizes of the length part and padding bit may be summarized as follows.

TABLE 5

| Count (3 bits) | No. of Concatenated RoHC packets (MTU = 1500 bytes) | Size of Length Part (Bytes) | Size of Padding (bits) |
|---|---|---|---|
| 000 | 2 | 3 | 2 |
| 001 | 3 | 5 | 7 |
| 010 | 4 | 6 | 4 |
| 011 | 5 | 7 | 1 |
| 100 | 6 | 9 | 6 |
| 101 | 7 | 10 | 3 |
| 110 | 8 | 11 | 1 |

Figure 54:
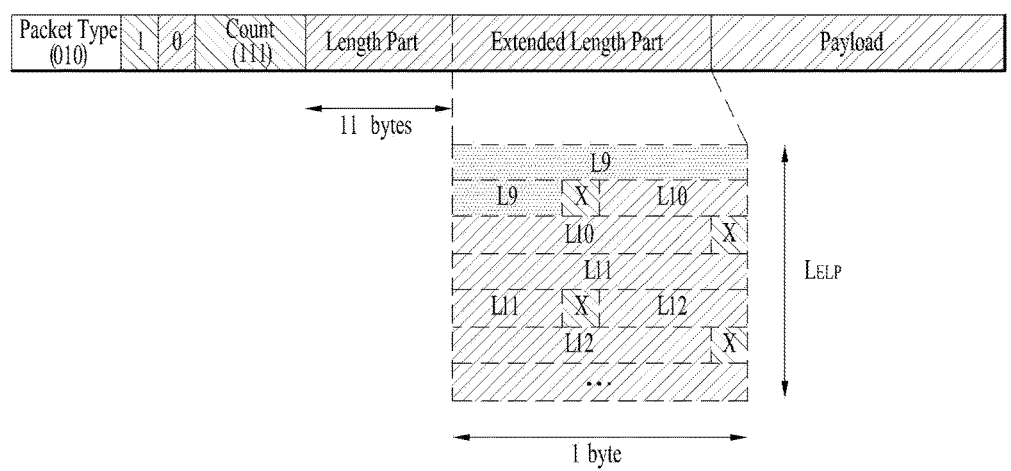
FIG. 54 is a diagram illustrating a method for transmitting an RoHC packet through a link layer packet when a MTU is 1500 according to Embodiment #2 of the present invention.

FIG. 54 is a diagram illustrating a method for transmitting an RoHC packet through a link layer packet when a MTU is 1500 according to Embodiment #2 of the present invention.

According to the present embodiment, when the MTU is 1500, a PC field is 1 and a count value is $111_B$. In this case, as described above, an extended length part may be added.

In this case, a length part in front of the extended length part includes 8 length fields of 11 bits, and thus length part may have a total length of 11 bytes. The count value is 111, and thus at least one length field needs to exist in the extended length part.

As described above, the extended length part may include a length field of 11 bits and an X field of 1 bit. The two fields may be alternately positioned. The length part of the extended length part may be managed in the same way as the length field of the length part.

The X field may indicate whether a length field is further subsequent to the X field. When a value of the X field is 0, the value may mean that a length field is not added any longer. When a value of the X field is 1, the value may mean that at least one length field and X field are subsequent to the corresponding field. Accordingly, until a value of the X field is 0, the extended length part may be continuously increased. It may be seen that the number of RoHC packets positioned in a payload is added by as much as the number of X fields.

In the extended length part, when the number of X fields with a value 1 is m and a size of one length field is s (bit), a length $L_{ELP}$ of the extended length part may be calculated as follows.

$$L_{ELP} = \left\lceil \frac{(m+1) \times (s+1)}{8} \right\rceil \text{ [Bytes]} \quad \text{[Equation 7]}$$

The extended length part may also have a padding bit in order to process a byte unit. A size of the padding bit added to the extended length part may be calculated as follows.

$$L_{E\_paddng} = (8 \times L_{ELP}) - ((m+1) \times (s+1))\text{[Bits]} \quad \text{[Equation 8]}$$

When the number of length fields is an odd number, a padding bit of 4 bits may be added, and when the number of length fields is an even number, a padding bit may not be added.

Figure 55:
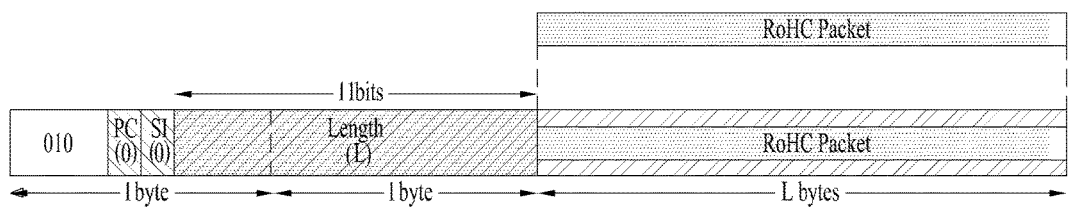
FIG. 55 is a diagram illustrating a method for transmitting an RoHC packet through a link layer packet when a MTU is 1500 according to Embodiment #3 of the present invention.

FIG. 55 is a diagram illustrating a method for transmitting an RoHC packet through a link layer packet when a MTU is 1500 according to Embodiment #3 of the present invention.

According to the present embodiment, when the MTU is 1500, a RoHC packet is within a processing range of a physical layer, and thus one RoHC packet is included in a payload of a link layer packet.

In this case, one RoHC packet may be a packet of a link layer packet without changes. A value of a packet type may be $010_B$, a value of the PC field may be $0_B$, and a value of the SI field may be $0_B$. The aforementioned length part may be subsequent thereto. Here, the length part may have one length field. The length field may be 11 bits. For 11 bits, 3 bits of a fixed header and 1 byte of an extended header may be used for one length field.

In this case, a link layer header of total 2 bytes may be added. Accordingly, when a length of an RoHC packet, indicated by the length field, is L bytes, a total length of the link layer packet is (L+2) bytes.

Figure 56:
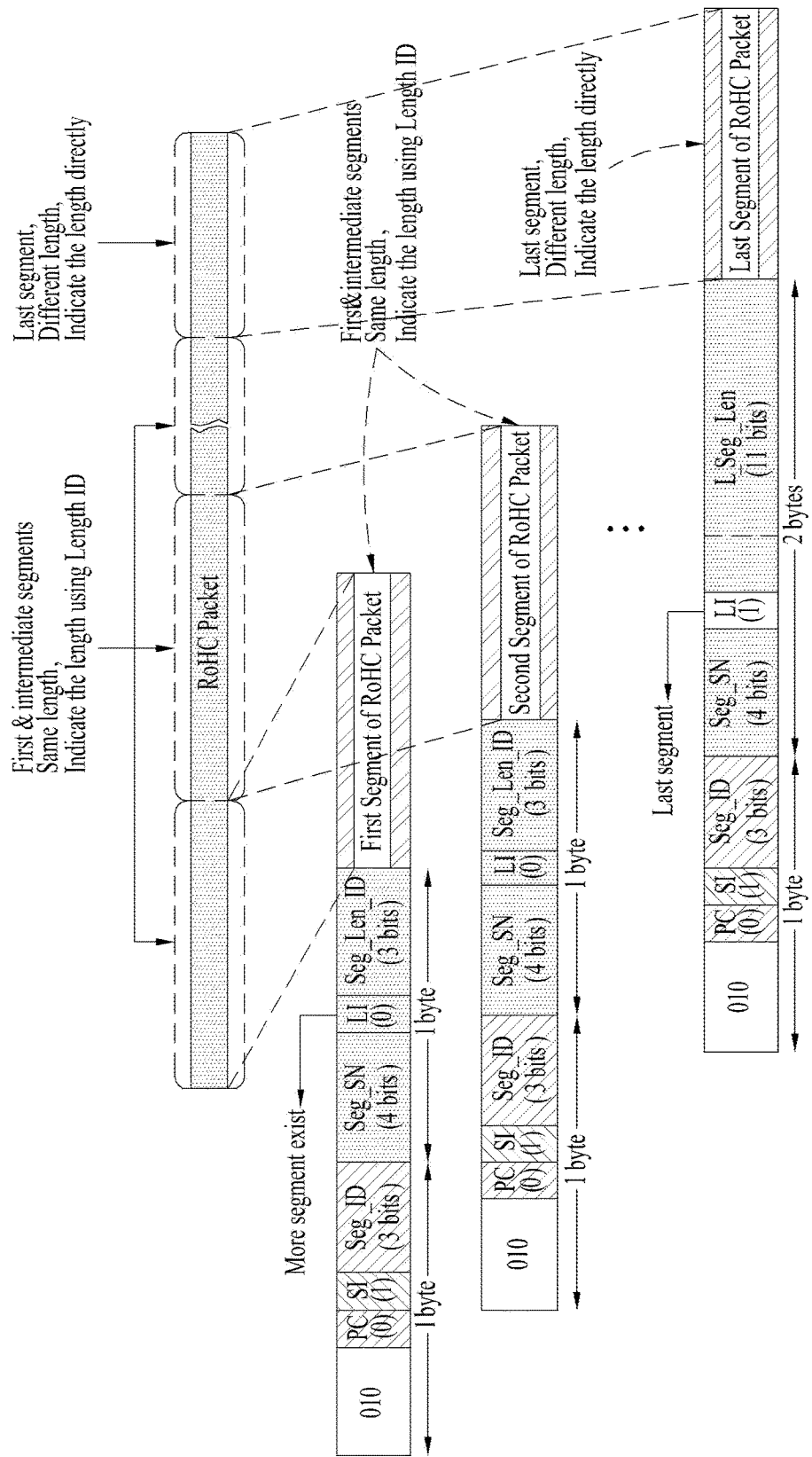
FIG. 56 is a diagram illustrating a method for transmitting an RoHC packet through a link layer packet when a MTU is 1500 according to Embodiment #4 of the present invention.

FIG. 56 is a diagram illustrating a method for transmitting an RoHC packet through a link layer packet when a MTU is 1500 according to Embodiment #4 of the present invention.

According to the present embodiment, the MTU is 1500, an input RoHC packet exceeds a processing range of a physical layer (segmentation), and the segmented segments are encapsulated as a payload of a link layer packet.

In order to indicate segmentation, a value of the SI field may be 1.

As described above, the Seg_ID needs to have the same value and the Seg_SN needs to have a value that is sequentially increased. The LI field may have a value of 1 only in the case of a last segment and may have a value of 0 in the remaining cases. In addition, a length of each segment may be indicated using the Seg_Len_ID and the L_Seg_Len field. A detailed method for indicating a length may be the same as in the aforementioned case.

Total length information of a link layer packet may be calculated by adding a header length of a link layer packet, which can be known through the LI field. In addition, in order to check integrity during a procedure for recombining segments of an RoHC packet, a receiving side may add CRC. The CRC may be added to a last segment.

Figure 57:
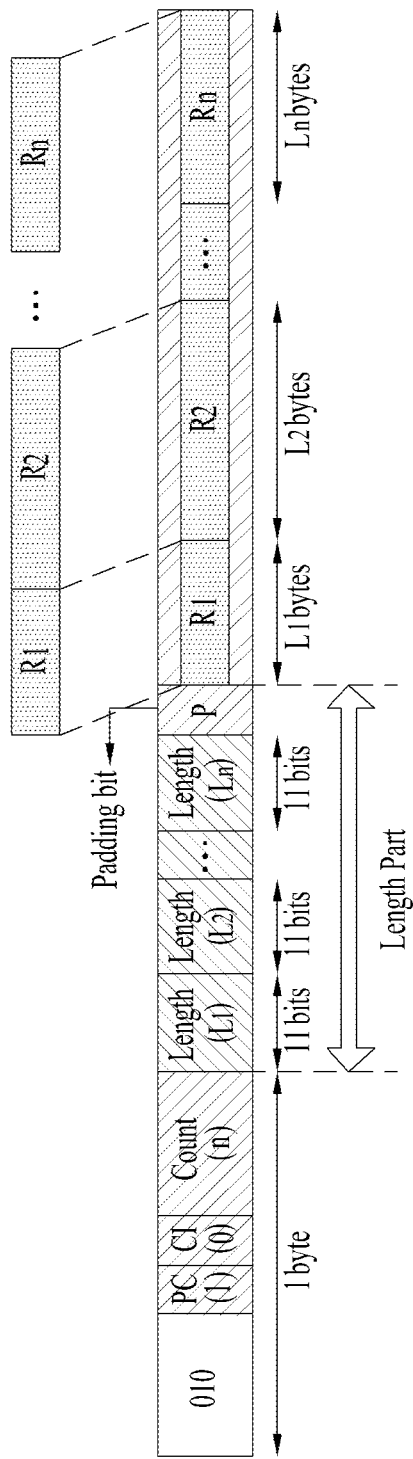
FIG. 57 is a diagram illustrating a method for transmitting an RoHC packet through a link layer packet when a MTU is 1500 according to Embodiment #5 of the present invention.

FIG. 57 is a diagram illustrating a method for transmitting an RoHC packet through a link layer packet when a MTU is 1500 according to Embodiment #5 of the present invention.

According to the present embodiment, when the MTU is 1500, an RoHC packet does not reach a processing range of a physical layer, and a plurality of RoHC packets are concatenated and included in a payload of a link layer packet (concatenation).

According to the present embodiment, 8 or less RoHC packets may be concatenated. In this case, an extended length part may not be required. A value of the PC field may be 1 and a value of the CI field may be 0. As described above, a value of the count field may be $000_B$ to $110_B$.

Here, when a value indicated by the count field is n, RoHC packets $R_1, R_2, \ldots, R_n$ with lengths $L_1, L_2, \ldots, L_n$ may be concatenated in a payload of a link layer packet. Each length field may have a length of 11 bits. As necessary, a padding bit may be positioned subsequent to the length field.

A total length $L_T$ of a link layer packet may be represented as follows $$L_T = 1 + L_{LP} + \sum_{k=1}^{n} L_k \text{ [bytes]} \quad \text{[Equation 9]}$$

Here, $L_{LP}$ may be a total length of a length part and $L_k$ may be a length of each RoHC packet.

Figure 58:
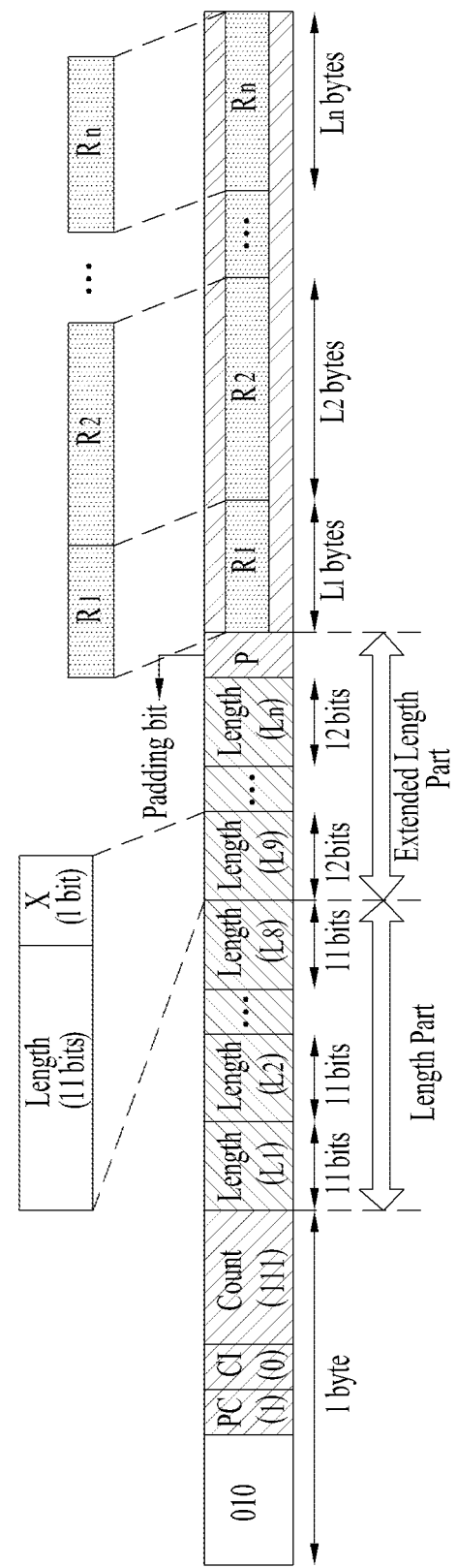
FIG. 58 is a diagram illustrating a method for transmitting an RoHC packet through a link layer packet when a MUT is 1500 according to Embodiment #6 of the present invention.

FIG. 58 is a diagram illustrating a method for transmitting an RoHC packet through a link layer packet when a MUT is 1500 according to Embodiment #6 of the present invention.

According to the present embodiment, when the MTU is 1500, the RoHC packet does not reach a processing range of a physical layer, and a plurality of RoHC packets are concatenated and included in a payload of a link layer packet (concatenation).

However, according to the present embodiment, 9 or more RoHC packets may be concatenated. In this case, an extended length part other than the length part may be required. As described above, the count field may have a value of 111.

In an extended length part, when the number of X fields with a value of 1 is m, the number n of RoHC packets concatenated in a payload of the link layer packet may be 8+(m+1). In this case, a total length $L_T$ of the link layer packet may be represented as follows.

$$L_T = 1 + L_{LP} + L_{ELP} + \sum_{k=1}^{n} L_k \text{ [bytes]} \quad \text{[Equation 10]}$$

Here, $L_{LP}$ may be a total length of the length part and $L_k$ may be a length of each RoHC packet. Here, $L_{ELP}$ may be a total length of the extended length part.

Figure 59:
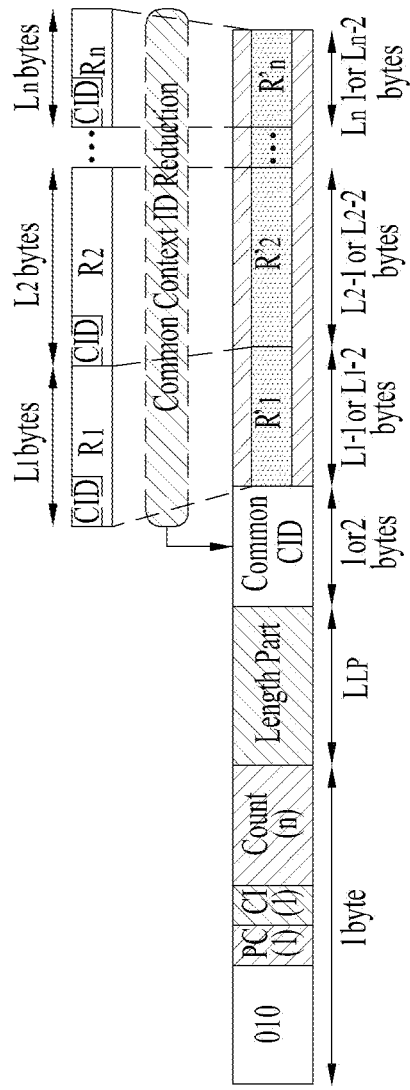
FIG. 59 is a diagram illustrating a method for transmitting an RoHC packet through a link layer packet when a MTU is 1500 according to Embodiment #7 of the present invention.

FIG. 59 is a diagram illustrating a method for transmitting an RoHC packet through a link layer packet when a MTU is 1500 according to Embodiment #7 of the present invention.

According to the present embodiment, the MTU is 1500, a plurality of RoHC packets are concatenated and included in a payload of a link layer packet. However, according to the present embodiment, concatenated RoHC packets may have the same context ID (CID).

In this case, a value of the aforementioned CI field may be 1. This may mean that processing is performed on the same CID. RoHC packets having the same CID are represented by [R1, R2, R3, . . . , Rn]. A common CID may be referred to as a common CID. A packet except for a CID from a header of a RoHC packet may be represented by R'k (k is 1, 2, . . . , n).

A payload of a link layer packet may include R'k (k is 1, 2, . . . , n). A common CID field may be a field in which a common CID is transmitted. The common CID field may be transmitted in one part of the extended header or transmitted in one part of a payload of a link layer packet. According to system management, the common CID field may be appropriately at a position in which a position of the common CID field can be checked.

A size of the common CID field may be varied according to a configuration of an RoHC packet.

When a configuration of an RoHC packet is a small CID configuration, a size of a CID of the RoHC packet may be 4 bits. However, when the CID is extracted and reordered in the RoHC packet, all add-CID octets may be processed. In addition, an add-CID octet of 1 byte is extracted from an RoHC packet, only a CID of 4 bits is allocated to a common CID field, and then the remaining 4 bits may be reserved for future use.

When a configuration of an RoHC packet is a large CID configuration, a size of a CID of an RoHC packet may be 1-byte or 2-bytes length. A size of the CID may be determined in an RoHC initialization procedure. According to the size of the CID, the common CID field may have a length of 1 byte or 2 bytes.

In this case, a total length $L_T$ of a link layer packet may be calculated as follows.

$$L_T = 1 + L_{LP} + L_{CID} + \sum_{k=1}^{n} (L_k - L_{CID}) \text{ [bytes]} \quad \text{[Equation 11]}$$

Here, $L_{CID}$ may refer to a length of a common CID field. As described above, $L_{CID}$ may be determined according to the CID configuration of the RoHC.

Using the same method, when n is 9 or more (when a value of the count field is $111_B$), a total length $L_T$ of the link layer packet may be calculated as follows.

$$L_T = 1 + L_{LP} + L_{ELP} + L_{CID} + \sum_{k=1}^{n}(L_k - L_{CID}) \text{ [bytes]} \quad \text{[Equation 12]}$$

Similarly, here, $L_{CID}$ may refer to a length of a common CID field.

Figure 60:
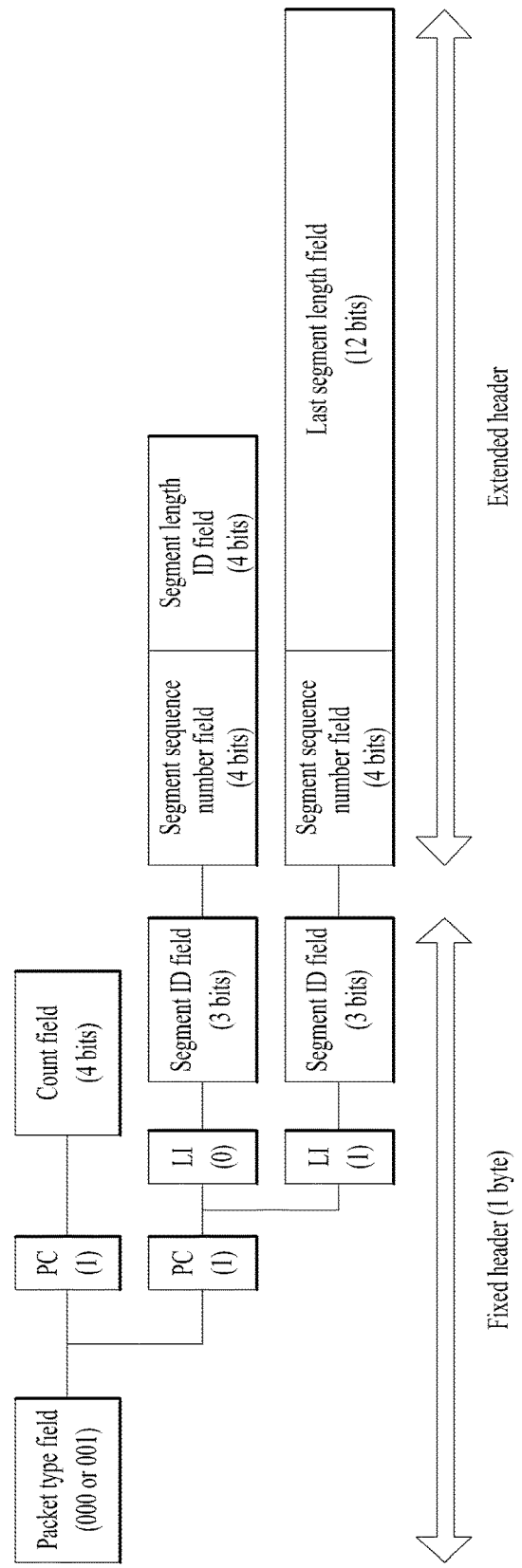
FIG. 60 is a diagram illustrating a configuration of a header of a link layer packet when an IP packet is transmitted to a link layer, according to another embodiment of the present invention.

FIG. 60 is a diagram illustrating a configuration of a header of a link layer packet when an IP packet is transmitted to a link layer, according to another embodiment of the present invention.

In this case, the header of the link layer packet may include a fixed header and an extended header. The fixed header may have a length of 1 byte and the extended header may have a fixed length or a variable length. A length of each header may be changed according to a designer's intention.

The fixed header may include a packet type field, a PC field, and/or a count field. According to another embodiment of the present invention, the fixed header may include a packet type field, a PC field, a LI field, and/or a segment ID field.

The extended header may include a segment sequencer number field and/or a segment length ID field. According to another embodiment of the present invention, the extended header may include a segment sequencer number field and/or a last segment length field.

Fields of the fixed header will be described below.

As described above, the packet type field may indicate a type of a packet input to a link layer. When the IP packet is input to the link layer, a value of the packet type field may be 000B or 001B.

A packet configuration (PC) field may indicate the remaining part of a subsequent fixed header and/or a configuration of the extended header. That is, the PC field may indicate a type of an input IP packet. Accordingly, the PC field may contain information about a length of the extended header.

When a value of the PC field is 0, the value may mean that a payload of a link layer packet includes one IP packet or two or more concatenated IP packets. Here, concatenation may indicate that a plurality of packets with a short length is connected to configure a payload.

In addition, when a value of the PC field is 0, a count field of 4 bits may be subsequent to the PC field. Here, the count field may indicate the number of concatenated IP packets included in one payload. The number of concatenated IP packets according to a value of the count field will be described below.

In addition, when a value of the PC field is 0, a link layer may not include an extended header. However, in some embodiments, when a length of a link layer packet needs to be indicated, an extended header of 1-2 bytes may be added. In this case, the extended header may be used to indicate the length of the link layer packet.

When a value of the PC field is 1, the value may mean that a payload of a link layer packet includes segmented packets. Here, the segmented packet may indicate the number of segments segmented from an IP packet with a long length. Each segmented segment may be referred to as a segment or a segmented packet. That is, when a value of the PC field is 1, the payload of the link layer packet may include one segmented packet, that is, a segment.

When a value of the PC field is 1, an LI field of 1 bit and a segment ID field of 3 bits may be subsequent to the PC field.

A last segment indicator (LI) field may indicate whether a corresponding link layer packet includes a very last segment among segmented segments. That is, when a value of LI field is 1, a corresponding link layer may include a very last segment among segmented segments, and when a value of the LI field is 0, the corresponding link layer may not include the very last segment. The LI field may be used to reconfigure an original IP packet by a receiver. A value of the LI field may indicate information about an extended header of a link layer packet. That is, when a value of the LI field is 0, a length of the extended header may be 1 byte, and when the value is 1, the length of the extended header may be 2 bytes, which will be described below in detail.

The segment ID field may indicate an ID of a segment included in a corresponding link layer packet. When one IP packet is segmented, segments may be provided with the same ID. The segment ID may indicate that segments are components of the same IP packet when the receiver reconfigures an original IP packet. The segment ID field has a size of 3 bits, and thus segmentation of a total of 8 IP packets may be simultaneously supported.

In addition, when a value of the PC field is 1, an extended header may be used for information about segmentation. As described above, the extended header may include a segment sequencer number, a segment length ID field, and/or a last segment length field, etc.

Fields of the extended header will now be described.

When the aforementioned LI field has a value of 0, that is, when a segment included in a link layer packet is not a last segment, the extended header may include a segment sequencer number field and/or a segment length ID field.

The segment sequencer number field may include a sequencer of a segmented packet. Accordingly, link layer packets having segments segmented from one IP packet may have the same segment ID field but have different segment sequencer number fields. The segment sequencer number field has a size of 4 bits, and thus one IP packet may be segmented to a maximum of 16 segments.

The segment length ID field may indicate lengths of segments that are not a last segment. The lengths of the segments that are not a last segment may be the same. Accordingly, the lengths thereof may be represented using a predetermined length ID. The segment length ID field may indicate a length ID thereof.

A length of a segment may be set according to an input size of a packet, which is determined according to an FEC code rate of a physical layer. That is, the length of the segment may be determined according to the input size thereof, and the segments thereof may be determined by a segment length ID. In order to reduce overhead of a header, a length of a segment may be limited to 16.

A value of a segment length ID field according to a length of a segment will be described later.

When a physical layer operates irrespective of a length of a segment, the length of the segment may be obtained by adding a minimum segment length (min_Len) to multiplication of a segment length ID and a length unit (Len_Unit). Here, the Len_Unit may be a basic unit indicating a length of a segment and the min_Len may refer to a minimum of a segment length. The Len_Unit and the min_Len may always have the same value in a transmitter and a receiver, and it is effective in terms of system management when the Len_Unit and the min_Len are not changed after being determined once. The Len_Unit and the min_Len may be determined in consideration of processing capability of FEC of a physical layer during an initialization procedure of a system.

When the aforementioned LI field has a value of 1, that is, when a segment included in a link layer packet is a last segment, an extended header may include a segment sequencer number field and/or a last segment length field.

The segment sequencer number field is the same as in the aforementioned case.

The last segment length field may directly indicate a length of a last segment. When one IP packet is segmented to segments with a specific length, the last segment may have a different length from other segments. Accordingly, the last segment length field may directly indicate a length of the last segment. The last segment length field may indicate 1-4095 bytes. A byte number to be indicated may be different in some embodiments.

FIG. 61 is a diagram illustrating information indicated by each field in a header of a link layer packet when an IP packet is transmitted to a link layer, according to another embodiment of the present invention.

As described above, the number of concatenated IP packets may be determined according to a value of a count field (t61010). The value of the count field may refer to the number of concatenated IP packets without changes but may be meaningless when 0 packet is concatenated. Accordingly, the count field may indicate that IP packets, the number of which is obtained by adding 1 to the value of the count field, are concatenated. That is, as shown in Table (t61010), 0010 may indicate that 3 IP packets are concatenated and 0111 may indicate that 8 IP packets are concatenated.

Here, when a value of the count field is 0000, the value may indicate that one IP packet is concatenated and indicate that a payload of a link layer packet includes one IP packet without concatenate.

As described above, a length of a segmented segment may be represented by a value of a segment length ID field (t61020).

For example, when a value of the segment length ID field is 0000, a segment length may be 512 bytes. This may indicate that a segment included in a payload of a corresponding link layer packet is not a last segment and has a length of 512 bytes. When other segments segmented from the same IP packet of the segment are not a last segment, the segment may have a length of 512 bytes.

In the tables, a length unit may have a value of 256 and a minimum segment length may have a length of 512. Accordingly, the minimum segment length may be 512 bytes (segment length ID field=0000). In addition, determined lengths of a segment may be increased with an interval of 256 bytes.

Figure 62:
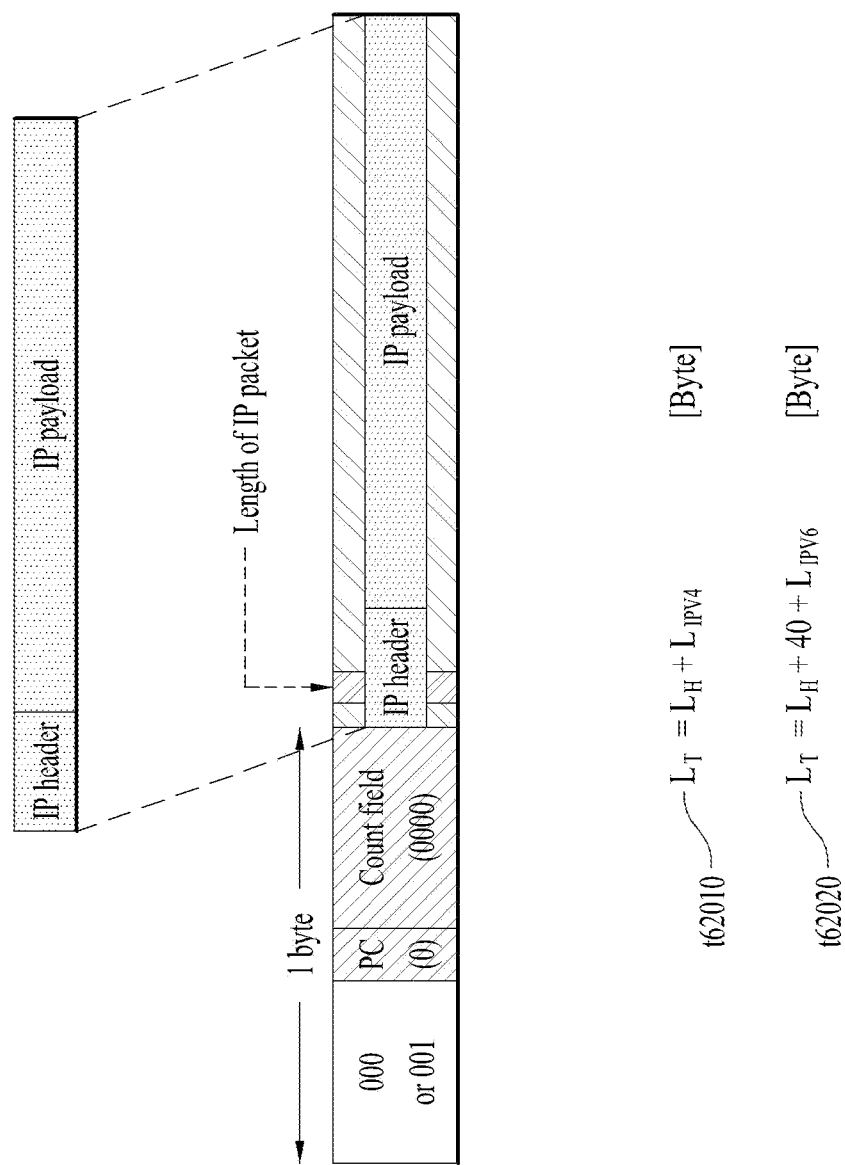
FIG. 62 is a diagram illustrating the case in which one IP packet is included in a link layer payload with respect to a header of a link layer packet when an IP packet is transmitted to a link layer, according to another embodiment of the present invention.

FIG. 62 is a diagram illustrating the case in which one IP packet is included in a link layer payload with respect to a header of a link layer packet when an IP packet is transmitted to a link layer, according to another embodiment of the present invention.

When one IP packet is included in a link layer payload, the case in which concatenation or segmentation is not performed may be referred to as encapsulation as a normal packet. In this case, an IP packet may be within a processing range of a physical layer.

According to the present embodiment, a link layer packet may have a header of a total of 1 byte. A length of the header may be changed in some embodiments. A value of the packet type field may be 000 (in the case of IPv4) or 001 (in the case of IPv6). The normal packet encapsulation procedure may be applied to IPv4 or IPv6 in the same way. A value of the PC field may be 0 since one packet is included in a payload. A subsequent count field may have a value of 0000 since only one packet is included in a payload.

According to the present embodiment, a payload of a link layer packet may include one IP packet without changes.

According to the present embodiment, information of an IP packet header may be used in order to check a length of a link layer packet. The IP packet header may include a field indicating a length of an IP packet. The field may be referred to as a length field. A position of an IP packet, in which the length field is positioned, may be fixed. Since one IP packet is included in a payload of a link layer without changes, the length field may be positioned at a position spaced apart from an initial part of the payload of the link layer packet by a predetermined offset length. Accordingly, a total length of the payload of the link layer may be known using the length field.

In the case of IPv4, the length field may be positioned at a position spaced apart from a start point of a payload by 2 bytes, and in the case of IPv6, the length field may be positioned at a position spaced apart from the start point of the payload by 4 bytes. The length field may have a length of 2 bytes.

In the case of IPv4, when a value of the length field is LIPv4 and a header length of the link layer packet is LH (1 byte), a total length LT of a link layer packet may be represented according to the shown equation (t62010). Here, a value LIPv4 of the length field may indicate a total length of an IPv4 packet.

In the case of IPv6, when a value of the length field is LIPv6 and a header length of the link layer packet is LH (I byte), a total length LT of a link layer packet may be represented according to the shown equation (t62020). Here, a value LIPv6 of the length field may indicate only a length of a payload of an IPv6 packet, and thus a length (40 bytes) of a fixed header of an IPv6 packet needs to be added in order to obtain the total length of the link layer packet.

Figure 63:
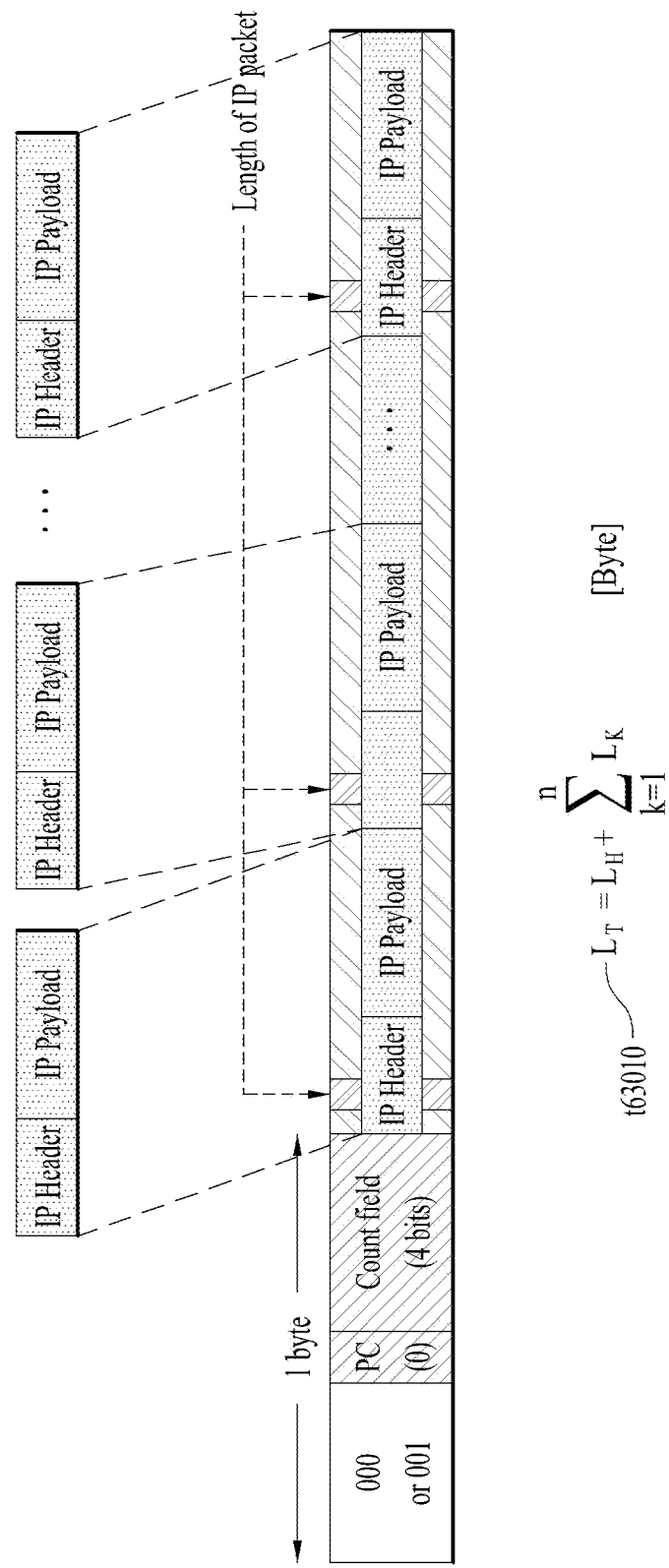
FIG. 63 is a diagram illustrating the case in which a plurality of IP packets are concatenated and included in a link layer payload with respect to a header of a link layer packet when an IP packet is transmitted to a link layer, according to another embodiment of the present invention.

FIG. 63 is a diagram illustrating the case in which a plurality of IP packets are concatenated and included in a link layer payload with respect to a header of a link layer packet when an IP packet is transmitted to a link layer, according to another embodiment of the present invention.

When an input IP packet does not reach a processing range of a physical layer, a plurality of IP packets may be concatenated to be encapsulated as a payload of one link layer packet.

According to the present embodiment, a link layer packet may have a header with a total of 1 byte. A length of the header may be changed in some embodiments. A value of the packet type field may be 000 (in the case of IPv4) or 001 (in the case of IPv6). An encapsulation procedure according to the present embodiment may be applied to IPv4 or IPv6 in the same way. A value of the PC field may be 0 since a plurality of concatenated IP packets is included in a payload. A subsequent count field may indicate the number of a plurality of concatenated IP packets (4 bits).

According to the present embodiment, a payload of a link layer packet may include a plurality of IP packets. The IP packets may be concatenated by connecting front and rear parts thereof and included in a payload of a link layer packet. A concatenation method may be changed according to a designer's intention.

According to the present embodiment, in order to check a length of a link layer packet, information of a header of a concatenated IP packet may be used. Like the aforementioned normal packet encapsulation, a length field indicating a length of an IP packet may exist in a header of the IP packet. In addition, the length fields may be positioned at a fixed position in the IP packet.

Accordingly, when a header length of a link layer packet is LH and a length of each IP packet is Lk (here, k is equal to or more than 1 and is equal to or less than n), a total length LT of a link layer packet may be represented according to the shown equation (t63010). That is, when a header length of a link layer packet is added to a value obtained by summing lengths of IP packets indicated by length fields of IP packets, a total length of the link layer packet may be obtained. A value of Lk may be checked by reading a length field of a header of each IP packet.

Figure 64:
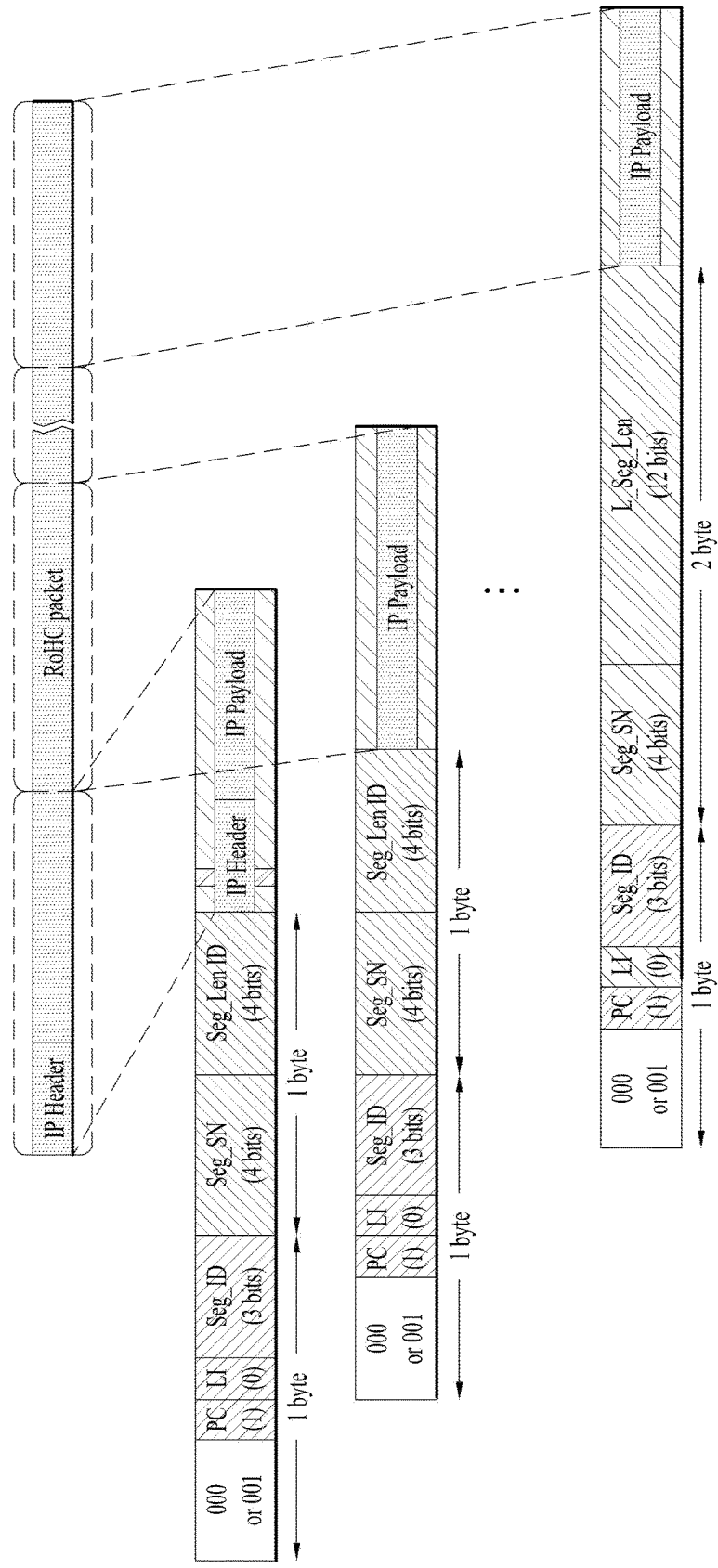
FIG. 64 is a diagram illustrating the case in which one IP packet is segmented and included in a link layer payload with respect to a header of a link layer packet when an IP packet is transmitted to a link layer, according to another embodiment of the present invention.

FIG. 64 is a diagram illustrating the case in which one IP packet is segmented and included in a link layer payload with respect to a header of a link layer packet when an IP packet is transmitted to a link layer, according to another embodiment of the present invention.

When an input IP packet exceeds a processing range of a physical layer, one IP packet may be segmented to a plurality of segments. The segmented segments may be encapsulated in a payload of each link layer packet.

According to the present embodiment, link layer packets t64010, t64020, and t64030 may each have a fixed header and an extended header. Lengths of the fixed header and the extended header may be changed in some embodiments. A value of a packet type field may be 000 (in the case of IPv4) or 001 (in the case of IPv6). An encapsulation procedure according to the present embodiment may be applied to IPv4 or IPv6 in the same way. A value of the PC field may be 1 since segmented segments are included in a payload.

The link layer packets t64010 and t64020 having segments that are not a last segment as a payload may have a LI field value of 0 and the segment ID fields may have the same value. This is because the segments are segmented from the same IP packet. A subsequent segment sequencer number field may indicate a sequence of a corresponding segment. Here, a segment sequence field value of the first link layer packet t64010 may indicate that a corresponding link layer packet has a first segment as a payload. A segment sequence field value of the second link layer packet t64020 may indicate that a corresponding link layer packet has a second segment as a payload. The segment length ID field may represent a length of a segmented segment with a predetermined length ID.

The link layer packet t64030 having a last segment as a payload may have a LI field value of 1. Here, the segment ID field may be the same as other link layer packets. This is because a last segment is also segmented from the same IP packet. A subsequent segment sequencer number field may indicate a sequence of a corresponding segment. A last segment length field may directly indicate a length of a last segment of the link layer packet t64030.

According to the present embodiment, in order to check a length of a link layer packet, a segment length ID field or a last segment length field may be used. The respective fields indicate only a length of a payload of a corresponding link layer packet, and thus a header length of a link layer packet needs to be added in order to obtain a total length of the link layer packet. The header length of the link layer packet may be known from the LI field, as described above.

Figure 65:
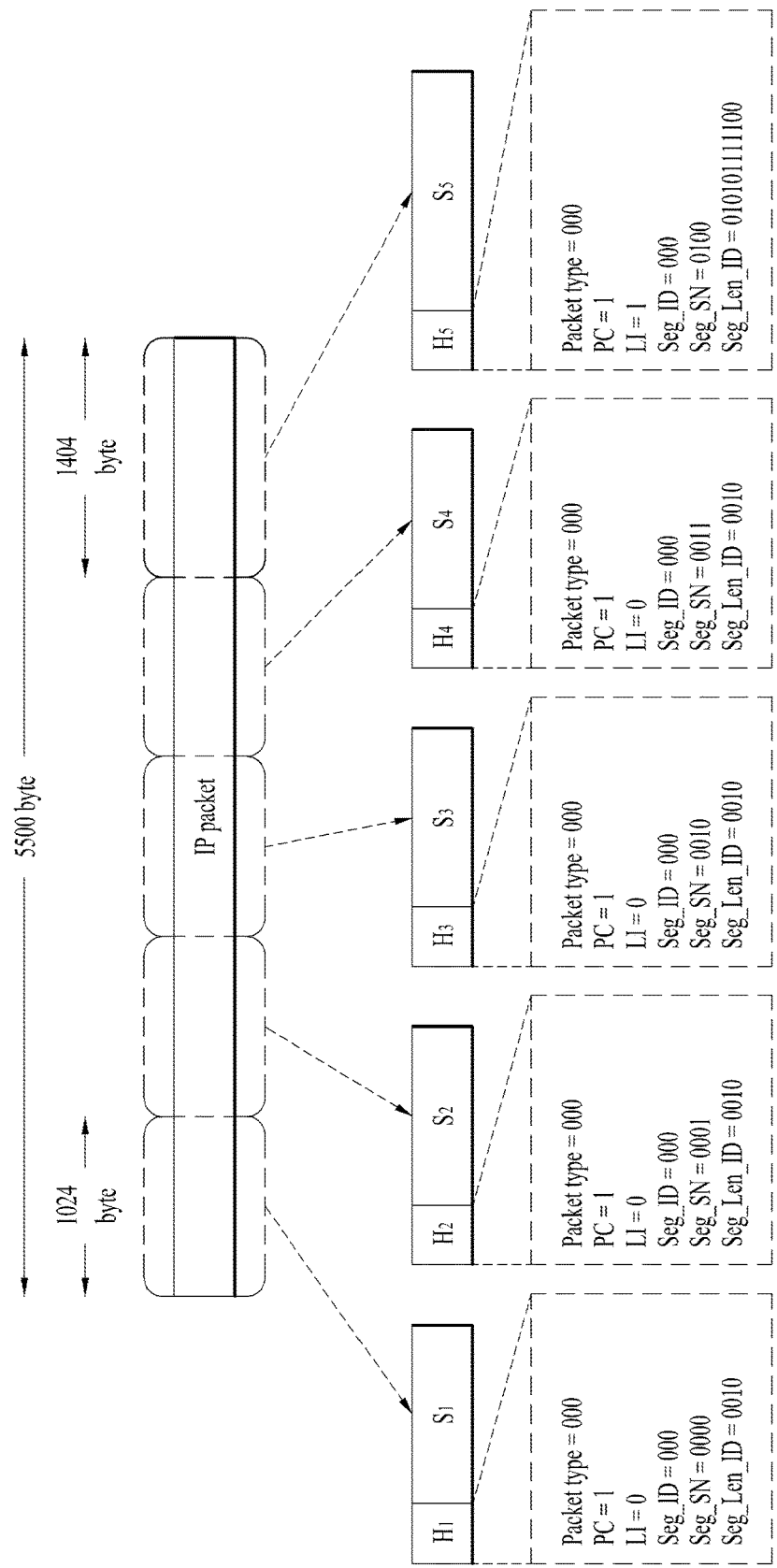
FIG. 65 is a diagram illustrating link layer packets having segmented segments with respect to a header of a link layer packet when an IP packet is transmitted to a link layer, according to another embodiment of the present invention.

FIG. 65 is a diagram illustrating link layer packets having segmented segments with respect to a header of a link layer packet when an IP packet is transmitted to a link layer, according to another embodiment of the present invention.

According to the present embodiment, it is assumed that an IP packet of 5500 bytes is input. Since a value obtained by dividing 5500 by 5 is 1100, each segment may be configured with a length of 1024 bytes closest to the value. In this case, a last segment may be 1404 bytes (010101111100B). Segmented segments may be referred to as S1, S2, S3, S4, and S5, respectively, and headers corresponding thereto may be referred to as H1, H2, H3, H4, and H5, respectively. The headers may be added to the segments to generate respective link layer packets.

When an input IP packet is an IPv4 packet, packet type fields of H1 to H5 may have a value of 000. In addition, a PC field value of H1 to H5 may have a segmented packet as a payload and thus may be 1.

An LI value of H1 to H4 does not have a last segment as a payload and thus may be 0. An LI value of H5 has a last segment as a payload and thus may be 1. Seg_ID, that is, a segment ID field of H to H5 has segments from the same packet as a payload and thus may have the same value (000).

Seg_SN, that is, a segment sequencer number field of H1 to H5 may sequentially represent H1 to H5 as 0000B to 0100B. A segment length ID field of H1 to H4 may have a value of 0010 corresponding to an ID of a 1024-byte length. A segment length field of H5 may have a value of 010101111100 indicating 1404 bytes.

Figure 66:
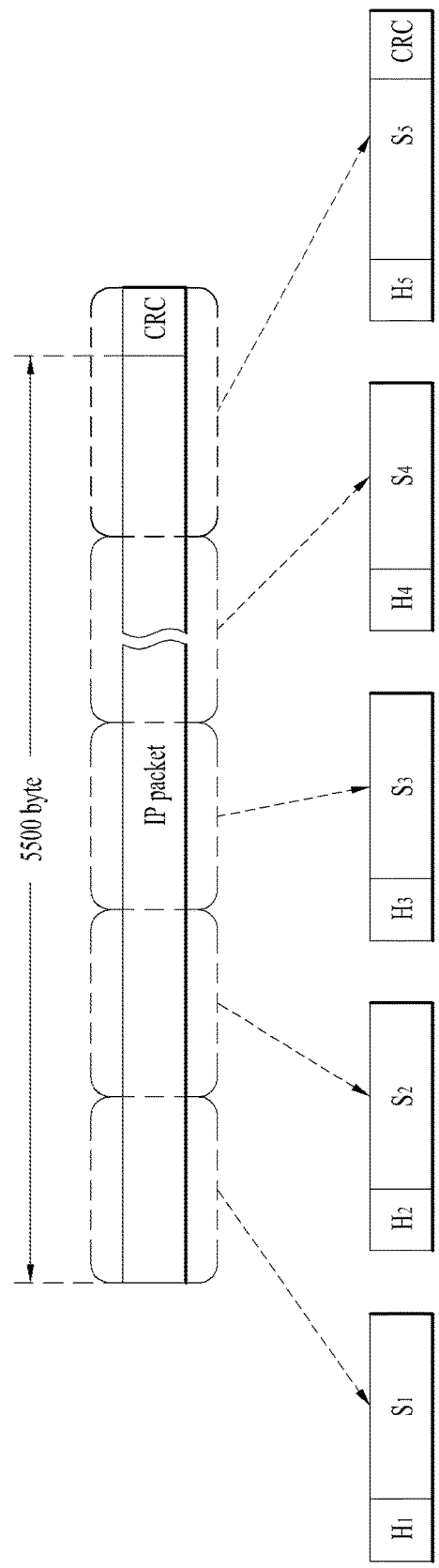
FIG. 66 is a diagram illustrating a method for using CRC encoding with respect to a header of a link layer packet when an IP packet is transmitted to a link layer, according to another embodiment of the present invention.

FIG. 66 is a diagram illustrating a method for using CRC encoding with respect to a header of a link layer packet when an IP packet is transmitted to a link layer, according to another embodiment of the present invention.

When an IP packet is segmented and processed as a link layer packet, a receiver needs to receive a plurality of link layer packets to recombine an original IP packet. The receiver may need to check integrity of the recombined IP packet.

To this end, CRC encoding may be used. Prior to segmentation of an IP packet, CRC may be added subsequent to the IP packet. When an IP packet to which CRC is added is segmented, a link layer packet including a last segment may also include CRC. The receiver may check the CRC and determine whether recombination is successful without errors.

In general, the CRC may be added to a last part of a packet but may be positioned at another position in some embodiments.

Figure 67:
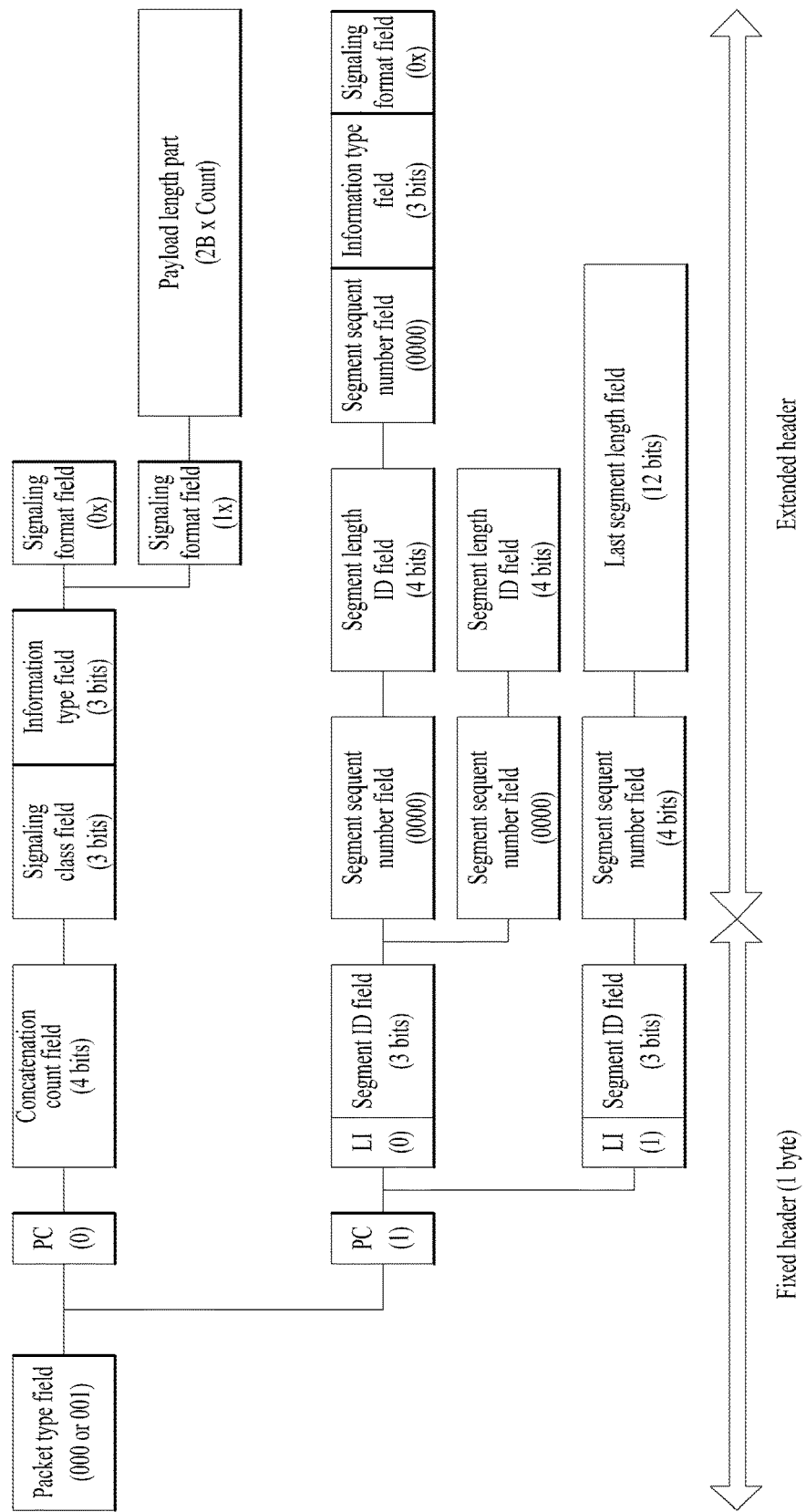
FIG. 67 is a diagram illustrating a configuration of a link layer packet when signaling information is transmitted to a link layer according to another embodiment of the present invention.

FIG. 67 is a diagram illustrating a configuration of a link layer packet when signaling information is transmitted to a link layer according to another embodiment of the present invention.

In this case, a header of a link layer packet may include a fixed header and an extended header. The fixed header may have a length of 1 byte and the extended header may have a fixed length or a variable length. A length of each header may be changed according to a designer's intention.

The fixed header may include a packet type field, a PC field, and/or a concatenation count field. According to another embodiment of the present invention, the fixed header may include a packet type field, a PC field, an LI field, and/or a segment ID field.

The extended header may include a signaling class field, an information type field, and/or a signaling format field. According to another embodiment of the present invention, the extended header may further include a payload length part. According to another embodiment of the present invention, the extended header may include a segment sequencer number field, a segment length ID field, a signaling class field, an information type field, and/or a signaling format field. According to another embodiment of the present invention, the extended header may include a segment sequencer number field and/or a segment length ID field. According to another embodiment of the present invention, the extended header may include a segment sequencer number field and/or a last segment length field.

The fields of the fixed header will now be described.

As described above, the packet type field may indicate a type of a packet input to a link layer. When signaling information is input to a link layer, a value of the packet type field may be 110B.

The PC field, the LI field, the segment ID field, the segment sequencer number field, the segment length ID field, and the last segment length field are the same as the aforementioned fields. The concatenation count field may be the same as the aforementioned count field.

The fields of the extended header will now be described.

When the PC field has a value of 0, the extended header may include a signaling class field, an information type field, and/or a signaling format field. In addition, according to a value of the signaling format field, the extended header may further include a payload length part.

The signaling class field may indicate a type of signaling information included in a link layer packet. The signaling information indicated by the signaling class field may be, for example, fast information channel (FIC) information or header compression information. The signaling information indicated by the signaling class field will be described later.

The information type field may indicate detailed information thereof with respect to signaling information of a type indicated by the signaling class field. The information type field may be separately defined according to a value of the signaling class field.

The signaling format field may indicate a format of signaling information included in a link layer packet. The format indicated by the signaling format field may be a section table, a descriptor, XML, or the like. The format indicated by the signaling format field will be described later.

The payload length part may indicate a length of signaling information included in a payload of a link layer packet. The payload length part may be a combination of length fields indicating lengths of concatenated singling information items. Each length field may have a size of 2 bytes but the size may be changed according to a system configuration. A total length of the payload length part may be represented by the sum of lengths of the length fields. In some embodiments, a padding bit for alignment of bytes may be added. In this case, the total length of the payload length part may be increased by as much as the padding bit.

Whether the payload length part exists may be determined according to a value of the signaling format field. Like the section table and the descriptor, when corresponding signaling information has a value of a length of the corresponding signaling information, a separate length field may not be required. However, signaling information that does not have a separate length value may require a separate length field. In the case of signaling information that does not have a separate length value, a payload length part may exist. In this case, the payload length part may include length fields, the number of which corresponds to the number of count fields.

When the PC field has a value of 1 and the LI field has a value of 1, the extended header may include a segment sequencer number field and/or a last segment length field. When the PC field has a value of 1 and the LI field has a value of 0, the extended header may include a segment sequencer number field and/or a segment length ID field.

The segment sequencer number field, the last segment length field, and the segment length ID field are the same as the aforementioned fields.

When the PC field has a value of 1 and the LI field has a value of 0, if a payload of a corresponding link layer packet is a first segment, the extended header may further include additional information. The additional information may include a signaling class field, an information type field, and/or a signaling format field. The signaling class field, the information type field, and the signaling format field are the same as the aforementioned fields.

FIG. 68 is a diagram illustrating information indicated by fields with respect to a configuration of a link layer packet when signaling information is transmitted to a link layer, according to another embodiment of the present invention.

As described above, a type of signaling information included in a link layer packet may be represented by a signaling class field (t68010).

For example, when a value of the signaling class field is 000, signaling information may be signaling information for a fast information channel (FIC). When a value of the signaling class field is 001, the signaling information may be signaling information for emergency alert. When a value of the signaling class field is 010, the signaling information may be signaling information for header compression. When a value of the signaling class field is 011 to 110, the signaling class field may be reserved for a singling information type for future use. When a value of the signaling class field is 111, various types of signaling information may be included in the link layer packet.

A signaling information value indicated by the signaling class field may be differently determined in some embodiments.

As described above, a format of signaling information included in the link layer packet may be indicated by the signaling format field (t68020).

For example, when a value of the signaling format field is 00, the signaling information may be included in a payload in the form of a section table. When a value of the signaling format field is 01, the signaling information may be included in a payload in the form of a descriptor. When a value of the signaling format field is 10, the signaling information may be included in a payload in the form of XML. When the signaling format field has a value of 11, the signaling information may be included in a payload in other forms.

A format indicated by the signaling format field may be differently determined in some embodiments.

Figure 69:
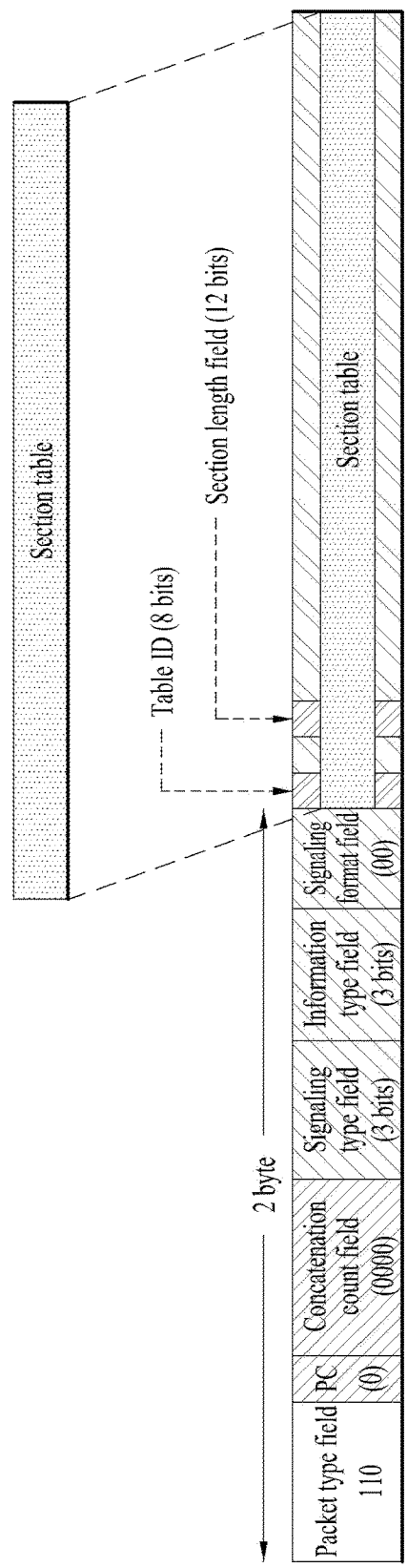
FIG. 69 is a diagram illustrating a configuration of a link layer packet when signaling information is one section table with respect to the configuration of the link layer packet when signaling information is transmitted to a link layer, according to another embodiment of the present invention.

FIG. 69 is a diagram illustrating a configuration of a link layer packet when signaling information is one section table with respect to the configuration of the link layer packet when signaling information is transmitted to a link layer, according to another embodiment of the present invention.

According to the present embodiment, it is assumed that one section table is encapsulated as one link layer packet.

According to the present embodiment, a header of a link layer packet may include a packet type field with a value of 110. Since one signaling information item is included in a payload of a link layer packet, the PC field may have a value of 0 and a concatenation count field may have a value of 0000. The signaling class field and the information type field may have a value according to data contained in the corresponding section table. Since signaling information is a section table, the signaling format field may have a value of 00.

According to the present embodiment, an input section table may be positioned in a payload of a link layer packet without changes.

According to the present embodiment, in order to use a length of a link layer packet, information of a section table may be used. As described above, a section table may include a field indicating a length of the corresponding section table. The field may be referred to as a length field. The length field may be positioned at a fixed position in the section table. Since one section table is input to a payload of a link layer without changes, a length field thereof may be positioned at a position spaced apart from a start point of the payload of the link layer packet by a predetermined offset. Accordingly, a total payload length of a link layer may be known using the length field. In the case of a section table, a length field of 12 bits may be positioned at a position spaced apart from the start point of the payload by 12 bits. The length field may be referred to as a Section_length field.

An Lsection of a length field may indicate a length to a last part of a section table immediately after the length field. Accordingly, when 3 bytes of the remaining part of the section table and 2 bytes of a header length of a link layer packet may be added to obtain a total length of the link layer packet. That is, a total length Lt of the link layer packet may be (Lsection+5) bytes.

Upon receiving a link layer packet according to the present embodiment, a receiver may process corresponding signaling information (section table) using the signaling class field and/or the information type field, etc. In addition, the receiver may check a value of a table ID (8 bits) of the section table and process the corresponding signaling information.

Figure 70:
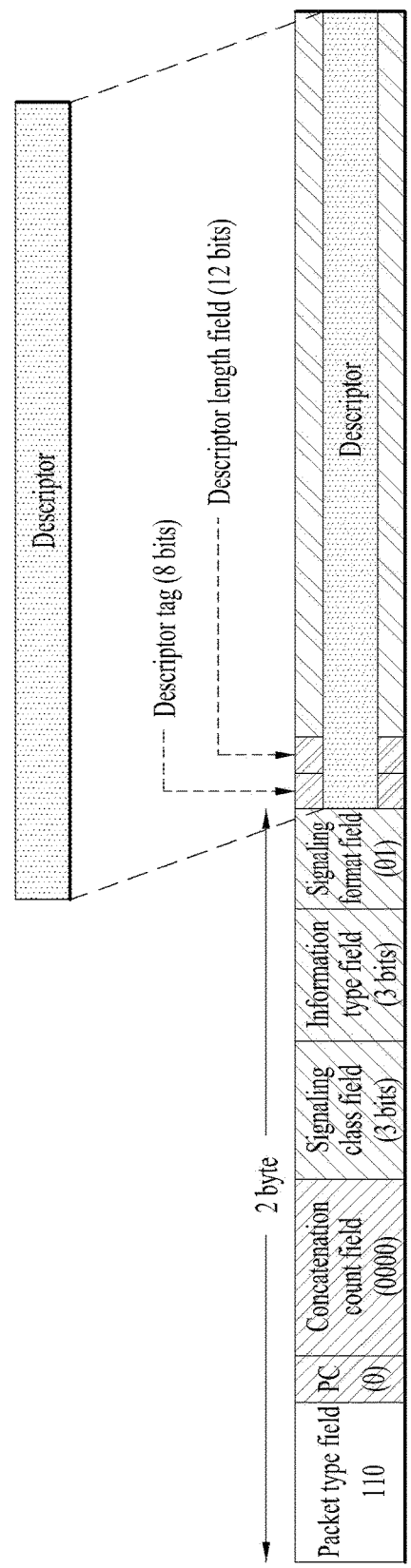
FIG. 70 is a diagram illustrating a configuration of a link layer packet when signaling information is one descriptor with respect to the configuration of the link layer packet when signaling information is transmitted to a link layer, according to another embodiment of the present invention.

FIG. 70 is a diagram illustrating a configuration of a link layer packet when signaling information is one descriptor with respect to the configuration of the link layer packet when signaling information is transmitted to a link layer, according to another embodiment of the present invention.

According to the present embodiment, it is assumed that one descriptor is encapsulated as one link layer packet.

According to the present embodiment, header information of the link layer packet may correspond to encapsulation of one section table. However, the signaling class field and the information type field may have a value according to data contained in the corresponding descriptor. In addition, since signaling information is a descriptor, the signaling format field may have a value of 01.

According to the present embodiment, an input descriptor may be positioned in a payload of a link layer packet without changes.

According to the present embodiment, in order to check a length of a link layer packet, information of a descriptor may be used. This may be similar to encapsulation of the aforementioned one section table. However, a position of a field indicating a length of a corresponding descriptor may be changed in the descriptor. In the case of a descriptor, a length field may be positioned at a position spaced apart from a start point of a payload by 8 bits and may have a length of 8 bits. Based thereon, a total length of the link layer packet may be known.

Upon receiving a link layer packet according to the present embodiment, a receiver may process signaling information (descriptor) using the signaling class field and/or the information type field, etc. In addition, the receiver may check a descriptor tag (8 bits) of a descriptor and process corresponding signaling information.

Figure 71:
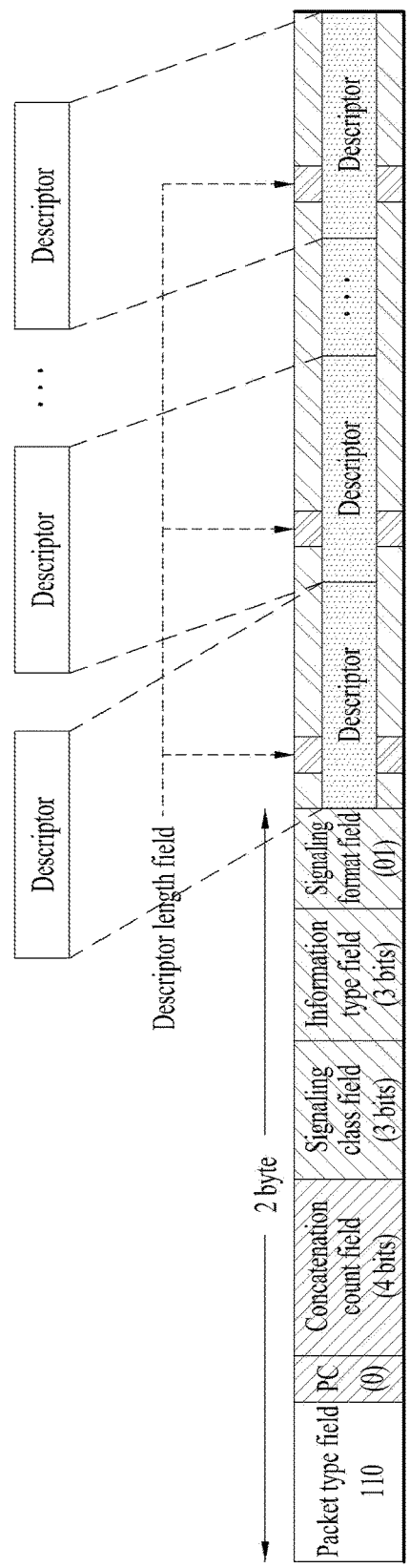
FIG. 71 is a diagram illustrating a configuration of a link layer packet when signaling information is a plurality of descriptors with respect to the configuration of the link layer packet when signaling information is transmitted to a link layer, according to another embodiment of the present invention.

FIG. 71 is a diagram illustrating a configuration of a link layer packet when signaling information is a plurality of descriptors with respect to the configuration of the link layer packet when signaling information is transmitted to a link layer, according to another embodiment of the present invention.

According to the present embodiment, a plurality of descriptors may be concatenated and encapsulated in a payload of a link layer packet.

A header of a link layer packet according to the present embodiment may include a packet type field of a value of 110 and a PC field of a value of 0. The concatenation count field may indicate the number of concatenated descriptors. The signaling class field and the information type field may have a value according to data of a corresponding descriptor. Since signaling information is a descriptor, the signaling format field may have a value of 01.

A total length of a link layer packet according to the present embodiment may be calculated using a similar method to concatenation of IP packets. A value of a descriptor_length field of a descriptor may be sequentially read by as much as the number indicated by the count field from a start point of a payload. The read values may be summed to obtain a total length of a payload of a link layer packet. Here, a header length of a link layer packet may be added to the resulting value to obtain a total length of a link layer packet.

Figure 72:
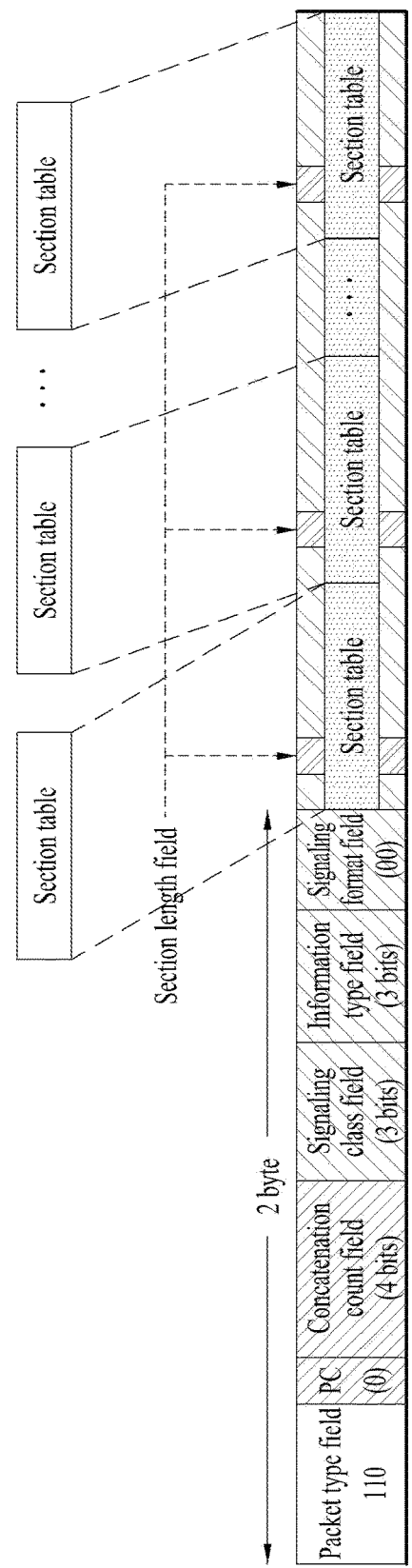
FIG. 72 is a diagram illustrating a configuration of a link layer packet when signaling information is a plurality of section tables with respect to the configuration of the link layer packet when signaling information is transmitted to a link layer, according to another embodiment of the present invention.

FIG. 72 is a diagram illustrating a configuration of a link layer packet when signaling information is a plurality of section tables with respect to the configuration of the link layer packet when signaling information is transmitted to a link layer, according to another embodiment of the present invention.

According to the present embodiment, a plurality of section tables may be concatenated and encapsulated in a payload of a link layer packet.

A header of a link layer packet according to the present embodiment may include a packet type field with a value of 110, a PC field with a value of 0, and a concatenation count field indicating the number of concatenated section tables. The signaling class field and the information type field may have a value according to data of corresponding section tables. Since signaling information is a section table, the signaling format field may have a value of 00.

A total length of a link layer packet according to the present embodiment may be obtained similarly to the case in which the aforementioned descriptors are concatenated. As described above, a length field of 12 bits may be positioned at a position spaced apart from a start point of the section table by 12 bits in a section table. A length of the remaining section table may be added to the length field to obtain a total length of a section table. Total lengths of section tables may be summed to obtain a total length of concatenated section tables, that is, a length of a link layer packet. Here, a header length of a link layer packet may be added to the resulting value to obtain a total length of the link layer packet.

Figure 73:
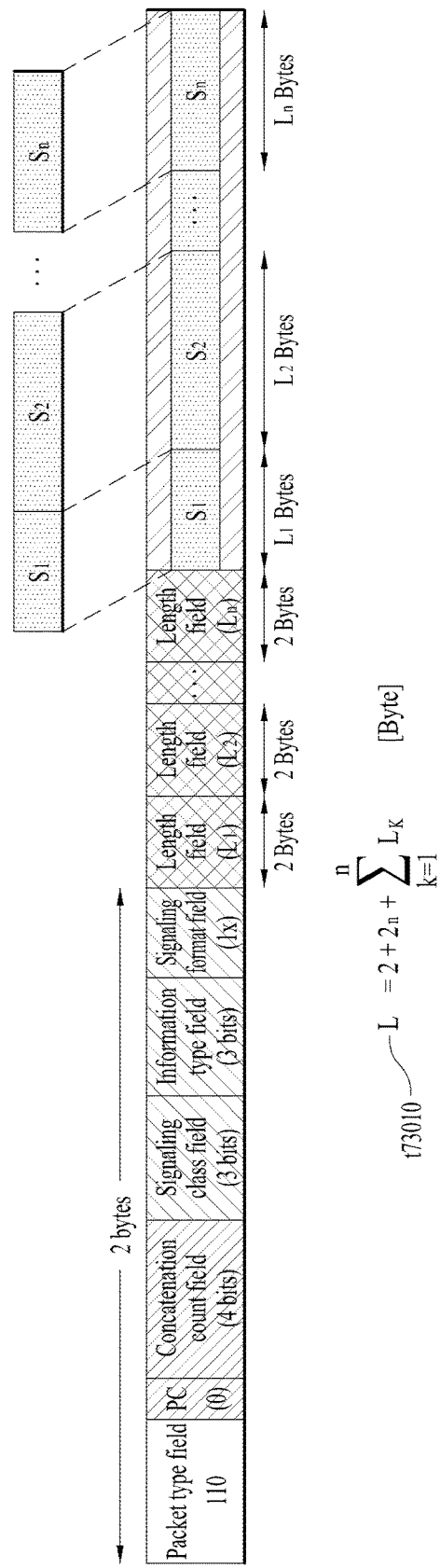
FIG. 73 is a diagram illustrating a configuration of a link layer packet when signaling information does not have a separate length value with respect to the configuration of the link layer packet when signaling information is transmitted to a link layer, according to another embodiment of the present invention.

FIG. 73 is a diagram illustrating a configuration of a link layer packet when signaling information does not have a separate length value with respect to the configuration of the link layer packet when signaling information is transmitted to a link layer, according to another embodiment of the present invention.

According to the present embodiment, the aforementioned signaling format field may indicate that corresponding signaling information is signaling information that does not have XML or a separate length value. As described above, an extended header may further include a payload length part.

According to the present embodiment, a header may include a packet field with a value of 110, a PC field with a value of 0, and a concatenation count field indicating the number of concatenated signaling information items. The subsequent signaling class field and information type field may have values according to data of the corresponding signaling information. Since the signaling information is XML or separate signaling information, the signaling format field may have a value of 10 or 11.

As described above, an added payload length part may include a plurality of length fields. Each length field may indicate a length of each signaling information item. Accordingly, length fields, the number of which corresponds to the number indicated by the concatenation count field, may exist. The length field may have a length of 2 bytes. A length of the length field may be changed according to a system configuration. A padding bit for byte alignment may be further added to a link layer packet.

According to the present embodiment, in order to obtain a total length of a link layer packet, length fields may be used (t73010). When a value indicated by the concatenation count field is n, a payload length part of a total of 2*n bytes may be added to a header. In addition, when values of length fields indicating lengths of concatenated signaling information items S1, S2, . . . , Sn are L1, L2, . . . , Ln, if a header length of a link layer packet is 2 bytes, a total length LT of a link layer packet may be represented as illustrated (t73010).

Figure 74:
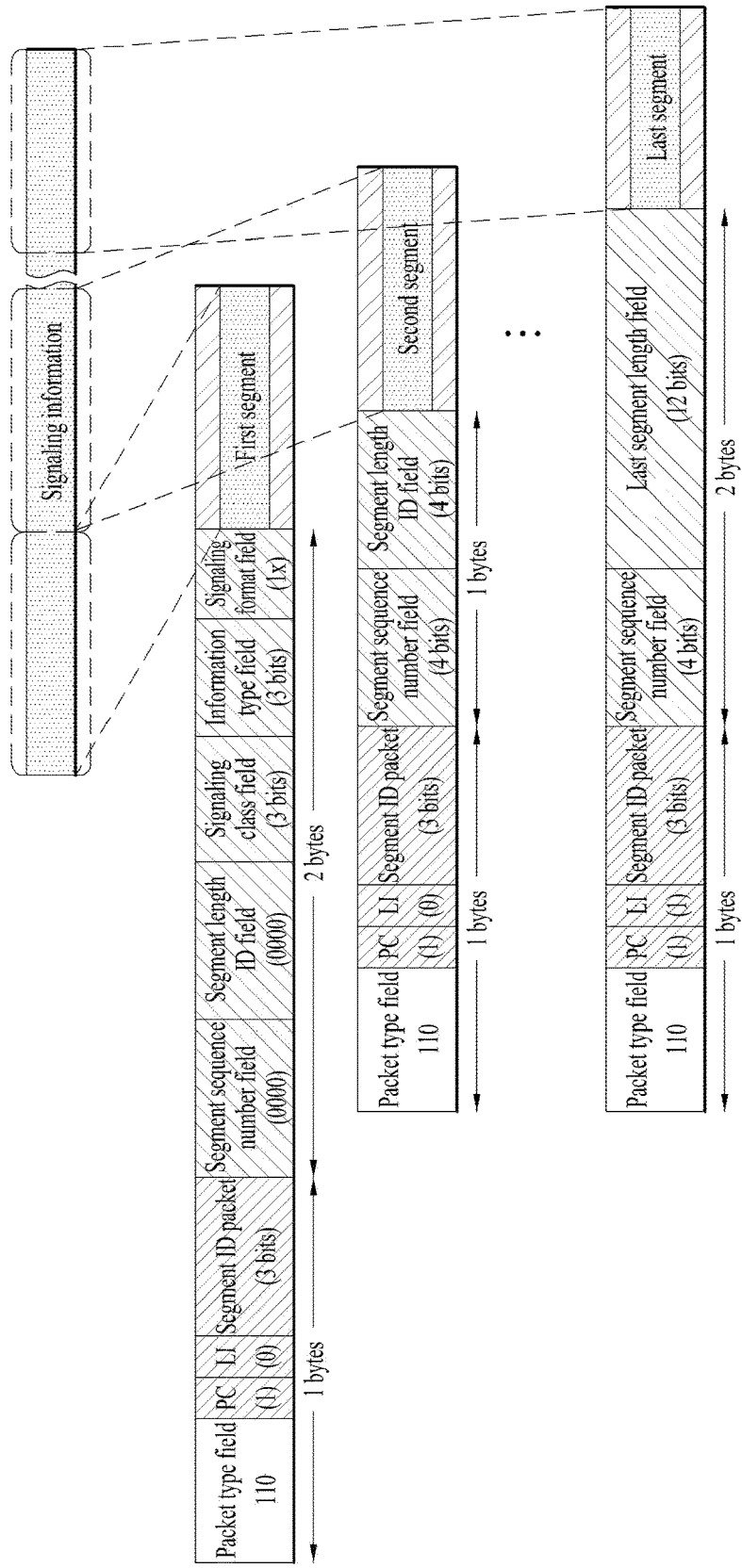
FIG. 74 is a diagram illustrating a configuration of a link layer packet when one signaling information item is segmented to a plurality of segments with respect to the configuration of the link layer packet when signaling information is transmitted to a link layer, according to another embodiment of the present invention.

FIG. 74 is a diagram illustrating a configuration of a link layer packet when one signaling information item is segmented to a plurality of segments with respect to the configuration of the link layer packet when signaling information is transmitted to a link layer, according to another embodiment of the present invention.

When input signaling information exceeds a processing range of a physical layer, one signaling information item may be segmented to a plurality of segments. Each segmented segment may be encapsulated in a payload of each link layer packet.

The configuration according to the present embodiment may have a similar header configuration to the case in which the aforementioned IP packet is segmented. The packet type field may have a value of 110 when signaling information is input. The PC field, the LI field, the segment ID field, the segment sequencer number field, the segment length ID field, and the last segment length field may be the same as in the aforementioned case in which an IP packet is segmented.

According to the present embodiment, unlike in the aforementioned case in which the IP packet is segmented, a first packet may further include additional information (t74010). As described above, the additional information may include a signaling class field, an information type field, and/or a signaling format field. When a receiver receives all segments, the additional information items may facilitate processing of the corresponding signaling information.

Information about an extended header of a link layer packet may be known according to a combination of an LI field value of a segment sequencer number field. When a value of the LI field is 0 and a value of a segment sequencer number field is 0000 (i.e., in the case of a first segment), a length of the extended header may be 2 bytes. When a value of the LI field is 0 and a value of the segment sequencer number field is not 0000, a length of the extended header may be 1 byte. When a value of the LI field is 1, a length of the extended header may be 2 bytes.

A total length of a link layer packet may be obtained by adding a length of a header of a link layer packet to the length of the segment, calculated through the segment length ID field or the last segment length field.

Like in the case in which an IP packet is segmented, CRC encoding may also be used when signaling information is segmented. The CRC may be added to a last part of the signaling information. The CRC may be used to check integrity of recombination when a receiver recombines signaling information. When signaling information to which the CRC is added is segmented, a link layer packet including a last segment may also include CRC.

In general, CRC may be added to a last part of a packet or may be positioned at other positions in some embodiments.

Figure 75:
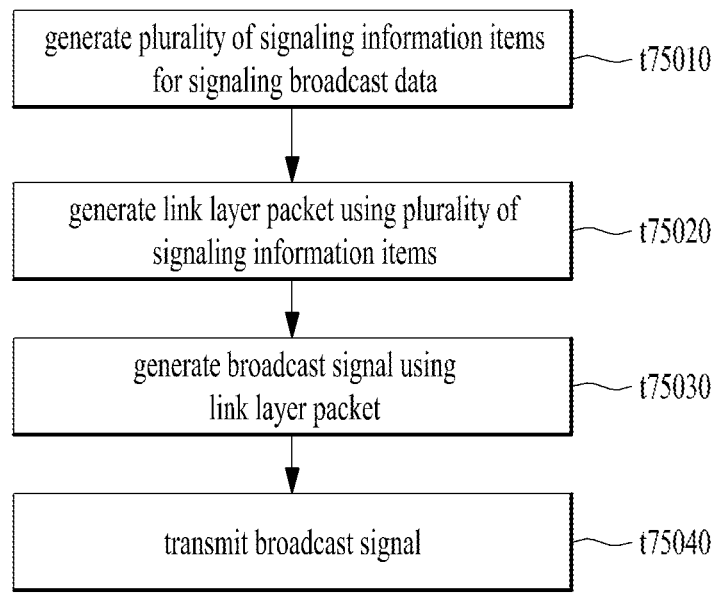
FIG. 75 is a diagram illustrating a method for transmitting a broadcast signal according to an embodiment of the present invention.

FIG. 75 is a diagram illustrating a method for transmitting a broadcast signal according to an embodiment of the present invention.

According to an embodiment of the present invention, the method for transmitting the broadcast signal may include generating a plurality of signaling information items for signaling broadcast data (t75010), generating a link layer packet using the signaling information items (t75020), generating a broadcast signal using the link layer packet (t75030), and/or transmitting the broadcast signal (t75040).

First, a plurality of signaling information items may be generated (t75010). Here, the signaling information items may be used to signal other broadcast data transmitted through a link layer. The content and type of signaling information may be changed in some embodiments. The generating of the signaling information items may be performed by a first module to be described later.

A link layer packet may be generated using the generated signaling information items (t75020). This step may correspond to a procedure for generating a link layer packet by concatenating the aforementioned signaling information items. As described above, the link layer packet may include a link layer header and a link layer payload. The link layer header may include a packet type field, a packet configuration field, and a count field, and the packet type field may indicate that information included in a link layer payload is signaling information. The packet configuration field may indicate whether a link layer payload includes a plurality of signaling information items and the count field may indicate the number of the signaling information items included in the link layer payload. Since the signaling information items are concatenated, a plurality of signaling information items may be concatenated and included in a link layer payload.

Here, the link layer header may refer to the aforementioned fixed header or extended header or an entire header including the fixed header and the extended header according to the context. The packet configuration field may refer to the aforementioned PC field. The link layer payload may refer to a payload of a link layer packet. The generating of the link layer packet may be performed by a second module to be described later.

A broadcast signal may be generated using the generated link layer packet (t75030). In a physical layer, predetermined encoding, modulation, etc. may be applied to the link layer packet generated in a link layer. Through the link layer packet, the physical layer may perform physical layer processing irrespective of a type of input packet/input signaling information. A broadcast signal may be generated through the predetermined physical layer processing. The generating of the broadcast signal may be performed by a third module to be described later.

The broadcast signal may be transmitted to a receiver through the receiver (t75040). The broadcast signal may be transmitted through a broadcast network and a transmitting method may be changed in some embodiments. The method for transmitting the broadcast signal may be performed by a third module to be described later.

According to another embodiment of the present invention, in the method for transmitting the broadcast signal, a link layer header may further include a signaling class field, an information type field, and a signaling format field. The signaling class field may indicate a signaling target of signaling information, the information type field may include data about the signaling information, and the signaling format field may indicate a format of signaling information. The signaling class field, the information type field, and the signaling format field may be the same as the aforementioned fields.

According to another embodiment of the present invention, in the method for transmitting the broadcast signal, a signaling format field may indicate that a plurality of signaling information items including a link layer payload is a plurality of section tables. This may mean that a format of signaling information indicated by signaling format field is a section table.

According to another embodiment of the present invention, in the method for transmitting the broadcast signal, a length of a link layer header may be determined according to a value of a signaling format field. That is, as described above, this is because whether a link layer header further includes an additional payload length part is determined according to a value of the signaling format field. In addition, a length of a link layer payload may be determined according to values of section_length_fields of a plurality of section tables. As described above, section_length_fields may exist in a fixed position in a section table. A length of the link layer payload may be calculated based on the sum of values of the section_length_fields.

According to another embodiment of the present invention, in the method for transmitting the broadcast signal, section_length_fields of a plurality of section tables may be sequentially positioned on a link layer payload. As described above, when section tables are concatenated, section_length_fields may be arranged with an interval in a link layer payload. The length fields may be positioned at a position fixed from a start point of each section table. Lengths of the respective section tables may be different, and thus distance between the length fields may be different. As described above, the section_length_field may indicate a length of a corresponding section table.

According to another embodiment of the present invention, in the method for transmitting the broadcast signal, a signaling format field may indicate that a plurality of signaling information items including a link layer payload are a plurality of descriptors. This may be a case in which a plurality of descriptors may be concatenated to configure a payload, and as described above, may be indicated by the signaling format field.

According to another embodiment of the present invention, in the method for transmitting the broadcast signal, a link layer header may further include a payload length part including a plurality of payload length fields. The payload length fields may refer to length fields of the aforementioned payload length part. As described above, the respective payload length fields may indicate a plurality of signaling information items. This may correspond to the case in which signaling information included in the link layer packet has no separate length field.

According to another embodiment of the present invention, in the method for transmitting the broadcast signal, whether a link layer header further includes a payload length part may be determined according to a value of the signaling format field. When the signaling information included in the link layer packet has no separate length field, a value of the signaling format field may correspond to 1×. Accordingly, whether a payload length part exists may be recognized through a value of the signaling format field.

According to another embodiment of the present invention, the method for transmitting the broadcast signal may be a method in which the aforementioned segmentation is performed. In this case, the method for transmitting the broadcast signal may include generating signaling information for signaling broadcast data, generating a link layer packet using the signaling information, generating a broadcast signal using the link layer packet, and/or transmitting the broadcast signal. The respective steps may be performed by a first module, a second module, and a third module in the stated order.

In the method for transmitting the broadcast signal, a link layer packet may include a link layer header and a link layer payload, and the link layer payload may include one of segmented segments. The link layer header may include a packet type field and a packet configuration field, and the packet type field may indicate that information including a link layer payload is signaling information. The packet configuration field may indicate whether a link layer payload includes one of segments segmented from signaling information.

According to another embodiment of the present invention, in the method for transmitting the broadcast signal, when a segment included in a link layer payload is a first segment among segmented segments, a link layer header may include a signaling class field, an information type field, and a signaling format field. The signaling class field may indicate a signaling target, the information type field may include data about signaling information, and the signaling format field may indicate a format of signaling information. The signaling class field, the information type field, and the signaling format field may be the same as the aforementioned fields.

The aforementioned steps may be omitted or substituted with other steps for performing the similar/same operation in some embodiments.

Figure 76:
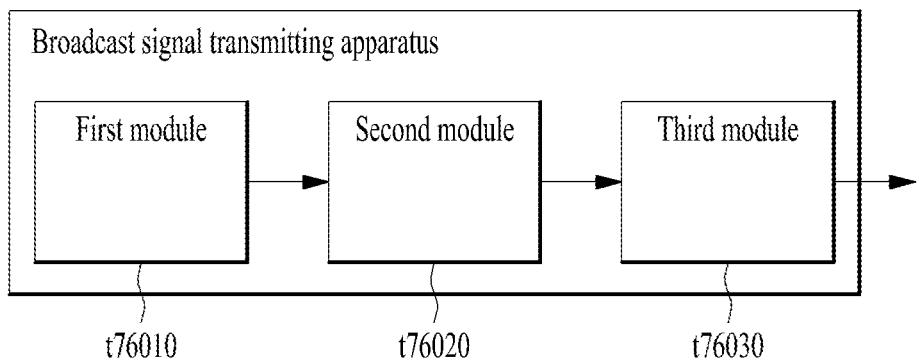
FIG. 76 is a diagram illustrating an apparatus for transmitting a broadcast signal according to an embodiment of the present invention.

FIG. 76 is a diagram illustrating an apparatus for transmitting a broadcast signal according to an embodiment of the present invention.

The apparatus for transmitting a broadcast signal according to an embodiment of the present invention may include a first module t76010, a second module t76020, and/or a third module t76030.

The first module t76010 may generate a plurality of signaling information items. The first module may perform a procedure corresponding to a step for generating a plurality of signaling information items. In addition, when segmentation is performed, the first module may perform a procedure corresponding to a step for generating signaling information for signaling the aforementioned broadcast data in some embodiments.

The second module t76020 may generate a link layer packet using the generated signaling information items. The second module may perform a procedure corresponding to a step for generating a link layer packet using the aforementioned signaling information items. In addition, when segmentation is performed, the second module may perform a procedure corresponding to a step for generating a link layer packet using the aforementioned signaling information.

The third module t76030 may generate a broadcast signal using the generated link layer packet. In addition, the third module may transmit the generated broadcast signal. The third module may perform operations corresponding to a step for generating a broadcast signal using the aforementioned and a step for transmitting a broadcast signal. In addition, when segmentation is performed, the third module may perform an operation corresponding to a step for generating a broadcast signal using the aforementioned link layer packet and a step for transmitting the broadcast signal in some embodiments.

The aforementioned first module, second module, and third module may be processors for executing consecutively performed procedures stored in a memory (or a storage unit). In addition, the aforementioned first module, second module, and third module may be hardware elements positioned in/outside the apparatus.

The aforementioned modules may be omitted or substituted with other steps for performing the similar/same operation in some embodiments.

Figure 77:
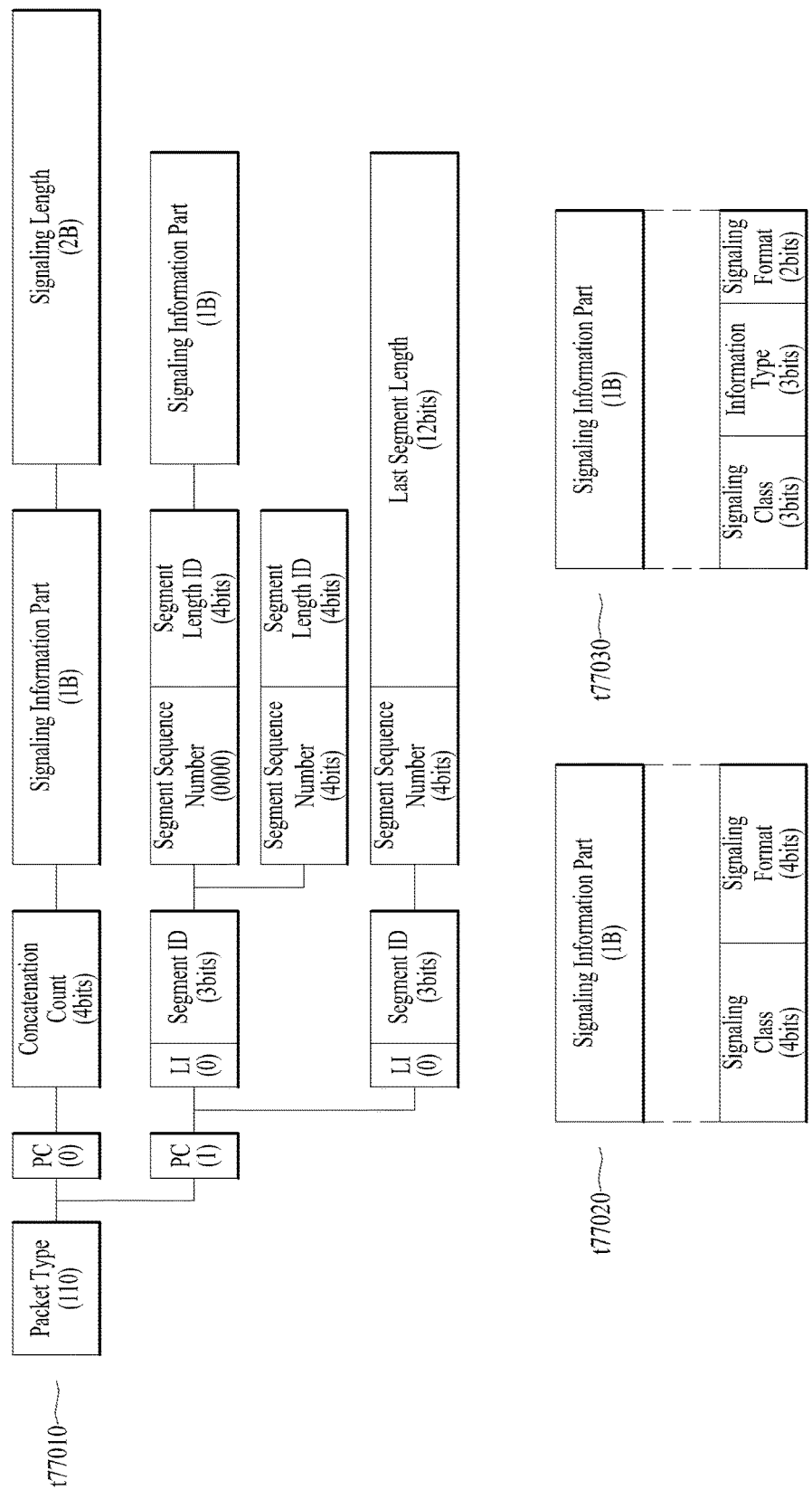
FIG. 77 is a diagram illustrating a configuration of a link layer packet when signaling information is transmitted to a link layer, according to another embodiment of the present invention.

FIG. 77 is a diagram illustrating a configuration of a link layer packet when signaling information is transmitted to a link layer, according to another embodiment of the present invention.

The present invention proposes a configuration of a link layer packet for transmitting signaling information using a link layer packet. In this case, a value of the aforementioned packet type field may be 110. The signaling information may be encapsulated in a link layer using the configuration.

In the illustrated configuration t77010, a packet type field, a PC field, an LI field, a segment ID field, a segment sequencer number field, a segment length ID field, and a last segment length field are the same as the aforementioned fields. The concatenation count field may be the aforementioned count field.

A header of the illustrated configuration (t77010) may further include Signaling_Information_Part( ).

The Signaling_Information_Part( ) may be a combination of further added fields with respect to a link layer packet for transmitting signaling information. The Signaling_Information_Part( ) may include detailed information about signaling information included in a payload of a link layer. When the signaling information is multiplexed and transmitted, the current field may be used to determine whether corresponding signaling information is processed and to determine a signaling processing module to which each signaling information item needs to be transmitted.

The Signaling_Information_Part( ) may be added when signaling information is contained in a link layer payload and may be referred to as an additional header for signaling information. In some embodiments, with regard to the current part, a configuration of fields included in the part may be changed. According to the present embodiment, the part may have a size of 1 byte or have different sizes in some embodiments. In some embodiments, when a plurality of signaling information items are concatenated and included in a payload, Signaling_nformation_Part( ) may be added by as much as the number indicated by the count field.

When a plurality of signaling information items are concatenated and included in a link layer payload, Signaling_Length fields indicating a length of each signaling information item may be added. The Signaling_Length fields may exist by as much as the number of concatenated signaling information items, that is, the number indicated by the count field. The Signaling_Length fields may indicate lengths of respective signaling information items. Here, the Signaling_Length fields may be positioned at the same order as an order of signaling information items included in a payload. The Signaling_Length field may also be referred to as a Component_Length field, and in the illustrated configuration (t77010), the Signaling_Length fields may be subsequent to the Signaling_Information_Part( ), but an order thereof may be reversed. In addition, in the illustrated embodiment, the Signaling_Length field may have a size of 2 bytes and may be embodied in some embodiments, and a padding bit for byte alignment may be further added.

The Signaling_Information_Part( ) may be variously configured, and the two configurations t77020 and t77030 are illustrated according to embodiments of the present invention. The present invention is not limited to the embodiment.

In the first configuration (t77020), the Signaling_Information_Part( ) may include a signaling class field (Signaling_Class) and/or a signaling format field (Signaling_Format). The Signaling_Information_Part( ) may be used when separate attribute of signaling information is not needed or there is corresponding information of signaling information.

In the second configuration (t77030), the Signaling_Information_Part( ) may include a signaling class field, an information type field (Information_Type), and/or a signaling format field. In order to indicate more detailed information of signaling information, an information type field may be added.

In some embodiments, the two configurations may further include a signaling version field indicating a version of corresponding signaling information. In some embodiments, the two configurations may further include signaling encoding field indicating an encoding/compression format of corresponding signaling information. In some embodiments, only one signaling format may be used, or when a separate protocol for signaling information exists and signaling formats are the same, the signaling format field may be omitted. In the illustrated embodiments, a bit number of each field is determined but this is merely an embodiment, and thus the bit number may be changed.

The signaling class field, the information type field, and the signaling format field are the same as the aforementioned fields. Here, the signaling class field may be referred as a Signaling_Type field, the information type field may be referred as a Signaling_Type_Extension field, and signaling format field may be referred as a Singnaling_Format field.

FIG. 78 is a diagram illustrating a Signaling_Class field when signaling information is transmitted to a link layer, according to another embodiment of the present invention.

Meaning according to embodiments of the aforementioned signaling class field is illustrated. A type of signaling information indicated by each field may be determined when a signaling class field is 4 bits and 3 bits. According to indication of the field, a type of signaling information included in a payload of a link layer may be indicated. The illustrated indication of a field may be changed in some embodiments.

When the signaling class field has a value of 0000 or 000, a corresponding link layer payload may include signaling information for rapid channel scan such as fast information channel (FIC). In addition, the corresponding link layer payload may include signaling information for service acquisition.

When the signaling class field has a value of 0001 or 001, the corresponding link layer payload may include signaling information for emergency alert such as an emergency alert system (EAS).

When the signaling class field has a value of 0010 or 010, the corresponding link layer payload may include signaling information associated with header compression.

When the signaling class field has a value of 0011-1110 or 011-110, signaling information contained in the corresponding link layer payload may be reserved for future use. Through this, signaling information items to be added later may be determined.

When a signaling class field has a value of 1111 or 111, the corresponding link layer payload may include a plurality of signaling information items. That is, when various types of signaling information items instead of a specific signaling information item are collected and transmitted as one link layer packet, the link layer packet may be indicated through a specific value (1111 or 111) of a signaling class field.

FIG. 79 is a diagram illustrating a Signaling_Class field and an Information_Type field when signaling information is transmitted to a link layer, according to another embodiment of the present invention.

Meaning of a value of the information type field when the information type field is added to the Signaling_Information_Part( ) is illustrated. According to the present embodiment, it is assumed that the signaling class field and the information type field are each 3 bits, but a length of each field may be changed in some embodiments, as described above. According to indication of the information type field, detailed information according to signaling information included in a link layer payload may be indicated. Determination of the illustrated field value may be changed in some embodiments.

When the signaling class field has a value of 000, a corresponding link layer payload may include signaling information for rapid channel scan such as fast information channel (FIC) or signaling information for service acquisition. In this case, when the information type field has a value of 000, the value may indicate that the corresponding signaling information is signaling information for service acquisition in the case of a value of 111 for signaling information for service scan. When the information type field has a value of 010-111, the information type field may be reserved for future use.

When the signaling class field has a value of 001, a corresponding link layer payload may include signaling information for emergency alert of an emergency alert system (EAS) or the like. In this case, when the information type field has a value of 000, the corresponding signaling information may be an emergency alert message for emergency situation, when the information type field has a value of 001, the corresponding signaling information may be link information of emergency alert message, when the information type field has a value of 010, the corresponding signaling information may be automatic tuning information, when the information type field has a value of 011, the corresponding signaling information may be NRT service information, and when the information type field has a value of 111, the corresponding signaling information may be wake-up indication information for activating a receiver. When the information type field has a value of 100-110, the information type field may be reserved for future use.

When the signaling class field has a value of 010, the corresponding link layer payload may include signaling information associated with header compression. In this case, when the information type field has a value of 000, the corresponding signaling information may be initialization information, when the information type field has a value of 001, the corresponding signaling information may be configuration parameters, when the information type field has a value of 010, the corresponding signaling information may be static chain, and when the information type field has a value of 011, the corresponding signaling information may be dynamic chain. When the information type field has a value of 100-111, the information type field may be reserved for future use.

When the signaling class field has a value of 011-110, all values 000-111 of the information type field may be reserved for future use. Accordingly, signaling information items to be added later may be determined.

When the signaling class field has a value of 111, the corresponding link layer payload may include a plurality of signaling information items. In this case, detailed information items of signaling information cannot be determined as one, and thus the signaling information may be indicated as default of 000. The remaining values 001-111 may be reserved for future use.

FIG. 80 is a diagram illustrating a Signaling_Format field when signaling information is transmitted to a link layer, according to another embodiment of the present invention.

The meaning of a value of a signaling format field is illustrated. It is assumed that the signaling format field is 4 bits and 2 bits, but this may be changed in some embodiments, as described above. According to indication of a signaling format field, a format of corresponding signaling information may be indicated. Determination of a value of the illustrated field may be changed.

The corresponding signaling information may have an ATSC signaling format when a signaling format field of 4 bits has a value of 0000, the corresponding signaling information may have a section table format when a signaling format field of 4 bits has a value of 0001, the corresponding signaling information may have a descriptor field when a signaling format field of 4 bits has a value of 0010, the corresponding signaling information may have a XML format when a signaling format field of 4 bits has a value of 0011, and the corresponding signaling information may have other formats when a signaling format field of 4 bits has a value of 1111. When the signaling format field has a value of 0100-1110, the signaling format field may be reserved for future use.

The corresponding signaling information may have an ATSC signaling format when a signaling format field of 2 bits has a value of 00, the corresponding signaling information may have a section table format when a signaling format field of 2 bits has a value of 01, the corresponding signaling information may have a descriptor format when a signaling format field of 2 bits has a value of 10, and the corresponding signaling information may have other formats when a signaling format field of 2 bits has a value of 11.

According to a format of the signaling information, a bit number may be adjusted between fields of Signaling_Information_Part( ). In addition, whether future extension is emphasized according to a bit number of a signaling format field (high bit number) or whether only a signaling format that is actually used in a broadcast system is determined (a low bit number) may be determined.

Use of other formats may be used when the aforementioned signaling class field is "Multiple signaling information". That is, the other formats may be used when a plurality of signaling formats are mixed and concatenated or can be processed by a module for parsing signaling without determination of a separate signaling format.

Figure 81:
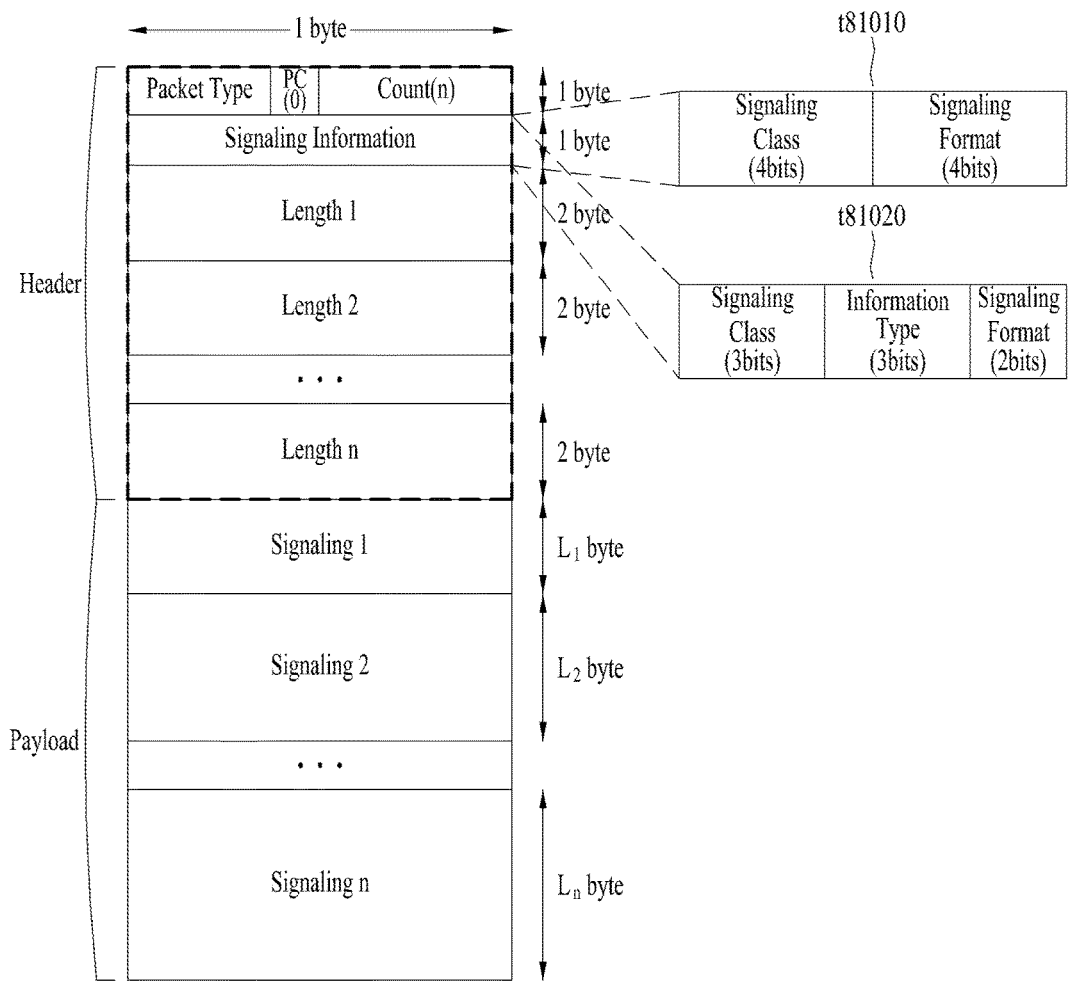
FIG. 81 is a diagram illustrating the case in which a plurality of signaling information items are concatenated with respect to a configuration of a link layer packet when signaling information is transmitted to a link layer, according to another embodiment of the present invention.

FIG. 81 is a diagram illustrating the case in which a plurality of signaling information items are concatenated with respect to a configuration of a link layer packet when signaling information is transmitted to a link layer, according to another embodiment of the present invention.

The configuration is illustrated in detail when a plurality of signaling information items is concatenated among configurations of a link layer packet of the aforementioned signaling information. In the illustrated configuration, a size of each field indicated by a bit and a byte may be changed in some embodiments.

The aforementioned fields may be positioned in a header of a link layer packet. The packet type field may indicate that signaling information is included in a payload and the packet configuration field may indicate a configuration of a payload. The count field may indicate the number n of a plurality of concatenated signaling information items. In some embodiments, a length information part indicated by a total length of a link layer payload may be additionally positioned prior to a count field. In addition, an indicator indicating whether a corresponding payload has a configuration using concatenation or a configuration using segmentation may be further positioned.

A header of a link layer packet may include the aforementioned Signaling_Information_Part( ). As described above, the Signaling_Information_Part( ) may have various configurations (t81010 and t81020). Upon receiving a corresponding link layer packet, a receiver may process signaling information thereof using Signaling_Information_Part( ) information of the header.

The header of the link layer packet may further include Signaling_Length fields indicating a length of each of concatenated signaling information items. The Signaling_Length field is the same as the aforementioned field. In the illustrated configuration, the Signaling_Length fields may be subsequent to the Signaling_Information_Part( ) but an order thereof may be reversed. In addition, in the illustrated embodiment, the Signaling_Length field has a size of 2 bytes, but this is merely an embodiment and thus may be changed in some embodiments, and a padding bit for byte alignment may be further added.

The Signaling_Information_Part( ) may have various configurations according to the aforementioned embodiments (t81010 and t81020). It is assumed that a plurality of signaling information items with different signaling classes is transmitted in one link layer packet.

In this case, the signaling class field may have a value of 1111 or 111. The signaling format field may be determined in a format of concatenated signaling information items. For example, when a corresponding link layer packet is applied to an ATSC system, the signaling format field may have a value of 0000 or 00. When the information type field exists, the information type field may have a value of 000 as a default value. In this case, a receiver may not process a value of the information type field.

Assuming that fields of a front part of a header is 1 byte, Signaling_Information_Part( ) is 1 byte, and Signaling_Length field is 2 bytes, when a length of signaling information is $L_k$ (k=1, 2, 3, . . . , n), a total length $L_T$ of a link layer packet may be represented according to the illustrated equation (t81030).

Figure 82:
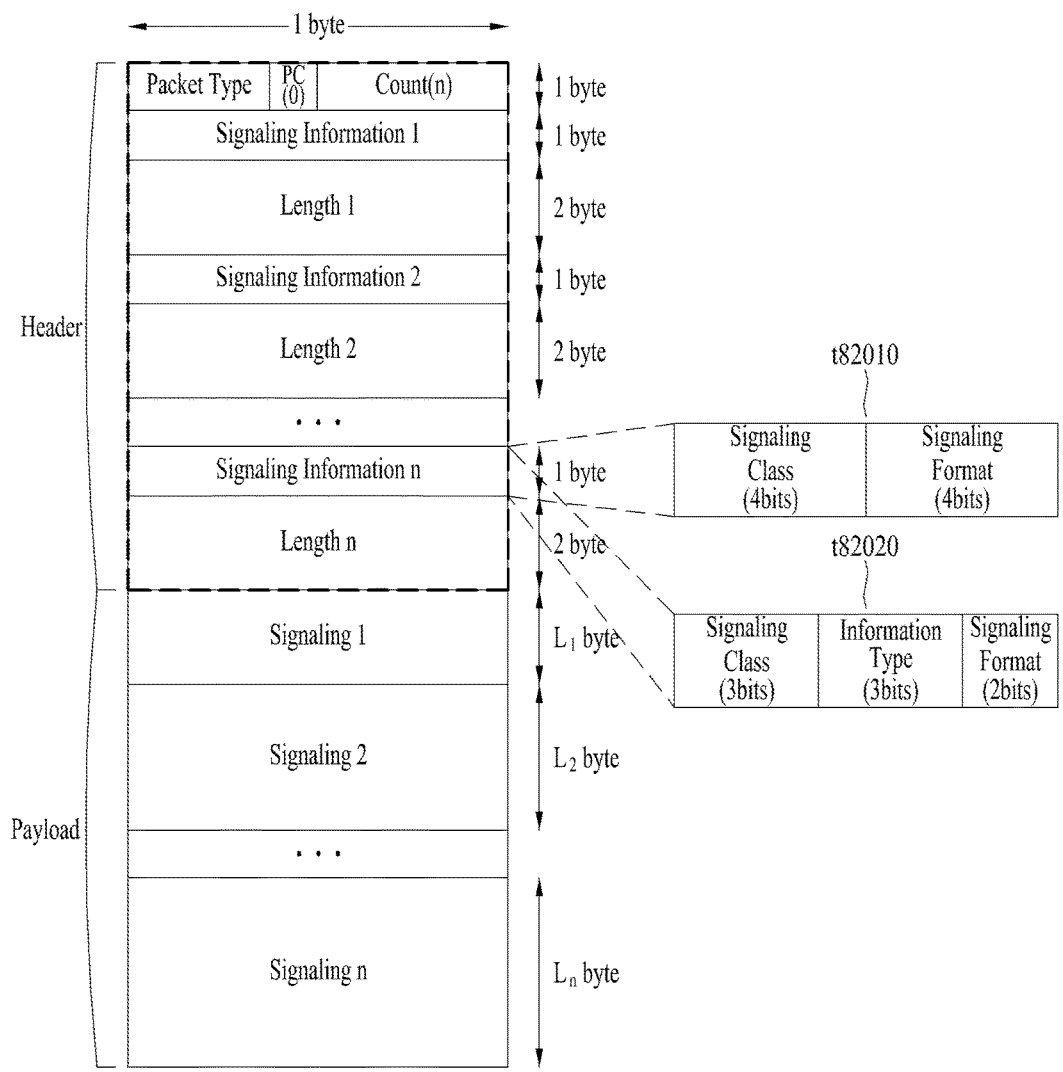
FIG. 82 is a diagram illustrating a case in which a plurality of signaling information items are concatenated with respect to a configuration of a link layer packet when signaling information is transmitted to a link layer, according to another embodiment of the present invention.

FIG. 82 is a diagram illustrating a case in which a plurality of signaling information items are concatenated with respect to a configuration of a link layer packet when signaling information is transmitted to a link layer, according to another embodiment of the present invention.

The present embodiment may be the same as the aforementioned case in which a plurality of signaling information items are concatenated, except that Signaling_Information_Part( ) and Signaling_Length field of signaling information exist. The number of subsequent Signaling_Information_Part( ) and Signaling_Length field may be determined according to the number indicated by the count field, and an order may be the same as an order of the corresponding concatenated signaling information items. In some embodiments, Signaling_Information_Part( ) items may be positioned only in a front part and Signaling_Length field items may be positioned only in a rear part. In addition, in some embodiments, an order of Signaling_Information_Part( ) and Signaling_Length field may be revered.

Each signaling information item may be represented by a pair of Signaling_Information_Part( ) and Signaling_Length field. Upon receiving a corresponding link layer packet, a receiver may check separate signaling information and may separately process each signaling information item.

According to the aforementioned embodiment of the present invention, the Signaling_Information_Part( ) may have various configurations (t82010 and t82020). It is assumed that a plurality of signaling information items with different signaling classes is transmitted as one link layer packet.

Since different signaling information items can be separately represented, a signaling class field, an information type field, and a signaling format field may be determined with respect to each signaling information item. In this case, a value indicating "multiple signaling information" of the signaling class field does not have to be used, and a corresponding value may be used with different meaning.

Assuming fields of a front part of a header are 1 byte, Signaling_Information_Part( ) is 1 byte, and Signaling_Length field is 2 bytes, when a length of the signaling information is $L_k$ (k=1, 2, 3, . . . , n), a total length $L_T$ of a link layer packet may be represented according to the illustrated equation (t82030).

Figure 83:
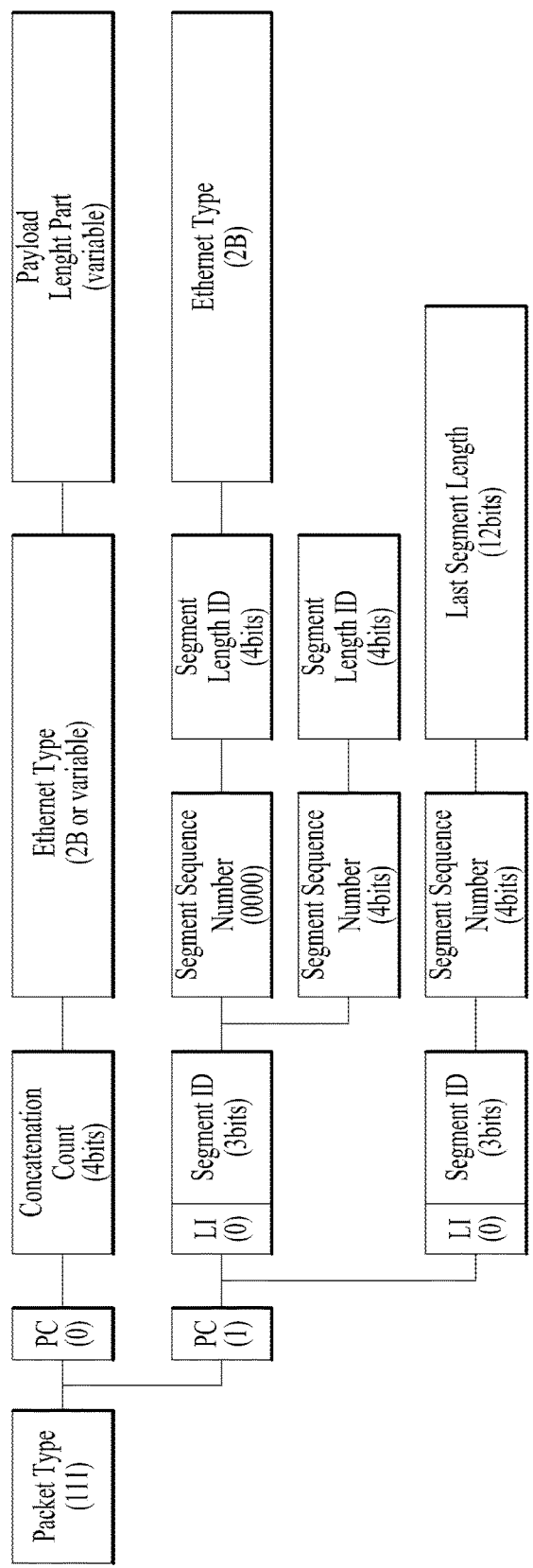
FIG. 83 is a diagram illustrating a configuration of a link layer packet when a framed packet is transmitted to a link layer, according to another embodiment of the present invention.

FIG. 83 is a diagram illustrating a configuration of a link layer packet when a framed packet is transmitted to a link layer, according to another embodiment of the present invention.

The present invention proposes a configuration of a link layer packet for transmitting an Ethernet packet using a link layer packet with respect to the Ethernet packet used in a general network instead of a broadcast packet such as IP or MPEG-2 TS. In addition, the present invention proposes a method for indicating a protocol type of the corresponding Ethernet packet. In this case, a value of the aforementioned packet type field may be 111. Ethernet packets may be encapsulated in a link layer using the configuration. The Ethernet packets may be referred to as a framed packet.

In the illustrated configuration, the packet type field, the PC field, the LI field, the segment ID field, the segment sequencer number field, the segment length ID field, and the last segment length field are the same as the aforementioned fields. The concatenation count field may be the same as the aforementioned count field.

A header of the illustrated configuration may further include an Ethernet type field.

The Ethernet type field may be a field that is further added to a link layer packet for transmitting a framed packet. The Ethernet type field may include detailed information about a protocol and type of a framed packet included in a link layer payload.

Here, with respect to the protocol, values registered in an IANA may be determined. The Ethernet type field may be referred to as an additional header for type extension. According to the present embodiment, the field may have 2 bytes or a variable size.

According to the present embodiment, when a plurality of framed packets are concatenated and included in a payload, Ethernet type fields may be added by as much as the number indicated by the count field. In addition, length fields indicating a length of each framed packet may be added by as much as the n umber indicated by the count field. A combination of the length fields may be referred to as a payload length part.

Here, length fields may be positioned at the same order as an order of framed packets included in a payload. The length field may be referred to as Component_Length field, and in the illustrated configuration, the length fields may be subsequent to the Ethernet type field but an order thereof may be reversed. In addition, in some embodiments, the length field may have a size of 2 bytes or different sizes, and a padding bit for byte alignment may be further added.

When one framed packet is segmented, the Ethernet type field may be added to only a first segment. The receiver can recombine an original framed packet using an Ethernet type field of a first segment.

FIG. 84 is a diagram illustrating ethernet_type field when a framed packet is transmitted to a link layer, according to another embodiment of the present invention.

As described above, the Ethernet type field may indicate a protocol and type of a framed packet included in a link layer payload. The illustrated table shows an Ethernet type value defined by IANA with respect to a main protocol.

For example, when a value of the Ethernet type field is 0x0800, the framed packet may be a packet of Internet Protocol version 4 (IPv4), when a value of the Ethernet type field is 0x0806, the framed packet may be an address resolution protocol (ARP) type, and when a value of the Ethernet type field is 0x0842, the framed packet may be a Wake-on-LAN type. Indication by the Ethernet type field may be variously configured and the present invention is not limited thereto.

Figure 85:
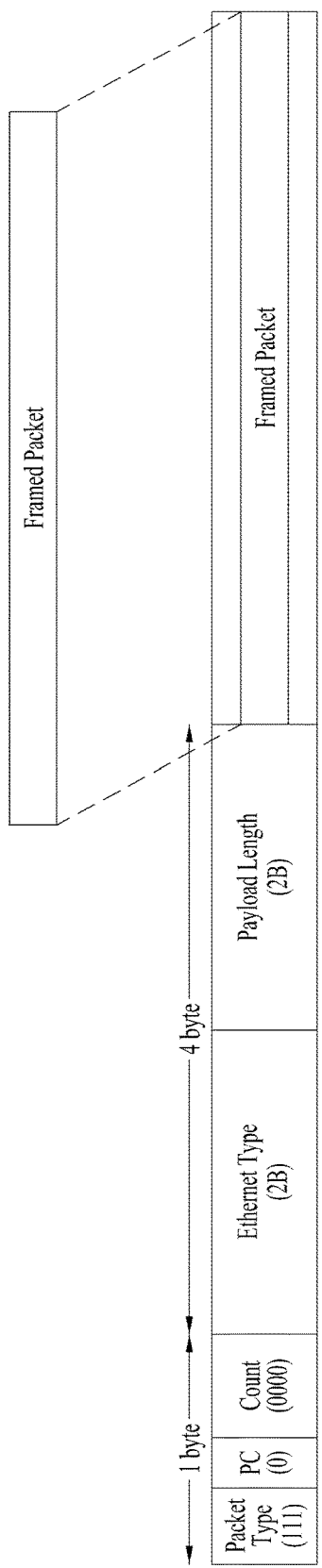
FIG. 85 is a diagram illustrating the case in which one input packet is included in a link layer payload when a framed packet is transmitted to a link layer, according to another embodiment of the present invention.

FIG. 85 is a diagram illustrating the case in which one input packet is included in a link layer payload when a framed packet is transmitted to a link layer, according to another embodiment of the present invention.

It is assumed that an input framed packet is within a processing range of a physical layer and one link layer payload is directly configured without concatenation or segmentation.

The fields are the same as the aforementioned fields. According to the present embodiment, a value of the packet type field may be 111 and a value of the PC field may be 0. A value of the count field may be 0000. In some embodiments, when one packet is included in a payload, the count field may be omitted.

A header may include an Ethernet type field and/or a payload length part. In some embodiments, an order of the two fields may be reversed. The Ethernet type field may indicate a protocol and type of a framed packet included in a payload. The payload length part may include one length field and indicate a length of a framed packet, that is, a total length of a payload.

In some embodiments, a value of fields is variable, but 5 bytes are used as a link layer header in the illustrated embodiment, and thus when a length of a framed packet is L bytes, a total length of the link layer packet may be (L+5) bytes.

Figure 86:
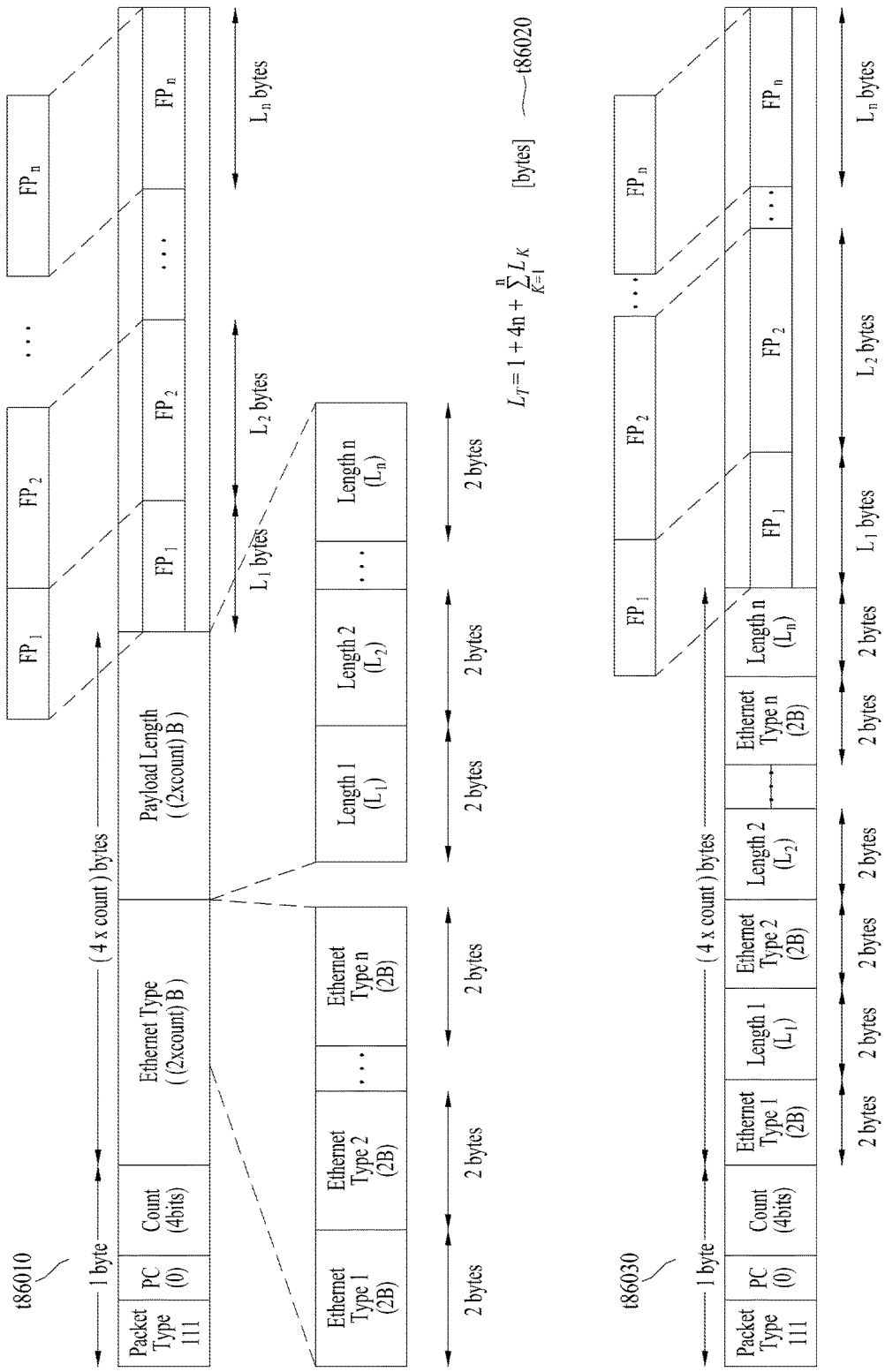
FIG. 86 is a diagram illustrating the case in which a plurality of input packets are concatenated and included in a link layer payload when a framed packet is transmitted to a link layer, according to another embodiment of the present invention.

FIG. 86 is a diagram illustrating the case in which a plurality of input packets are concatenated and included in a link layer payload when a framed packet is transmitted to a link layer, according to another embodiment of the present invention.

When an input framed packet does not reach a processing range of a physical layer, each framed packet may be concatenated and included in a link layer payload.

The fields may be the same as the aforementioned fields. Here, a link layer header may be variously configuration according to configurations of the Ethernet type field and the length fields.

A First configuration (not shown) is a configuration in which framed packets with the same Ethernet type are concatenated and included in a payload. In this case, a link layer header may include one Ethernet type field. The Ethernet type field may include a protocol/type of a corresponding framed packet. A plurality of length fields may be positioned in a front or rear part of the Ethernet type field. The length fields may indicate a length of a concatenated framed packet.

A second configuration t86010 is a configuration in which framed packets with different Ethernet types are concatenated and included in a payload. In this case, Ethernet type fields and length fields, the number of which is the same as the number of concatenated framed packets, may be included in a header. The Ethernet type fields and the length fields may indicate a type and length of the corresponding framed packet in the stated order. Assuming that fields of a front part of a header is 1 byte, an Ethernet type field is 2 bytes, and length fields are each 2 byes, when a length of a framed packet is $L_k$ (k=1, 2, 3, ..., n), a total length $L_T$ of a link layer packet may be represented according to the illustrated equation (t86020).

A third configuration t86030 corresponds to a configuration according to another embodiment of the present invention in which framed packets with different Ethernet types are concatenated and included in a payload. In this case, Ethernet type fields and length fields, the number of which is the same as the number of concatenated framed packets, may also be included in a header. Here, the Ethernet type fields and the length fields may be alternately positioned in a header. In the illustrated configuration, Ethernet type field #1 and length field #1 for framed packet #1 may be paired and included in a header. In some embodiments, the length field may be positioned in front of the Ethernet type field. An order of pairs may be the same as an order of concatenated framed packets.

Figure 87:
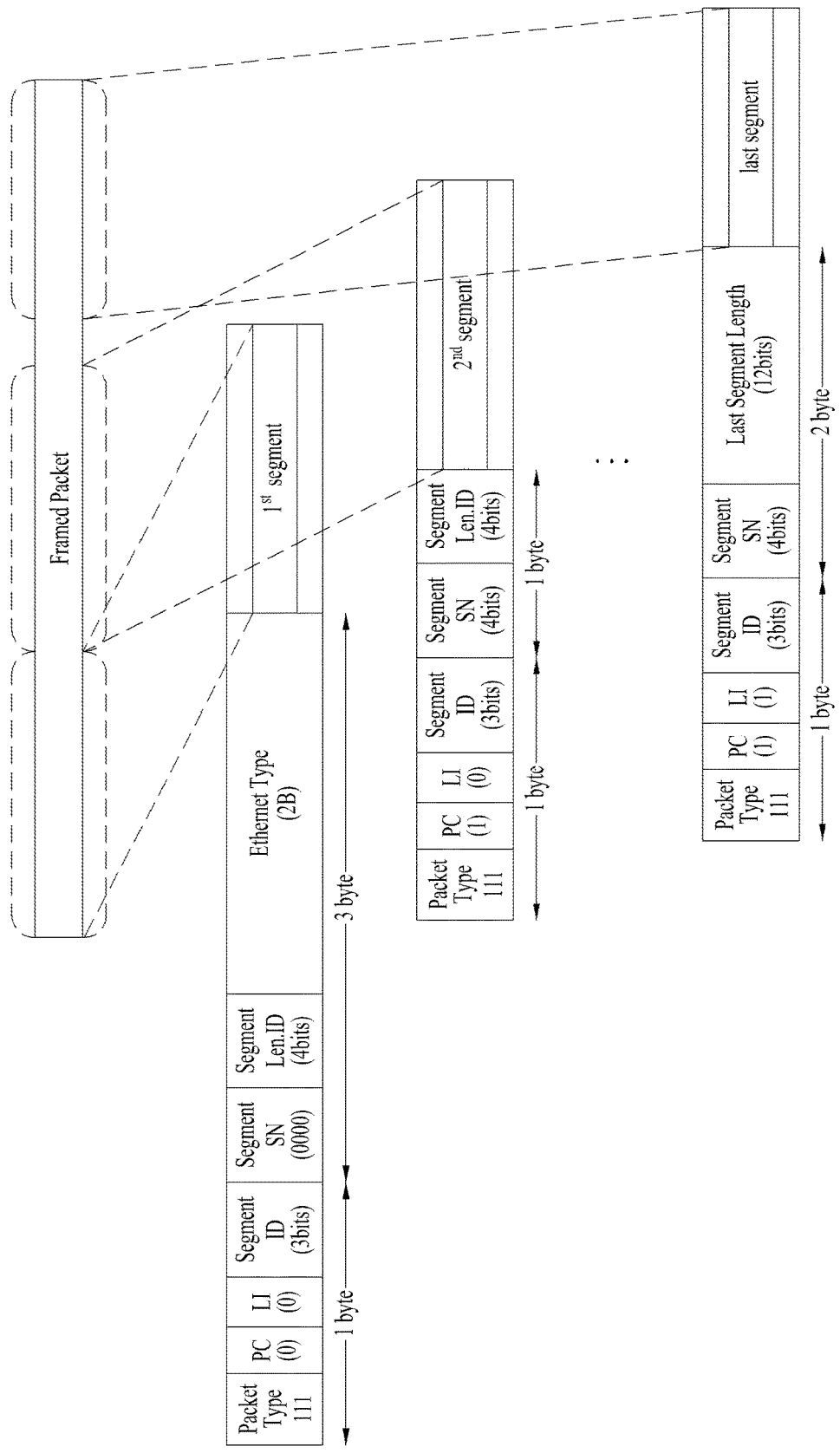
FIG. 87 is a diagram illustrating the case in which one input packet is segmented and included in a link layer payload when a framed packet is transmitted to a link layer, according to another embodiment of the present invention.

FIG. 87 is a diagram illustrating the case in which one input packet is segmented and included in a link layer payload when a framed packet is transmitted to a link layer, according to another embodiment of the present invention.

When an input framed packet exceeds a processing range of a physical layer, one framed packet may be segmented to a plurality of segments. The fields may be the same as the aforementioned fields. Like in the case in which the IP packet is segmented, when a framed packet is segmented, CRC encoding may also be used. The CRC may be added to a last part of the framed packet. When a receiver recombines a framed packet, the CRC may be used to check integrity of recombination. When framed packets to which CRC is added are segmented, a link layer packet including a last segment may also include CRC.

In general, the CRC may be added to a last part of a packet and may be added to other positions in some embodiments.

In the aforementioned embodiments, in the case of segmentation, a length of the link layer payload may be calculated according to values of a segment length ID field and a last segment length fields. However, in some embodiments, a link layer header may simply include a field indicating a length of a link layer payload. In the method, the method may be used when one input packet is included or concatenated in a payload.

Figure 88:
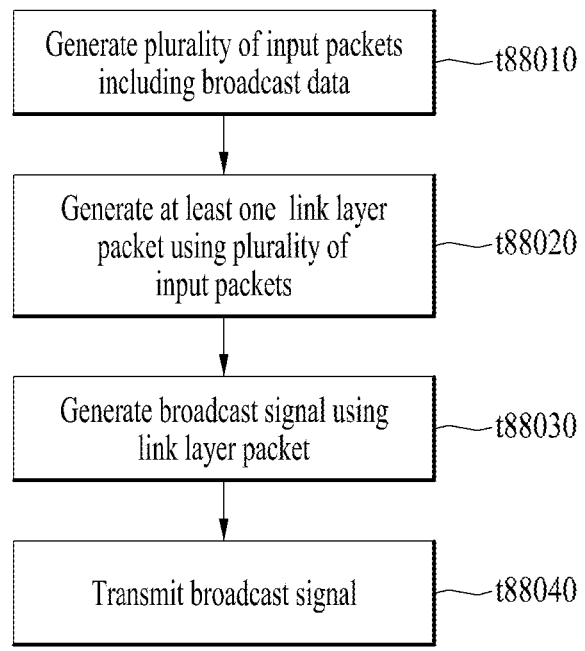
FIG. 88 is a diagram illustrating a method for transmitting a broadcast signal according to an embodiment of the present invention.

FIG. 88 is a diagram illustrating a method for transmitting a broadcast signal according to an embodiment of the present invention.

According to an embodiment of the present invention, the method for transmitting the broadcast signal may include generating a plurality of input packets including broadcast data, generating a link layer packet using the input packet, generating a broadcast signal, and/or transmitting the broadcast signal.

First, a first module of a service provider side may generate a plurality of input packets (t88010). Here, a plurality of input packets may be an MPEG2-TS packet, an IP packet, or a specific type of packet or may be defined and used in the future. The first module may be a specific module that generates broadcast data in the form of input packets.

A second module of a service provider may generate at least one link layer packet using a plurality of input packets (t88020). This may correspond to the aforementioned procedure for generating a link layer packet by encapsulating input packets in a link layer. Here, the link layer packet may have a packet configuration according to the aforementioned embodiments.

According to the present embodiment, a header of a link layer packet may include packet type information and packet configuration information. The packet type information may indicate a type of an input packet included in a payload of a link layer packet and the packet configuration information may indicate a configuration of a payload of a link layer packet. The packet type information may correspond to the aforementioned packet type field and the packet configuration information may correspond to the aforementioned packet configuration field (PC).

A third module of a service provider side may generate a broadcast signal using the generated link layer packet (t88030). This may correspond to an operation such as interleaving, framing, and so on using a link layer packet in a physical layer. A fourth module of a service provider side may transmit the generated broadcast signal. Here, the fourth module may correspond to an antenna or the like.

According to another embodiment of the present invention, in the method for transmitting the broadcast signal, when a payload includes one of segmented segments of an input packet, a header may further include information about a segment sequencer number indicating an order in a corresponding input packet of a segment included in a link layer packet. This may correspond to the aforementioned segmentation. The segment sequencer number information may correspond to the aforementioned segment sequencer number field.

According to another embodiment of the present invention, in the method for transmitting the broadcast signal, a header may further include a last segment indicator indicating whether a segment included in a link layer packet is a last segment of a corresponding input packet. This may correspond to the aforementioned segmentation. Here, the last segment indicator may correspond to the aforementioned last segment length field.

According to another embodiment of the present invention, in the method for transmitting the broadcast signal, when a payload includes a plurality of input packets, a header may further include count information indicating the number of input packets included in a link layer packet. This may correspond to the aforementioned concatenation. Here, the count information may correspond to the aforementioned count.

According to another embodiment of the present invention, in the method for transmitting the broadcast signal, a header may further include component length information indicating a length of each input packet included in a link layer packet. This may correspond to the aforementioned concatenation. Here, component length information items may correspond to respective length fields of the aforementioned input packets.

According to another embodiment of the present invention, in the method for transmitting the broadcast signal, component length information items may be positioned at the same order as an order at which corresponding input packets are positioned in a payload. This may correspond to the aforementioned concatenation. According to the present embodiment, length fields may be positioned at the same order as an order of concatenated input packets and may indicate lengths of input packets.

According to another embodiment of the present invention, in the method for transmitting the broadcast signal, a plurality of input packets may include signaling data including broadcast data. In this case, a header may further include signaling type information, signaling type extension information, and signaling format information. The signaling type information may indicate a type of signaling data, the signaling type extension information may indicate property of signaling data, and the signaling format information may indicate a format of signaling data. These information items may correspond to the aforementioned signaling class field, information type field, and signaling format field.

According to another embodiment of the present invention, in the method for transmitting the broadcast signal, packet type information of a header may indicate that an input packet included in a link layer packet is an extended packet, and a header may further include extension type information indicating a protocol or type of an extension packet. This may correspond to the case in which a framed packet is transmitted to a link layer among the aforementioned embodiments. In this case, a value of the aforementioned packet type field may be 111. Here, the extended packet may be the aforementioned framed packet and Ethernet packet. Here, the extension type information may correspond to the aforementioned Ethernet type field.

According to another embodiment of the present invention, in the method for transmitting the broadcast signal, a payload may include one input packet and a header may further include length information indicating a length of a payload of a link layer packet. This may correspond to the case in which the aforementioned single packet, that is, one input packet is included in a payload without segmentation/concatenation. Here, the length information may correspond to a length field indicating a length of the aforementioned payload.

According to an embodiment of the present invention, a method for receiving a broadcast signal will now be described. The method is not illustrated.

According to an embodiment of the present invention, the method for receiving the broadcast signal may include receiving a broadcast signal, acquiring a link layer packet of a broadcast signal, and/or generating an output packet using the link layer packet.

First, a first module of a receiver side may receive a broadcast signal. The broadcast signal may be a broadcast signal transmitted by a service provider side according to the aforementioned embodiment. The first module may be a receiving apparatus such as an antenna or a tuner.

A second module of a receiver side may acquire a link layer packet using the received broadcast signal. The link layer packet may be the same as the aforementioned link layer packet. This procedure may correspond to a procedure for processing a broadcast signal in a physical layer of a receiver side to output an output stream to a link layer.

Then a third module of the receiver side may process a link layer packet to generate an output packet. Here, the output packet may correspond to an input packet transmitted to a link layer by a service provider. In this procedure, packets encapsulated in the link layer packet may be restored. The procedure may correspond to an opposite procedure of the aforementioned "step for generating a link packet using input packets".

According to an embodiment of the present invention, in the method for receiving a broadcast signal and a method according to other embodiments of the present invention, a link layer packet may have the aforementioned configuration/information items. That is, a configuration of a link layer packet and fields/information items included therein that are described in the aforementioned embodiment of a service provider side.

The aforementioned steps may be omitted or substituted with other steps for performing the similar/same operation in some embodiments.

Figure 89:
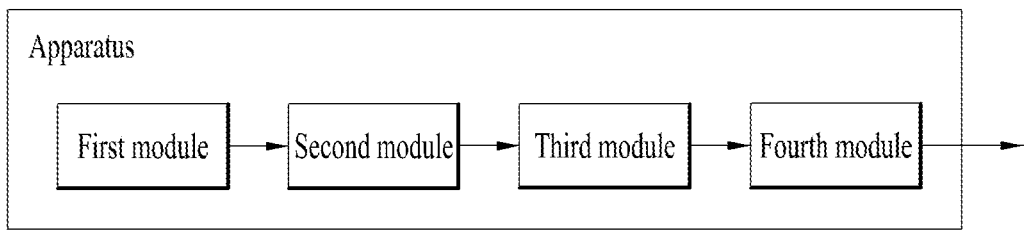
FIG. 89 is a diagram illustrating an apparatus for transmitting a broadcast signal according to an embodiment of the present invention.

FIG. 89 is a diagram illustrating an apparatus for transmitting a broadcast signal according to an embodiment of the present invention.

According to an embodiment of the present invention, the apparatus for transmitting the broadcast signal may include the aforementioned first module, second module, third module, and/or fourth module. The modules are the same as the aforementioned modules.

The apparatus for transmitting the broadcast signal according to an embodiment of the present invention and modules/blocks installed therein may perform the aforementioned method for transmitting a broadcast signal.

An apparatus for receiving a broadcast signal according to an embodiment of the present invention will be described below. The apparatus for receiving the broadcast signal according to an embodiment of the present invention is not illustrated.

The apparatus or receiving content according to an embodiment of the present invention may include the aforementioned first module, second module, and/or third module. The modules may be the same as the aforementioned modules.

According to an embodiment of the present invention, the apparatus for receiving the broadcast signal and modules/blocks installed therein may perform the aforementioned method for receiving a broadcast signal.

The aforementioned blocks/modules installed in the apparatus for transmitting a broadcast signal and the apparatus for receiving the broadcast signal may be processors for executing consecutively performed procedures stored in a memory or may be hardware elements disposed outside the apparatus in some embodiments.

The aforementioned modules may be omitted or substituted with other steps for performing the similar/same operation in some embodiments.

A module or a unit may be processors for executing consecutively performed procedures stored in a memory (or a storage unit). In addition, the steps according to the aforementioned embodiments of the present invention may be performed by hardware/processor. Each module/block/unit according to the aforementioned embodiments of the present invention may function as a hardware/processor. In addition, the methods proposed by the present invention may be executed as a code. The code can be written in a storage medium readable by a processor and thus can be read by a processor provided by an apparatus.

For convenience of description, the drawings are separately described but a new embodiment may be designed by combining embodiments illustrated in the drawings. In addition, according to necessity of those skilled in the art, design of a computer readable recording medium with a program recorded therein for executing the aforementioned embodiments is within the scope of the spirit of the invention.

As described above, an apparatus and a method according to the present embodiment may be configured by selectively combining all or some of the aforementioned embodiments for various modifications rather than being restrictively limited.

The method proposed by the present invention may be embodied as a code readable by a processor in a recording medium readable by a processor included in a network device. The recording medium readable by the processor may include any type of recording apparatus in which data readable by a processor is stored. Examples of the recording medium readable by the processor may include a ROM, a RAM, a CD-ROM, a magnetic tape, a floppy disk, and an optical data storage device and embodied in the form of a carrier wave in a transmission through the Internet. The processor readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims and the modifications may not be separately understood from the spirit and scope of the present invention.

In addition, in the specification, the present invention has been described in terms of an apparatus and a method, and as necessary, the apparatus and the method may be supplementarily applied.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

In addition, in the specification, the present invention has been described in terms of both an apparatus and a method, and as necessary, the apparatus and the method may be supplementarily applied.

[Mode for Invention]

Various embodiments have been described in the Best Mode for implementing the present invention.

INDUSTRIAL APPLICABILITY

The present invention has industrial applicability in a predetermined industrial field associated with a method for transmitting a broadcast signal, a method for receiving a broadcast signal, an apparatus for transmitting a broadcast signal, and an apparatus for receiving a broadcast signal.

The invention claimed is:

1. A method for transmitting a broadcast signal, the method comprising:

generating input packets comprising broadcast data;
generating link layer packets by encapsulating the input packets, wherein a link layer packet includes a base header and a payload,
wherein the base header includes packet type information and configuration type information, the packet type information indicates a type of data encapsulated in the payload, and the configuration type information indicates configuration of the payload,
wherein the type indicated by the packet type information corresponds to one of Internet Protocol (IP) packet, compressed IP packet, signaling packet, MPEG-2transport stream packet and type extension;
generating the broadcast signal including the link layer packets; and
transmitting the broadcast signal,
wherein the link layer packet further includes an additional header,
wherein the additional header includes either a segmentation information part including segment sequence number information for indicating a sequence number of a segment of an input packet or a concatenation information part including component length elements for indicating a length of each of concatenated input packets depending on whether the configuration type information indicates that the payload encapsulates the segment of the input packet or the concatenated input packets,
wherein when the configuration type information indicates that the payload encapsulates the concatenated input packets, the link layer packet further includes count information for indicating a number of the concatenated input packets,
wherein a value of the count information is set to the number of the concatenated input packets minus two, and
wherein when the packet type information indicates that the type extension is used, packet type extension information is further included in the additional header, the packet type extension information indicates a type of the input packets encapsulated in the payload.

2. The method according to claim 1,
wherein the packet type information has a predefined value when indicating that the type extension is used.

3. The method according to claim 1,
wherein the component length elements are positioned in the same order as the corresponding input packets positioned in the payload.

4. An apparatus for transmitting a broadcast signal, the apparatus comprising:
a first module configured to generate input packets comprising broadcast data;
a second module configured to generate link layer packets by encapsulating the input packets, wherein a link layer packet includes a base header and a payload,
wherein the base header includes packet type information and configuration type information, the packet type information indicates a type of data encapsulated in the payload, and the configuration type information indicates configuration of the payload,
wherein the type indicated by the packet type information corresponds to one of Internet Protocol (IP) packet, compressed IP packet, signaling packet, MPEG-2transport stream packet and type extension;
a third module configured to generate the broadcast signal including the link layer packets; and
a fourth module configured to transmit the broadcast signal,
wherein the link layer packet further includes an additional header,
wherein the additional header includes either a segmentation information part including segment sequence number information for indicating a sequence number of a segment of an input packet or a concatenation information part including component length elements for indicating a length of each of concatenated input packets depending on whether the configuration type information indicates that the payload encapsulates the segment of the input packet or the concatenated input packets,
wherein when the configuration type information indicates that the payload encapsulates the concatenated input packets, the link layer packet further includes count information for indicating a number of the concatenated input packets,
wherein a value of the count information is set to the number of the concatenated input packets minus two, and
wherein when the packet type information indicates that the type extension is used, packet type extension information is further included in the additional header, the packet type extension information indicates a type of the input packets encapsulated in the payload.

5. The apparatus according to claim 4,
wherein the packet type information has a predefined value when indicating that the type extension is used.

6. The apparatus according to claim 4,
wherein the component length elements are positioned in the same order as the corresponding input packets positioned in the payload.

7. A method for receiving a broadcast signal, the method comprising:
receiving the broadcast signal;
obtaining link layer packets from the broadcast signal,
wherein a link layer packet includes a base header and a payload,
wherein the base header includes packet type information and configuration type information, the packet type information indicates a type of data encapsulated in the payload, and the configuration type information indicates configuration of the payload,
wherein the type indicated by the packet type information corresponds to one of Internet Protocol (IP) packet, compressed IP packet, signaling packet, MPEG-2transport stream packet and type extension; and
obtaining input packets by decapsulating the link layer packets,
wherein the input packets comprise broadcast data,
wherein the link layer packet further includes an additional header,
wherein the additional header includes either a segmentation information part including segment sequence number information for indicating a sequence number of a segment of an input packet or a concatenation information part including component length elements for indicating a length of each of concatenated input packets depending on whether the configuration type information indicates that the payload encapsulates the segment of the input packet or the concatenated input packets,
wherein when the configuration type information indicates that the payload encapsulates the concatenated input packets, the link layer packet further includes count information for indicating a number of the concatenated input packets, wherein a value of the count information is set to the number of the concatenated input packets minus two, and wherein when the packet type information indicates that the type extension is used, packet type extension information is further included in the additional header, the packet type extension information indicates a type of the input packets encapsulated in the payload.

8. An apparatus for receiving a broadcast signal, the apparatus comprising:

a first module configured to receive the broadcast signal;

a second module configured to obtain link layer packets from the broadcast signal, wherein a link layer packet includes a base header and a payload, wherein the base header includes packet type information and configuration type information, the packet type information indicates a type of data encapsulated in the payload, and the configuration type information indicates configuration of the payload, wherein the type indicated by the packet type information corresponds to one of Internet Protocol (IP) packet, compressed IP packet, signaling packet, MPEG-2 transport stream packet and type extension; and a third module configured to obtain input packets by decapsulating the link layer packets, wherein the input packets comprise broadcast data, wherein the link layer packet further includes an additional header, wherein the additional header includes either a segmentation information part including segment sequence number information for indicating a sequence number of a segment of an input packet or a concatenation information part including component length elements for indicating a length of each of concatenated input packets depending on whether the configuration type information indicates that the payload encapsulates the segment of the input packet or the concatenated input packets, wherein when the configuration type information indicates that the payload encapsulates the concatenated input packets, the link layer packet further includes count information for indicating a number of the concatenated input packets, wherein a value of the count information is set to the number of the concatenated input packets minus two, and wherein when the packet type information indicates that the type extension is used, packet type extension information is further included in the additional header, the packet type extension information indicates a type of the input packets encapsulated in the payload.

* * * * *